US012750651B2

(12) United States Patent
Paul et al.

(10) Patent No.: US 12,750,651 B2
(45) Date of Patent: Sep. 29, 2026

(54) COMMUNICATION VIA A NON-TERRESTRIAL COMMUNICATION NETWORK

(71) Applicant: Apple Inc., Cupertino, CA (US)

(72) Inventors: Grant R. Paul, San Francisco, CA (US); Michael S. Soetaert, San Jose, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 18/679,277

(22) Filed: May 30, 2024

(65) Prior Publication Data

US 2024/0406700 A1 Dec. 5, 2024

Related U.S. Application Data

(60) Provisional application No. 63/470,862, filed on Jun. 3, 2023.

(51) Int. Cl.
*G06F 3/04842* (2022.01)
*H04W 4/90* (2018.01)

(52) U.S. Cl.
CPC .......... *H04W 4/90* (2018.02); *G06F 3/04842* (2013.01)

(58) Field of Classification Search
CPC ......... H04L 41/22; H04L 51/04; H04L 67/75; G06F 9/451; H04M 1/72454; H04M 1/72457; H04M 1/72469; H04B 7/1851
See application file for complete search history.

(56) References Cited

U.S. PATENT DOCUMENTS

| | | | |
|---|---|---|---|
| 5,146,231 | A | 9/1992 | Ghaem et al. |
| 5,303,286 | A | 4/1994 | Wiedeman |
| 5,446,465 | A | 8/1995 | Diefes et al. |
| 5,583,514 | A | 12/1996 | Fulop |
| 5,587,717 | A | 12/1996 | Jang |
| 5,812,932 | A | 9/1998 | Wiedeman et al. |
| 5,863,057 | A | 1/1999 | Wessels |
| 5,937,349 | A | 8/1999 | Andresen |
| 5,995,041 | A | 11/1999 | Bradley et al. |
| 6,006,068 | A | 12/1999 | Elkin et al. |
| 6,052,587 | A | 4/2000 | Moraes et al. |
| 6,108,538 | A | 8/2000 | Blasiak et al. |
| 6,147,644 | A | 11/2000 | Castles et al. |
| 6,157,896 | A | 12/2000 | Castles et al. |
| 6,169,881 | B1 | 1/2001 | Astrom et al. |
| 6,208,858 | B1 | 3/2001 | Antonio et al. |
| 6,240,366 | B1 | 5/2001 | Nagatsuma et al. |
| 6,263,280 | B1 | 7/2001 | Stingone, Jr. |

(Continued)

FOREIGN PATENT DOCUMENTS

| | | | |
|---|---|---|---|
| CN | 101938287 | A | 1/2011 |
| CN | 102215295 | A | 10/2011 |

(Continued)

OTHER PUBLICATIONS

Advisory Action received for U.S. Appl. No. 18/201,411, mailed on Dec. 4, 2025, 3 pages.

(Continued)

*Primary Examiner* — Rinna Yi
(74) *Attorney, Agent, or Firm* — YHE Law LLP

(57) ABSTRACT

The present disclosure generally relates to communication via a non-terrestrial communication network.

39 Claims, 23 Drawing Sheets

(56) References Cited

U.S. PATENT DOCUMENTS 6,272,316 B1 8/2001 Wiedeman et al.
6,278,861 B1 8/2001 Ward et al.
6,317,689 B1 11/2001 Lee
6,397,054 B1 5/2002 Hoirup et al.
6,549,848 B1 4/2003 Green et al.
6,580,452 B1 6/2003 Gangitano
6,690,934 B1 2/2004 Conrad et al.
6,763,226 B1 7/2004 Mczeal, Jr.
6,992,991 B2 1/2006 Duske et al.
7,184,744 B1 2/2007 Schnabel
7,233,795 B1 6/2007 Ryden
7,738,912 B1 6/2010 Hawkins et al.
7,890,134 B2 2/2011 Richardson et al.
8,249,585 B2 8/2012 Tronc et al.
8,254,970 B1 8/2012 Oshinsky et al.
8,521,122 B2 8/2013 Scott et al.
8,554,170 B2 10/2013 Franz et al.
8,676,121 B1 3/2014 Monte et al.
8,688,450 B2 4/2014 Lloyd et al.
8,855,012 B1 10/2014 Suri
8,890,685 B1 11/2014 Sookman et al.
9,037,164 B2 5/2015 Keerthi
9,235,923 B1 1/2016 Robinson et al.
9,369,832 B1 6/2016 Noble et al.
9,418,537 B2 8/2016 Cahill
9,503,177 B1 11/2016 Shi et al.
9,521,378 B1 12/2016 Palaganas et al.
9,769,639 B2 9/2017 Cole et al.
10,116,893 B1 10/2018 Reis et al.
10,459,504 B2 10/2019 Veloso et al.
10,560,562 B1 2/2020 Tandon
10,608,978 B2 3/2020 Koum et al.
10,645,561 B1 5/2020 Guo et al.
10,791,536 B1 9/2020 Murphy
10,797,785 B1 10/2020 Rhee
10,853,410 B2 12/2020 Herz
10,959,074 B1 3/2021 Shuman et al.
10,999,158 B2 5/2021 Kramar et al.
11,003,315 B2 5/2021 Sung et al.
11,349,559 B1 5/2022 Reuss et al.
11,695,867 B1 * 7/2023 Palandurkar ...... H04M 3/42068 379/201.01
11,938,880 B2 3/2024 Jones et al.
2001/0043011 A1 11/2001 Ugusa et al.
2002/0000931 A1 1/2002 Petronic et al.
2002/0006117 A1 1/2002 Duske et al.
2002/0131330 A1 9/2002 Zion et al.
2003/0054814 A1 3/2003 Karabinis et al.
2003/0083816 A1 5/2003 Imakado et al.
2003/0085819 A1 * 5/2003 Gustavsson .............. G08G 1/20 340/988
2004/0166811 A1 8/2004 Moon
2004/0183281 A1 9/2004 Stopczynski
2004/0257275 A1 12/2004 Yee et al.
2005/0085215 A1 4/2005 Kokko et al.
2006/0017612 A1 1/2006 Nagatani
2006/0030334 A1 2/2006 Hashimoto
2006/0095563 A1 5/2006 Benjamin et al.
2006/0247915 A1 11/2006 Bradford et al.
2006/0258365 A1 11/2006 Cha et al.
2007/0109186 A1 5/2007 Fujiwara et al.
2007/0123252 A1 5/2007 Tronc et al.
2007/0130606 A1 6/2007 Jeong
2007/0142028 A1 6/2007 Ayoub et al.
2007/0188380 A1 8/2007 Duong et al.
2007/0216572 A1 9/2007 Schnabel
2008/0076410 A1 3/2008 Beyer
2008/0166011 A1 7/2008 Sever et al.
2008/0168290 A1 7/2008 Jobs et al.
2008/0186135 A1 8/2008 Boling et al.
2008/0303715 A1 12/2008 Wang et al.
2008/0313686 A1 12/2008 Matvey
2009/0049905 A1 2/2009 Lawhite et al.
2009/0135062 A1 5/2009 Hori
2009/0191854 A1 7/2009 Beason
2009/0191893 A1 7/2009 Smith
2009/0205041 A1 8/2009 Michalske
2009/0241072 A1 9/2009 Chaudhri et al.
2009/0262033 A1 10/2009 King et al.
2009/0267828 A1 10/2009 Kobayashi et al.
2009/0279674 A1 11/2009 Roberts
2010/0083159 A1 4/2010 Mountain et al.
2010/0085255 A1 4/2010 Wakabayashi
2010/0113020 A1 5/2010 Subramanian et al.
2010/0162169 A1 6/2010 Skarp
2010/0167672 A1 7/2010 Ahn et al.
2010/0257490 A1 10/2010 Lyon et al.
2010/0271312 A1 10/2010 Alameh et al.
2010/0311385 A1 12/2010 Hurwitz
2011/0088003 A1 4/2011 Swink et al.
2011/0092158 A1 4/2011 Plamondon
2011/0136428 A1 6/2011 Ritter
2011/0228721 A1 9/2011 Shinohara et al.
2011/0230161 A1 9/2011 Newman
2011/0248948 A1 10/2011 Griffin et al.
2011/0291974 A1 12/2011 Son et al.
2011/0306292 A1 12/2011 Wilson et al.
2012/0015622 A1 1/2012 Kuz et al.
2012/0068899 A1 3/2012 Ayotte et al.
2012/0135715 A1 5/2012 Kang et al.
2012/0140767 A1 6/2012 Brothers et al.
2012/0151357 A1 * 6/2012 Roche .................. G06F 3/0481 715/736
2012/0237002 A1 9/2012 Sennett et al.
2012/0239822 A1 9/2012 Poulson et al.
2012/0302200 A1 11/2012 Esbensen
2013/0045708 A1 2/2013 Nguyen et al.
2013/0088455 A1 4/2013 Jeong
2013/0127665 A1 5/2013 Miller et al.
2013/0135146 A1 5/2013 Ransom et al.
2013/0183924 A1 7/2013 Saigh et al.
2013/0197951 A1 8/2013 Watson et al.
2013/0205350 A1 8/2013 Ling et al.
2013/0225118 A1 8/2013 Jang et al.
2013/0231077 A1 9/2013 Cahill
2013/0271319 A1 10/2013 Trerise
2013/0271320 A1 10/2013 Trerise
2013/0295872 A1 11/2013 Guday et al.
2013/0301521 A1 11/2013 Abdi
2013/0326642 A1 12/2013 Hajj et al.
2013/0332026 A1 12/2013 Mckown et al.
2014/0022192 A1 1/2014 Hatanaka
2014/0028601 A1 1/2014 Moore et al.
2014/0071060 A1 3/2014 Santos-Gomez
2014/0134969 A1 5/2014 Jin et al.
2014/0177396 A1 6/2014 Lee et al.
2014/0213214 A1 7/2014 Reis
2014/0237393 A1 8/2014 Van Wie et al.
2014/0245783 A1 9/2014 Proud et al.
2014/0283142 A1 9/2014 Shepherd et al.
2014/0327629 A1 11/2014 Jobs et al.
2014/0370841 A1 12/2014 Roberts et al.
2015/0011220 A1 1/2015 Buckle et al.
2015/0018040 A1 1/2015 He et al.
2015/0052618 A1 2/2015 Michalske
2015/0063428 A1 3/2015 Lever
2015/0065077 A1 3/2015 Kim et al.
2015/0079923 A1 3/2015 Mcneil
2015/0097687 A1 4/2015 Sloo et al.
2015/0137972 A1 5/2015 Nepo
2015/0208220 A1 7/2015 Hulan
2015/0257126 A1 9/2015 Herz
2015/0271317 A1 9/2015 Nelson et al.
2015/0319284 A1 11/2015 Leonessi
2015/0338524 A1 11/2015 Ben Moshe et al.
2015/0350296 A1 12/2015 Yang et al.
2015/0358790 A1 12/2015 Nasserbakht
2016/0056525 A1 2/2016 Hansryd et al.
2016/0057595 A1 2/2016 Ahmed et al.
2016/0065669 A1 3/2016 Van Dijkman et al.
2016/0088455 A1 3/2016 Bozik et al.
2016/0183098 A1 6/2016 Lim
2016/0192163 A1 * 6/2016 Miner ..................... G01S 19/24 455/404.1

(56) References Cited

U.S. PATENT DOCUMENTS

| | | | | |
|---|---|---|---|---|
| 2016/0227023 | A1 | 8/2016 | Maly et al. | |
| 2016/0277903 | A1 | 9/2016 | Poosala et al. | |
| 2016/0302083 | A1 | 10/2016 | Durick et al. | |
| 2016/0306051 | A1 | 10/2016 | Hirabayashi et al. | |
| 2016/0374047 | A1 | 12/2016 | Reis | |
| 2017/0006620 | A1 | 1/2017 | Reis | |
| 2017/0021260 | A1 | 1/2017 | Willett et al. | |
| 2017/0026110 | A1 | 1/2017 | Richardson et al. | |
| 2017/0045623 | A1 | 2/2017 | Zlogar et al. | |
| 2017/0053461 | A1 | 2/2017 | Pal et al. | |
| 2017/0069191 | A1 | 3/2017 | Erkkila | |
| 2017/0085600 | A1 | 3/2017 | Carter et al. | |
| 2017/0150060 | A1 | 5/2017 | Herz | |
| 2017/0171636 | A1 | 6/2017 | Devlin et al. | |
| 2017/0180964 | A1 | 6/2017 | Mehta et al. | |
| 2017/0330436 | A1 | 11/2017 | Williams et al. | |
| 2017/0357411 | A1 | 12/2017 | Williams et al. | |
| 2018/0032234 | A1 | 2/2018 | Michalske | |
| 2018/0040951 | A1 | 2/2018 | Uchiyama | |
| 2018/0088242 | A1 | 3/2018 | Eagling | |
| 2018/0092057 | A1 | 3/2018 | Yamashita et al. | |
| 2018/0176362 | A1 | 6/2018 | Cohen | |
| 2018/0192264 | A1 | 7/2018 | Kwok et al. | |
| 2018/0270000 | A1 | 9/2018 | Reis et al. | |
| 2018/0316416 | A1 | 11/2018 | Reis et al. | |
| 2018/0316885 | A1 | 11/2018 | Reis et al. | |
| 2018/0338237 | A1 | 11/2018 | Maheswaranathan | |
| 2018/0338334 | A1 | 11/2018 | Jin et al. | |
| 2019/0020992 | A1 | 1/2019 | Romano | |
| 2019/0049592 | A1 | 2/2019 | Koontz et al. | |
| 2019/0190591 | A1 | 6/2019 | Wang et al. | |
| 2019/0200684 | A1 | 7/2019 | Ballstaedt | |
| 2019/0280788 | A1 | 9/2019 | Hardy et al. | |
| 2019/0387092 | A1 | 12/2019 | Tessier | |
| 2020/0025944 | A1 | 1/2020 | Mellier et al. | |
| 2020/0053641 | A1 | 2/2020 | Lee et al. | |
| 2020/0117900 | A1 | 4/2020 | Deng et al. | |
| 2020/0119984 | A1 | 4/2020 | Bouvet et al. | |
| 2020/0132644 | A1 | 4/2020 | Micalizzi et al. | |
| 2020/0187295 | A1 | 6/2020 | Li et al. | |
| 2020/0196209 | A1 | 6/2020 | Cui et al. | |
| 2020/0244673 | A1 | 7/2020 | Stockdale et al. | |
| 2020/0252780 | A1 | 8/2020 | McClendon et al. | |
| 2020/0304444 | A1 | 9/2020 | Aneja et al. | |
| 2020/0367069 | A1 | 11/2020 | Struhsaker et al. | |
| 2020/0383153 | A1 | 12/2020 | Agarwal et al. | |
| 2021/0006287 | A1 | 1/2021 | Peeters et al. | |
| 2021/0011173 | A1 | 1/2021 | Rhee | |
| 2021/0051444 | A1 | 2/2021 | Ryu et al. | |
| 2021/0058149 | A1 | 2/2021 | Nuttall et al. | |
| 2021/0110682 | A1 | 4/2021 | Howard et al. | |
| 2021/0120394 | A1 | 4/2021 | Martin et al. | |
| 2021/0144539 | A1 | 5/2021 | Edge et al. | |
| 2021/0168581 | A1 | 6/2021 | Van Den Dungen | |
| 2021/0175963 | A1 | 6/2021 | Chang et al. | |
| 2021/0243072 | A1 | 8/2021 | Peterson et al. | |
| 2021/0311203 | A1 | 10/2021 | Reis et al. | |
| 2021/0311613 | A1 | 10/2021 | Williams et al. | |
| 2022/0066048 | A1 | 3/2022 | Diggelen et al. | |
| 2022/0091737 | A1 | 3/2022 | Bower et al. | |
| 2022/0108595 | A1 | 4/2022 | Jiang et al. | |
| 2022/0116105 | A1 | 4/2022 | Robinson et al. | |
| 2022/0256631 | A1 | 8/2022 | Jain et al. | |
| 2022/0359064 | A1 | 11/2022 | Pierson et al. | |
| 2023/0035593 | A1* | 2/2023 | Cano | H04N 5/76 |
| 2023/0063173 | A1 | 3/2023 | Caro et al. | |
| 2023/0065219 | A1 | 3/2023 | Caro et al. | |
| 2023/0066232 | A1 | 3/2023 | Caro et al. | |
| 2023/0081032 | A1 | 3/2023 | Ardaud et al. | |
| 2023/0308538 | A1 | 9/2023 | Caro et al. | |
| 2023/0328171 | A1 | 10/2023 | Caro et al. | |
| 2024/0080389 | A1 | 3/2024 | Lauritzen | |
| 2024/0241627 | A1 | 7/2024 | Williams et al. | |
| 2025/0085827 | A1 | 3/2025 | Caro et al. | |
| 2025/0159074 | A1 | 5/2025 | Caro et al. | |
| 2025/0350541 | A1 | 11/2025 | Paul | |
| 2025/0350914 | A1 | 11/2025 | Chang et al. | |
| 2025/0370597 | A1 | 12/2025 | Carrigan et al. | |
| 2025/0385967 | A1 | 12/2025 | Caro et al. | |
| 2026/0025728 | A1* | 1/2026 | Lee | H04W 4/90 |

FOREIGN PATENT DOCUMENTS

| | | | |
|---|---|---|---|
| CN | 102752448 | A | 10/2012 |
| CN | 102905244 | A | 1/2013 |
| CN | 101938287 | B | 6/2013 |
| CN | 103297610 | A | 9/2013 |
| CN | 104168367 | A | 11/2014 |
| CN | 105554225 | A | 5/2016 |
| CN | 108718447 | A | 10/2018 |
| EP | 0963061 | A2 | 12/1999 |
| EP | 2981000 | A1 | 2/2016 |
| EP | 3248180 | A1 | 11/2017 |
| EP | 3676972 | B1 | 2/2022 |
| JP | 9-172401 | A | 6/1997 |
| JP | 10-191423 | A | 7/1998 |
| JP | 2000-40990 | A | 2/2000 |
| JP | 2001-320449 | A | 11/2001 |
| JP | 2002-197577 | A | 7/2002 |
| JP | 2003-75525 | A | 3/2003 |
| JP | 2004-96265 | A | 3/2004 |
| JP | 2004-328289 | A | 11/2004 |
| JP | 4465365 | B2 | 5/2010 |
| JP | 4501833 | B2 | 7/2010 |
| JP | 2013-140164 | A | 7/2013 |
| JP | 2013-239979 | A | 11/2013 |
| JP | 2016-15624 | A | 1/2016 |
| JP | 2018-532298 | A | 11/2018 |
| JP | 2019-505117 | A | 2/2019 |
| JP | 2021-40276 | A | 3/2021 |
| JP | 6853820 | B2 | 3/2021 |
| KR | 10-2016-0135779 | A | 11/2016 |
| KR | 10-2514692 | B1 | 3/2023 |
| WO | 2010/064716 | A1 | 6/2010 |
| WO | 2014/200731 | A1 | 12/2014 |
| WO | 2015/062237 | A1 | 5/2015 |
| WO | 2015/192277 | A1 | 12/2015 |
| WO | 2016/116814 | A1 | 7/2016 |
| WO | 2019/118020 | A1 | 6/2019 |
| WO | 2023/034323 | A1 | 3/2023 |

OTHER PUBLICATIONS

International Preliminary Report on Patentability received for PCT Patent Application No. PCT/US2024/032052, mailed on Dec. 11, 2025, 8 pages.

Notice of Allowance received for U.S. Appl. No. 17/941,400, mailed on Dec. 16, 2025, 13 pages.

Final Office Action received for U.S. Appl. No. 18/201,411, mailed on Sep. 17, 2025, 24 pages.

Letter Restarting Period for Response received for U.S. Appl. No. 18/201,411, mailed on Sep. 23, 2025, 24 pages.

Applicant Initiated Interview Summary received for U.S. Appl. No. 17/899,510, mailed on Apr. 27, 2023, 2 pages.

Applicant-Initiated Interview Summary received for U.S. Appl. No. 17/349,191, mailed on Aug. 1, 2023, 5 pages.

Applicant-Initiated Interview Summary received for U.S. Appl. No. 17/349,191, mailed on Feb. 15, 2023, 3 pages.

Applicant-Initiated Interview Summary received for U.S. Appl. No. 17/349,191, mailed on Feb. 21, 2023, 3 pages.

Applicant-Initiated Interview Summary received for U.S. Appl. No. 17/899,315, mailed on Jan. 24, 2023, 3 pages.

Applicant-Initiated Interview Summary received for U.S. Appl. No. 17/899,510, mailed on Aug. 2, 2023, 2 pages.

Applicant-Initiated Interview Summary received for U.S. Appl. No. 17/899,510, mailed on Jan. 4, 2024, 2 pages.

Applicant-Initiated Interview Summary received for U.S. Appl. No. 17/899,510, mailed on Jun. 5, 2024, 2 pages.

Applicant-Initiated Interview Summary received for U.S. Appl. No. 17/899,510, mailed on Nov. 22, 2023, 2 pages.

(56) References Cited

OTHER PUBLICATIONS

Applicant-Initiated Interview Summary received for U.S. Appl. No. 17/899,530, mailed on Apr. 3, 2023, 5 pages.
Applicant-Initiated Interview Summary received for U.S. Appl. No. 17/899,530, mailed on Feb. 3, 2023, 6 pages.
Applicant-Initiated Interview Summary received for U.S. Appl. No. 17/899,530, mailed on Jul. 3, 2023, 6 pages.
Certificate of Examination received for Australian Patent Application No. 2019101260, mailed on Mar. 25, 2020, 2 pages.
Chand et al., "A mobile application for Women's Safety: WoSApp", Tencon 2015—2015 IEEE Region 10 Conference doi:10.1109/TENCON.2015.7373171., Nov. 1-4, 2015, 5 pages.
Clark, Mitchell, "Qualcomm's going toe-to-toe with Apple's satellite messaging feature", Available online at: https://www.theverge.com/2023/1/5/23538207/qualcomm-satellite-messaging-snapdragon-android, Jan. 6, 2023, 18 pages.
Corrected Notice of Allowance received for U.S. Appl. No. 17/899,530, mailed on Nov. 8, 2023, 3 pages.
Decision on Appeal received for U.S. Appl. No. 15/424,186, mailed on May 7, 2021, 12 pages.
Examiner's Answer to Appeal Brief received for U.S. Appl. No. 15/424,186, mailed on Oct. 7, 2020, 8 pages.
Extended European Search Report received for European Patent Application No. 17810730.6, mailed on Nov. 29, 2019, 12 pages.
Extended European Search Report received for European Patent Application No. 22197430.6, mailed on Jan. 26, 2023, 8 pages.
Extended European Search Report received for European Patent Application No. 22197456.1, mailed on Feb. 2, 2023, 9 pages.
Exultationpictures, "Align Satellite Dish on Astra 19.2 with the App Satellite Finder (Pro) and DUR Line SF4000", Online available at: https://www.youtube.com/watch?v=n5EEZ6rcYcQ, Mar. 29, 2021, 2 pages.
Faiz et al., "Smart vehicle accident detection and alarming system using a smartphone", 2015 International Conference on Computer and Information Engineering (ICCIE), doi: 10.1109/CCIE.2015.7399319., Nov. 26-27, 2015, pp. 66-69.
Fernandes et al., "Mobile Application for Automatic Accident Detection and Multimodal Alert", 2015 IEEE 81st Vehicular Technology Conference (VTC Spring), doi: 10.1109NTCSpring.2015.7145935., May 11-14, 2015, 5 pages.
Final Office Action received for U.S. Appl. No. 15/424,186, mailed on Aug. 9, 2019, 18 pages.
Final Office Action received for U.S. Appl. No. 17/349,191, mailed on Jun. 28, 2023, 15 pages.
Final Office Action received for U.S. Appl. No. 17/899,510, mailed on Jun. 2, 2023, 15 pages.
Final Office Action received for U.S. Appl. No. 17/899,510, mailed on Nov. 30, 2023, 21 pages.
Final Office Action received for U.S. Appl. No. 17/899,530, mailed on Mar. 8, 2023, 68 pages.
Inso et al., "Play it safe a personal security application on Android platform", 2016 Fifth ICT International Student Project Conference (ICT-ISPC), doi: 10.1109/ICT-ISPC.2016.7519254., May 27-28, 2016, 4 pages.
Intention to Grant received for European Patent Application No. 22197456.1, mailed on Apr. 16, 2024, 9 pages.
International Preliminary Report on Patentability received for PCT Patent Application No. PCT/US2017/035155, mailed on Dec. 20, 2018, 15 pages.
International Preliminary Report on Patentability received for PCT Patent Application No. PCT/US2022/042069, mailed on Mar. 14, 2024, 15 pages.
International Preliminary Report on Patentability received for PCT Patent Application No. PCT/US2022/043183, mailed on Mar. 28, 2024, 12 pages.
International Search Report and Written Opinion received for PCT Patent Application No. PCT/US2017/035155, mailed on Oct. 2, 2017, 19 pages.
International Search Report and Written Opinion received for PCT Patent Application No. PCT/US2022/042069, mailed on Feb. 14. 2023, 22 pages.
International Search Report and Written Opinion received for PCT Patent Application No. PCT/US2022/043183, mailed on Jan. 23, 2023, 17 pages.
International Search Report and Written Opinion received for PCT Patent Application No. PCT/US2023/032051, mailed on Mar. 4, 2024, 19 pages.
Invitation to Pay Additional Fees and Partial International Search Report received for PCT Patent Application No. PCT/US2022/042069. mailed on Dec. 22, 2022, 14 pages.
Invitation to Pay Additional Fees and Partial International Search Report received for PCT Patent Application No. PCT/US2023/032051, mailed on Jan. 8, 2024, 10 pages.
Invitation to Pay Additional Fees received for PCT Patent Application No. PCT/US2017/035155, mailed on Aug. 3, 2017, 2 pages.
Invitation to Pay Additional Fees received for PCT Patent Application No. PCT/US2022/043183, mailed on Nov. 30, 2022, 10 pages.
Office Action received for U.S. Appl. No. 15/424,186, mailed on Jan. 11, 2019, 15 pages.
Office Action received for U.S. Appl. No. 17/349,191, mailed on Dec. 21, 2022, 13 pages.
Office Action received for U.S. Appl. No. 17/899,315, mailed on Dec. 22, 2022, 20 pages.
Office Action received for U.S. Appl. No. 17/899,315, mailed on Nov. 4, 2022, 20 pages.
Office Action received for U.S. Appl. No. 17/899,510, mailed on Mar. 16, 2023, 16 pages.
Office Action received for U.S. Appl. No. 17/899,510, mailed on Mar. 27, 2024, 22 pages.
Office Action received for U.S. Appl. No. 17/899,510, mailed on Oct. 26, 2023, 18 pages.
Office Action received for U.S. Appl. No. 17/899,530, mailed on Jan. 3, 2023, 67 pages.
Non-Final Office Action received for U.S. Appl. No. 17/899,530, mailed on May 25, 2023, 68 pages.
Notice of Acceptance received for Australian Patent Application No. 2019250182, mailed on Mar. 11, 2021, 3 pages.
Notice of Acceptance received for Australian Patent Application No. 2022235630, mailed on Sep. 28, 2023, 3 pages.
Notice of Acceptance received for Australian Patent Application No. 2023204622, mailed on Aug. 10, 2023, 3 pages.
Notice of Allowance received for U.S. Appl. No. 17/349,191, mailed on Nov. 29, 2023, 8 pages.
Notice of Allowance received for U.S. Appl. No. 17/899,315, mailed on Feb. 24, 2023, 9 pages.
Notice of Allowance received for U.S. Appl. No. 17/899,530, mailed on Oct. 19, 2023, 13 pages.
Office Action received for Australian Patent Application No. 2017277838, mailed on Aug. 20, 2019, 3 pages.
Office Action received for Australian Patent Application No. 2017277838, mailed on Jun. 5, 2019, 3 pages.
Office Action received for Australian Patent Application No. 2019101260, mailed on Dec. 16, 2019, 3 pages.
Office Action received for Australian Patent Application No. 2019250182, mailed on Aug. 18, 2020, 4 pages.
Office Action received for Australian Patent Application No. 2019250182, mailed on Dec. 2, 2020, 5 pages.
Office Action received for Australian Patent Application No. 2022235630, mailed on Jul. 21, 2023, 6 pages.
Office Action received for Australian Patent Application No. 2022235630, mailed on May 17, 2023, 3 pages.
Office Action received for Chinese Patent Application No. 201780033617.5, mailed on Apr. 2, 2021, 24 pages (13 pages of English Translation and 11 pages of Official Copy).
Office Action received for Chinese Patent Application No. 201780033617.5, mailed on Apr. 20, 2020, 24 pages (13 pages of English Translation and 11 pages of Official Copy).
Office Action received for Chinese Patent Application No. 201780033617.5, mailed on Sep. 29, 2020, 26 pages (15 pages of English Translation and 11 pages of Official Copy).

(56) References Cited

OTHER PUBLICATIONS

Office Action received for Chinese Patent Application No. 201780033617.5, mailed on Sep. 30, 2021, 16 pages (10 pages of English Translation and 6 pages of Official Copy).
Office Action received for European Patent Application No. 17810730.6, mailed on Aug. 18, 2021, 12 pages.
Office Action received for European Patent Application No. 17810730.6, mailed on Jul. 6, 2023, 13 pages.
Office Action received for Japanese Patent Application No. 2022-557929, mailed on Mar. 29, 2024, 8 pages (4 pages of English Translation and 4 pages of Official Copy).
Office Action received for Japanese Patent Application No. 2023-001269, mailed on Mar. 22, 2024, 14 pages (7 pages of English Translation and 7 pages of Official Copy).
Office Action received for Japanese Patent Application No. 2023-001270, mailed on Mar. 22, 2024, 10 pages (5 pages of English Translation and 5 pages of Official Copy).
Peters, Jay, "The iPhone 13's rumored satellite link sounds like it's just for emergencies", The Verge, Available online at: https://apple.news/A-xX1QS6IT2m8l8PPKIL52Q, Aug. 30, 2021, 2 pages.
Record of Oral Hearing received for U.S. Appl. No. 15/424,186, mailed on May 10, 2021, 12 pages.
Result of Consultation received for European Patent Application No. 17810730.6, mailed on May 2, 2024, 4 pages.
Office Action received for Japanese Patent Application No. 2024-186863, mailed on Sep. 1, 2025, 8 pages (4 pages of English Translation and 4 pages of Official Copy).
Advisory Action received for U.S. Appl. No. 18/201,411, mailed on Nov. 17, 2025, 5 pages.
Applicant-Initiated Interview Summary received for U.S. Appl. No. 18/622,524, mailed on Nov. 6, 2025, 4 pages.
Decision to Grant received for European Patent Application No. 22197430.6, mailed on Oct. 30, 2025, 4 pages.
Office Action received for Korean Patent Application No. 10-2024-7007190, mailed on Oct. 22, 2025, 19 pages (8 pages of English Translation and 11 pages of Official Copy).
Decision to Grant received for European Patent Application No. 22785843.8, mailed on Nov. 13, 2025, 2 pages.
Final Office Action received for U.S. Appl. No. 17/941,400, mailed on Jul. 17, 2025, 8 pages.
Intention to Grant received for European Patent Application No. 22197430.6, mailed on Jul. 22, 2025, 12 pages.
Intention to Grant received for European Patent Application No. 22785843.8, mailed on Jul. 10, 2025, 8 pages.
Notice of Allowance received for U.S. Appl. No. 17/898,342, mailed on Jul. 29, 2025, 9 pages.
Intention to Grant received for European Patent Application No. 22769872.7, mailed on Oct. 14, 2025, 8 pages.
Intention to Grant received for European Patent Application No. 24204114.3, mailed on Oct. 20, 2025, 9 pages.
Non-Final Office Action received for U.S. Appl. No. 18/241,747, mailed on Oct. 27, 2025, 13 pages.
Applicant-Initiated Interview Summary received for U.S. Appl. No. 18/201,411, mailed on Aug. 21, 2025, 5 pages.
Corrected Notice of Allowance received for U.S. Appl. No. 17/898,342, mailed on Aug. 8, 2025, 3 pages.
Corrected Notice of Allowance received for U.S. Appl. No. 17/941,400, mailed on Aug. 26, 2025, 2 pages.
Non-Final Office Action received for U.S. Appl. No. 18/201,411, mailed on Aug. 11, 2025, 18 pages.
Notice of Allowance received for U.S. Appl. No. 17/941,400, mailed on Aug. 18, 2025, 9 pages.
Notice of Allowance received for Japanese Patent Application No. 2025-048996, mailed on Jun. 23, 2025, 5 pages (1 page of English Translation and 4 pages of Official Copy).
Applicant-Initiated Interview Summary received for U.S. Appl. No. 17/941,400, mailed on Apr. 28, 2025, 2 pages.
Applicant-Initiated Interview Summary received for U.S. Appl. No. 18/622,524, mailed on Jun. 5, 2025, 4 pages.
Board Decision received for Chinese Patent Application No. 201780033617.5, mailed on May 30, 2025, 17 pages (1 page of English Translation and 16 pages of Official Copy).
Board Opinion received for Chinese Patent Application No. 201780033617.5, mailed on Apr. 17, 2025, 16 pages (9 pages of English Translation and 7 pages of Official Copy).
Corrected Notice of Allowance received for U.S. Appl. No. 17/899,510, mailed on Dec. 10, 2024, 3 pages.
Corrected Notice of Allowance received for U.S. Appl. No. 17/899,510, mailed on Oct. 1, 2024, 3 pages.
Corrected Notice of Allowance received for U.S. Appl. No. 17/899,510, mailed on Oct. 21, 2024, 16 pages.
Decision to Grant received for European Patent Application No. 17810730.6, mailed on Oct. 17, 2024, 2 pages.
Decision to Grant received for European Patent Application No. 22197456.1, mailed on Aug. 29, 2024, 3 pages.
Extended European Search Report received for European Patent Application No. 24204114.3, mailed on Dec. 23, 2024, 10 pages.
Extended European Search Report received for European Patent Application No. 24204790.0, mailed on Jan. 13, 2025, 9 pages.
Intention to Grant received for European Patent Application No. 17810730.6, mailed on Jun. 11, 2024, 9 pages.
Intention to Grant received for European Patent Application No. 22785843.8, mailed on Mar. 19, 2025, 8 pages.
International Preliminary Report on Patentability received for PCT Patent Application No. PCT/US2023/032051, mailed on Mar. 20, 2025, 13 pages.
International Search Report and Written Opinion received for PCT Patent Application No. PCT/US2024/032052, mailed on Oct. 8, 2024, 11 pages.
Non-Final Office Action received for U.S. Appl. No. 17/898,342, mailed on Dec. 12, 2024, 12 pages.
Non-Final Office Action received for U.S. Appl. No. 17/941,400, mailed on Apr. 9, 2025, 17 pages.
Non-Final Office Action received for U.S. Appl. No. 18/622,524, mailed on Mar. 18, 2025, 18 pages.
Notice of Acceptance received for Australian Patent Application No. 2023270278, mailed on Oct. 30, 2024, 3 pages.
Notice of Allowance received for Japanese Patent Application No. 2022-557929, mailed on Aug. 5, 2024, 5 pages (1 page of English Translation and 4 pages of Official Copy).
Notice of Allowance received for Japanese Patent Application No. 2023-001269, mailed on Feb. 25, 2025, 5 pages (1 page of English Translation and 4 pages of Official Copy).
Notice of Allowance received for Japanese Patent Application No. 2023-001270, mailed on Sep. 30, 2024, 4 pages (1 page of English Translation and 3 pages of Official Copy).
Notice of Allowance received for Japanese Patent Application No. 2024-515962, mailed on Apr. 18, 2025, 4 pages (1 page of English Translation and 3 pages of Official Copy).
Notice of Allowance received for U.S. Appl. No. 17/898,342, mailed on Mar. 28, 2025, 10 pages.
Notice of Allowance received for U.S. Appl. No. 17/899,510, mailed on Sep. 11, 2024, 20 pages.
Office Action received for Australian Patent Application No. 2023270278, mailed on Sep. 17, 2024, 3 pages.
Office Action received for European Patent Application No. 22197430.6, mailed on Dec. 3, 2024, 8 pages.
Office Action received for European Patent Application No. 22769872.7, mailed on Nov. 15, 2024, 11 pages.
Office Action received for Japanese Patent Application No. 2023-001269, mailed on Sep. 20, 2024, 9 pages (4 pages of English Translation and 5 pages of Official Copy).
Office Action received for Japanese Patent Application No. 2024-515962, mailed on Mar. 3, 2025, 6 pages (3 pages of English Translation and 3 pages of Official Copy).
Final Office Action received for U.S. Appl. No. 18/622,524, mailed on Oct. 7, 2025, 13 pages.

* cited by examiner

COMMUNICATION VIA A NON-TERRESTRIAL COMMUNICATION NETWORK

CROSS-REFERENCE TO RELATED APPLICATIONS

This application claims priority to U.S. Provisional Patent Application Ser. No. 63/470,862, filed Jun. 3, 2023, entitled COMMUNICATION VIA A NON-TERRESTRIAL COMMUNICATION NETWORK," the contents of which are hereby incorporated by reference in their entirety.

FIELD

The present disclosure relates generally to computer user interfaces, and more specifically to techniques for communication via a non-terrestrial communication network.

BACKGROUND

Electronic devices can perform various type of communication, including text messaging, phone calls, and email. The communication can be performed via a terrestrial communication network such as a cellular communication network.

BRIEF SUMMARY

Some techniques for communication via a non-terrestrial communication network using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for communication via a non-terrestrial communication network. Such methods and interfaces optionally complement or replace other methods for communication via a non-terrestrial communication network. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: detecting, via the one or more input devices, a set of one or more inputs corresponding to a request to communicate via a non-terrestrial communication network; in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context; detecting, via the one or more input devices, a set of one or more inputs corresponding to a selection of a respective context user interface element; and in response to detecting the set of one or more inputs corresponding to the selection of the respective context user interface element: in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network.

In accordance with some embodiments, a non-transitory computer-readable storage medium is described. The non-transitory computer-readable storage medium stores one or more programs configured to be executed by one or more processors of a computer system that is in communication with a display generation component and one or more input devices. The one or more programs includes instructions for: detecting, via the one or more input devices, a set of one or more inputs corresponding to a request to communicate via a non-terrestrial communication network; in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context; detecting, via the one or more input devices, a set of one or more inputs corresponding to a selection of a respective context user interface element; and in response to detecting the set of one or more inputs corresponding to the selection of the respective context user interface element: in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network.

In accordance with some embodiments, a transitory computer-readable storage medium is described. The transitory computer-readable storage medium stores one or more programs configured to be executed by one or more processors of a computer system that is in communication with a display generation component and one or more input devices. The one or more programs includes instructions for: detecting, via the one or more input devices, a set of one or more inputs corresponding to a request to communicate via a non-terrestrial communication network; in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context; detecting, via the one or more input devices, a set of one or more inputs corresponding to a selection of a respective context user interface element; and in response to detecting the set of one or more inputs corresponding to the selection of the respective context user interface element: in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network.

In accordance with some embodiments, a computer system configured to communicate with a display generation component and one or more input devices is described. The computer system comprises one or more processors and memory storing one or more programs configured to be executed by the one or more processors. The one or more programs include instructions for: detecting, via the one or more input devices, a set of one or more inputs corresponding to a request to communicate via a non-terrestrial communication network; in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context; detecting, via the one or more input devices, a set of one or more inputs corresponding to a selection of a respective context user interface element; and in response to detecting the set of one or more inputs corresponding to the selection of the respective context user interface element: in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network.

In accordance with some embodiments, a computer system configured to communicate with a display generation component and one or more input devices is described. The computer system comprises: means for detecting, via the one or more input devices, a set of one or more inputs corresponding to a request to communicate via a non-terrestrial communication network; means for, in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context; means for, detecting, via the one or more input devices, a set of one or more inputs corresponding to a selection of a respective context user interface element; and means for, in response to detecting the set of one or more inputs corresponding to the selection of the respective context user interface element: in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network.

In accordance with some embodiments, a computer program product is described. The computer program product comprises one or more programs configured to be executed by one or more processors of a computer system that is in communication with a display generation component and one or more input devices. The one or more programs include instructions for: detecting, via the one or more input devices, a set of one or more inputs corresponding to a request to communicate via a non-terrestrial communication network; in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context; detecting, via the one or more input devices, a set of one or more inputs corresponding to a selection of a respective context user interface element; and in response to detecting the set of one or more inputs corresponding to the selection of the respective context user interface element: in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for communication via a non-terrestrial communication network, thereby increasing the effectiveness, efficiency, and user satisfaction with such devices. Such methods and interfaces may complement or replace other methods for communication via a non-terrestrial communication network.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
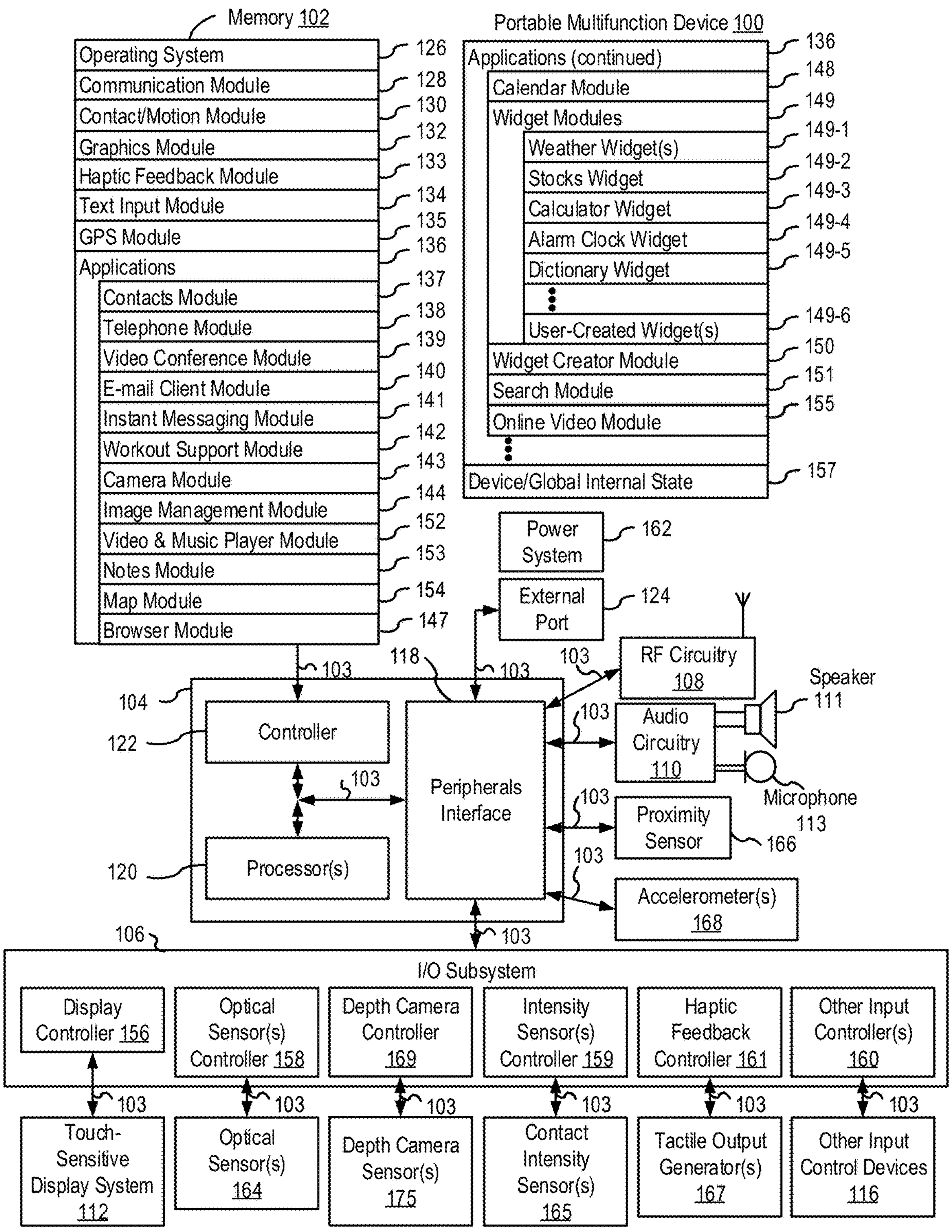
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for communication via a non-terrestrial communication network. In some embodiments, in response to detecting a request to communicate via a non-terrestrial communication network, a computer system initiates a process for communicating via the non-terrestrial communication network without selecting a recipient or initiates a process for selecting a recipient based on a context (e.g., whether a user indicates that the request to communicate is for an emergency or to request roadside assistance). Such techniques can reduce the cognitive burden on a user who communicate via a non-terrestrial communication network, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for communication via a non-terrestrial communication network. FIGS. 6A-6AB illustrate exemplary user interfaces for communication via a non-terrestrial communication network. FIG. 7 is a flow diagram illustrating methods of communication via a non-terrestrial communication network in accordance with some embodiments. The user interfaces in FIGS. 6A-6AB are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently. Reducing the number of inputs needed to perform an operation and providing clear feedback to the user enable the user to use the device more quickly and efficiently, which is particularly important in emergency situations for several reasons. Using a device efficiently conserves battery life, which is important in emergency situations because some emergency communication features use satellite communications that can use significant energy (e.g., more energy than cellular communications) and because opportunities to recharge the device in an emergency may be limited (e.g., because a user is in a remote location where a power source is not available). User interfaces that clearly indicate how to use a device quickly and efficiently are particularly important in emergency situations because a user may be stressed and more prone to making mistakes. In an emergency situation, reducing errors by providing clear instructions and feedback saves time communicating with emergency services, which can improve the likelihood that emergency assistance will be provided more quickly. These techniques can also reduce the bandwidth of communications, which conserves computer resources and battery life, and improves the speed of communicating via satellite communication because satellite communication may have limited bandwidth capabilities (e.g., compared to cellular communication).

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser.

No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
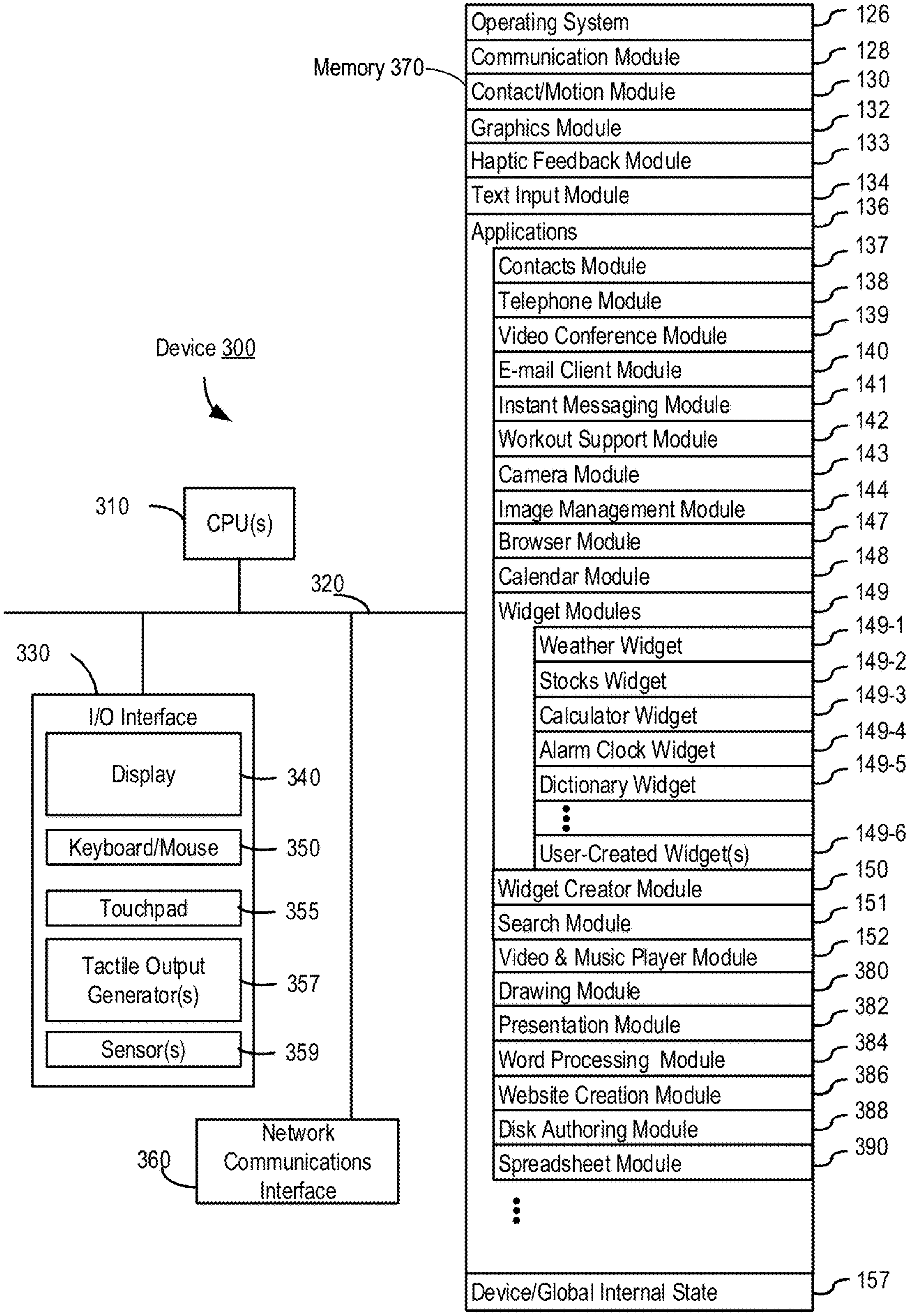
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
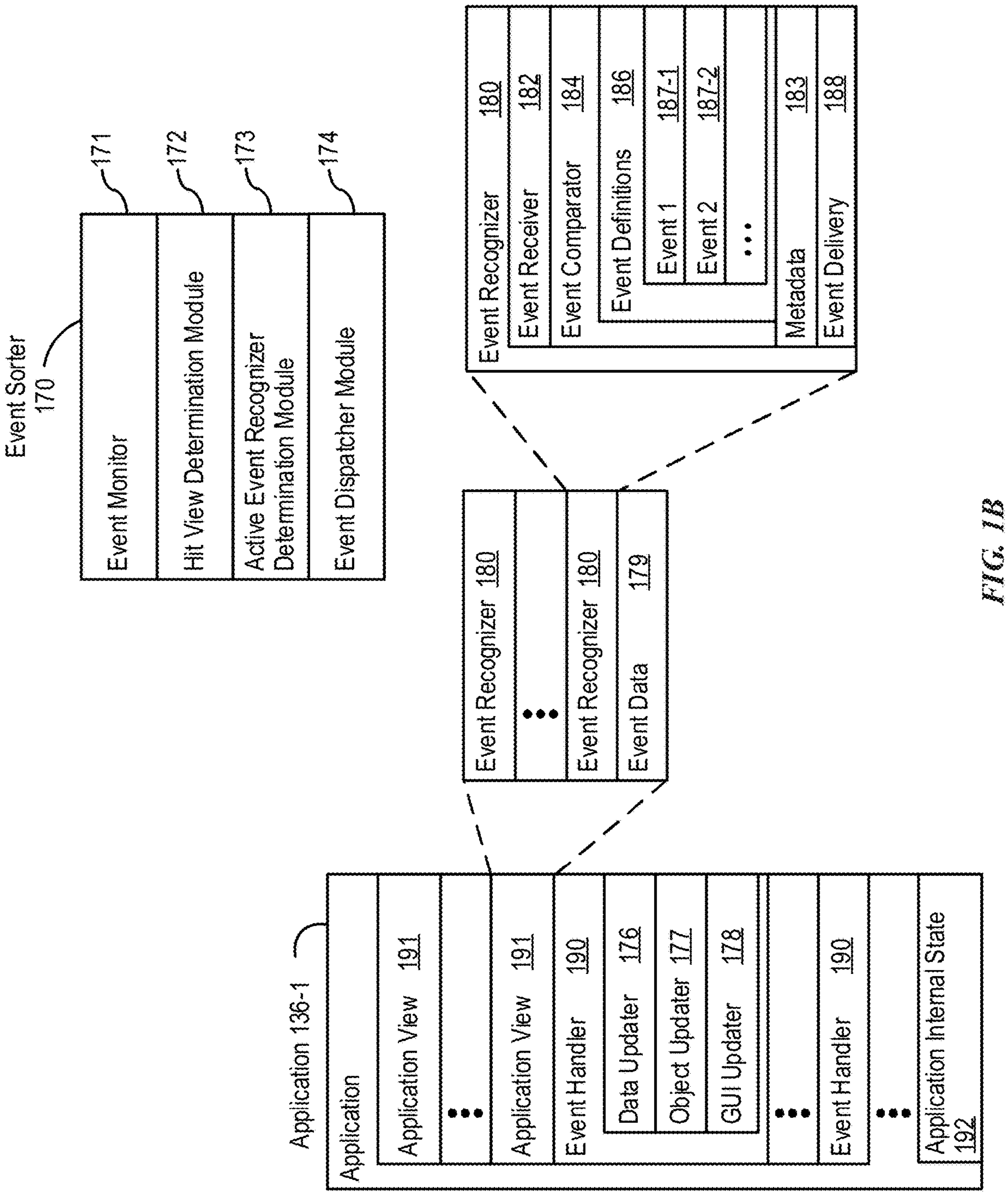
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
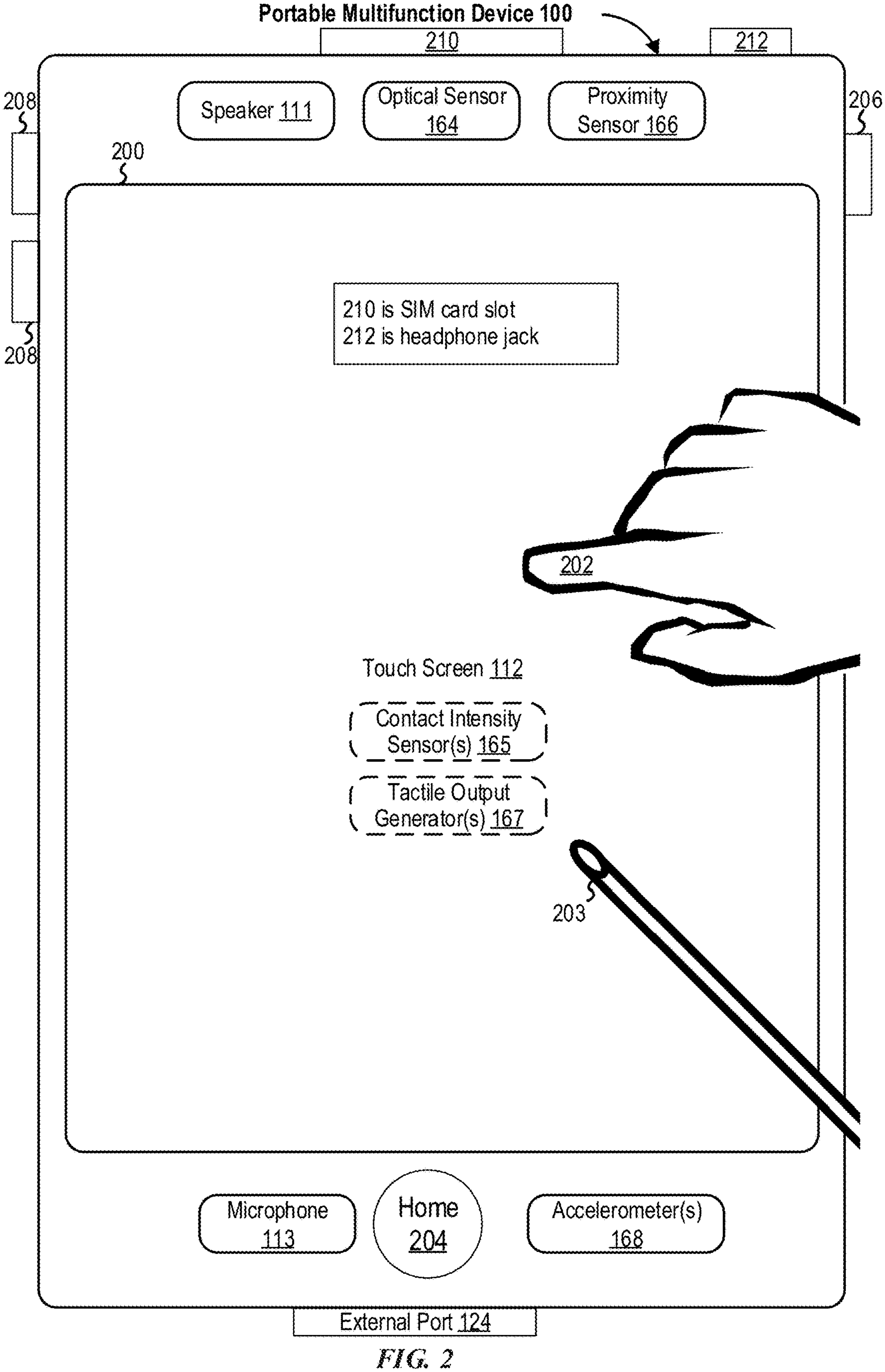
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
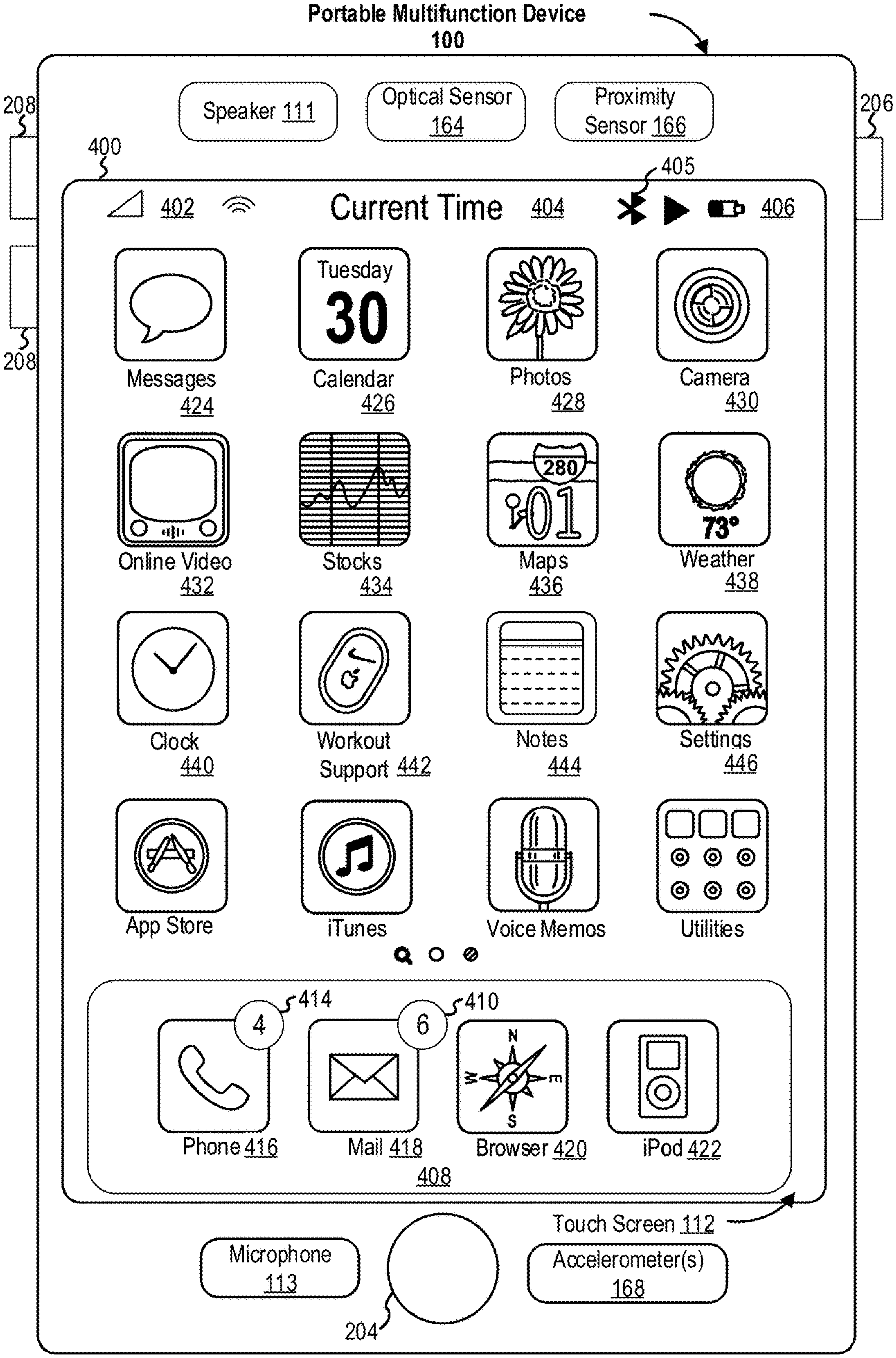
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
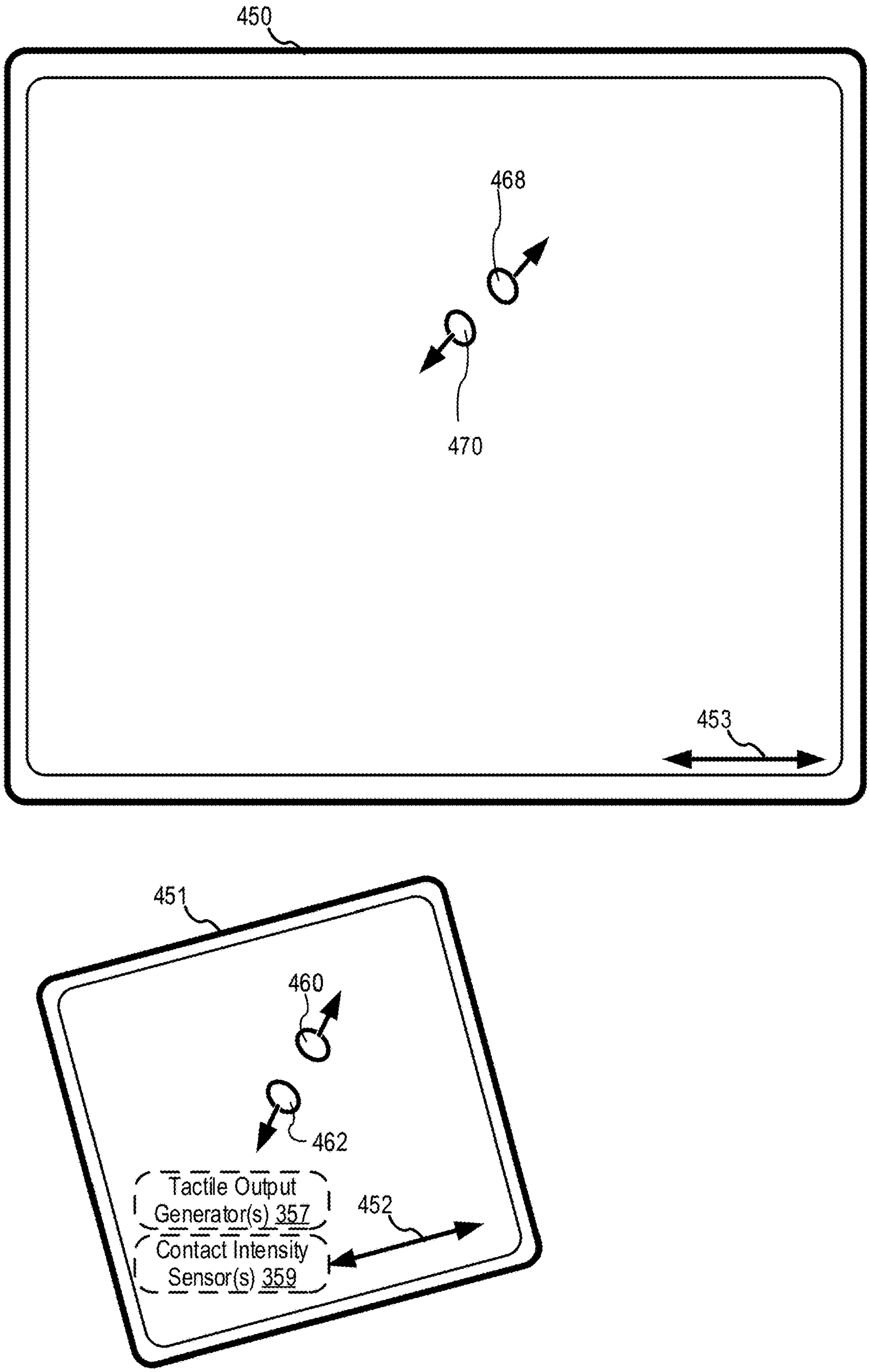
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
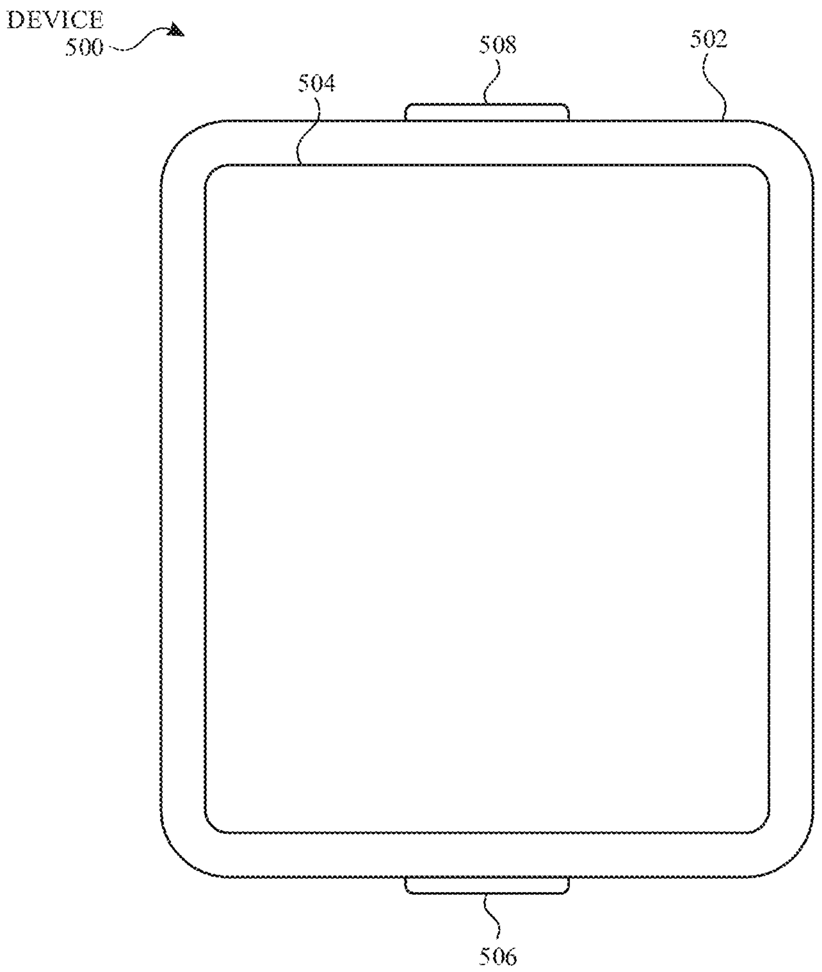
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
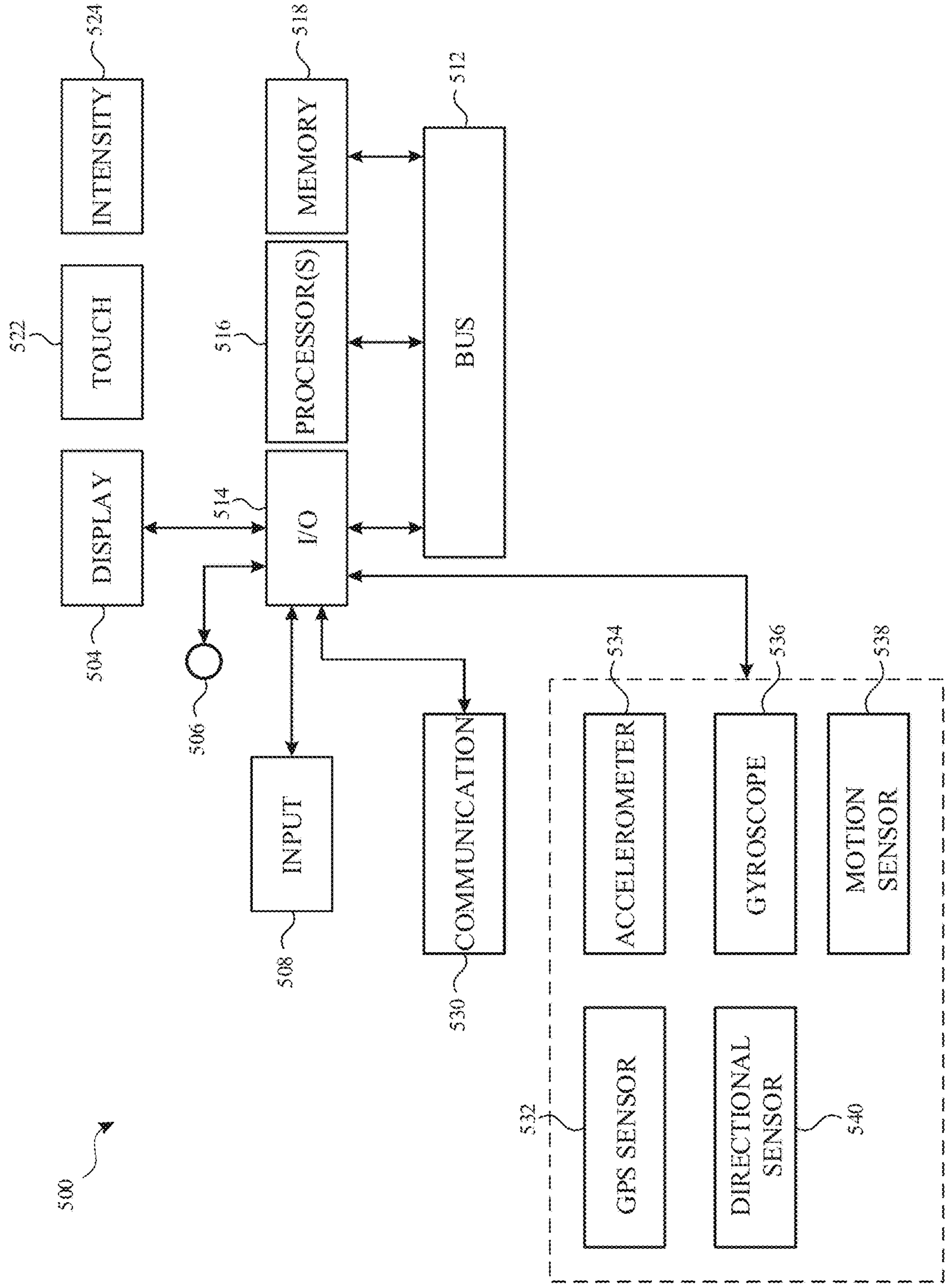
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including method 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6AB illustrate exemplary user interfaces for communication via a non-terrestrial communication network, in accordance with some embodiments. The user interfaces in these figures are used to illustrate the processes described below, including the method in FIG. 7.

FIG. 6A illustrates computer system 600. Computer system 600 includes display 602. In FIG. 6A, computer system 600 displays phone user interface 604 of a phone application. User interface 604 indicates that an emergency number (e.g., 911) has been selected. Network status indicator 606 generally indicates a status of a signal or connection between computer system 600 and a terrestrial communication network (e.g., a cellular network). In FIG. 6A, network status indicator 606 indicates that computer system has a cellular signal.

Figure 6B:
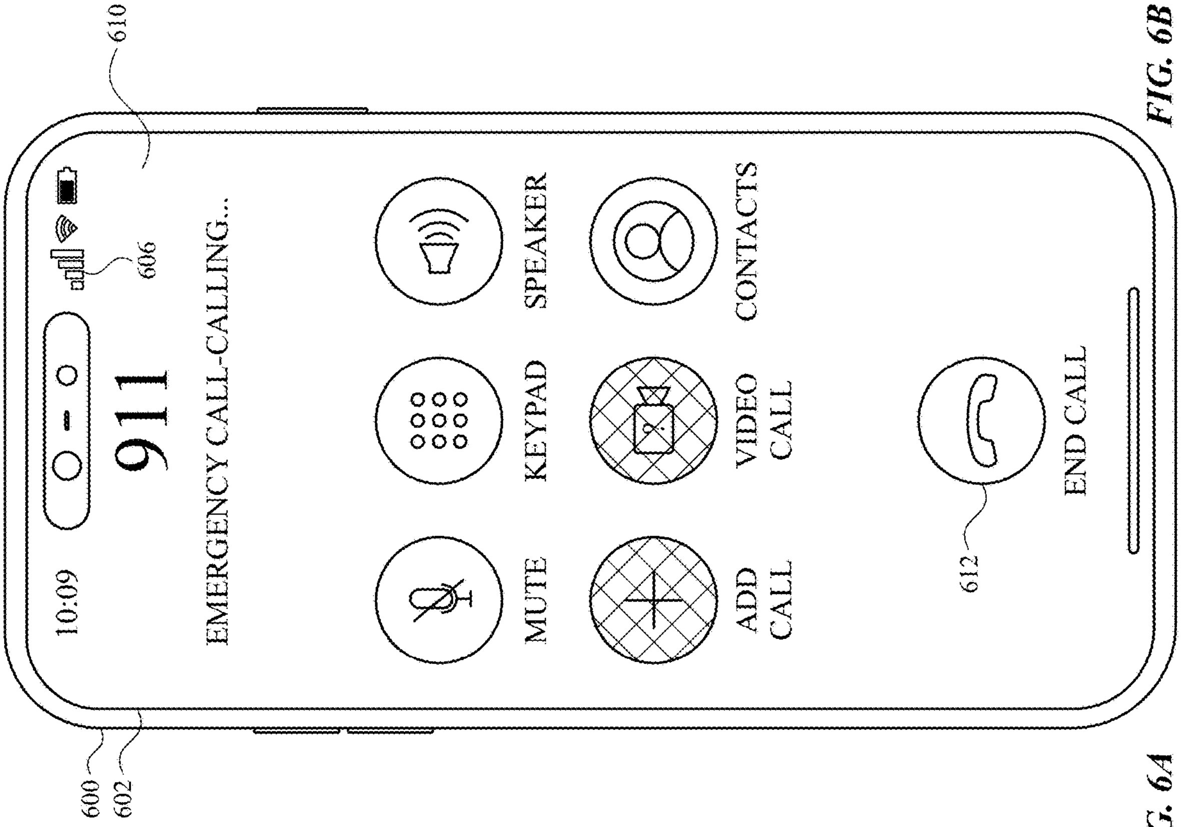
FIGS. 6A-6AB illustrate user interfaces for communication via a non-terrestrial communication network, in accordance with some embodiments.
Figure 6A:
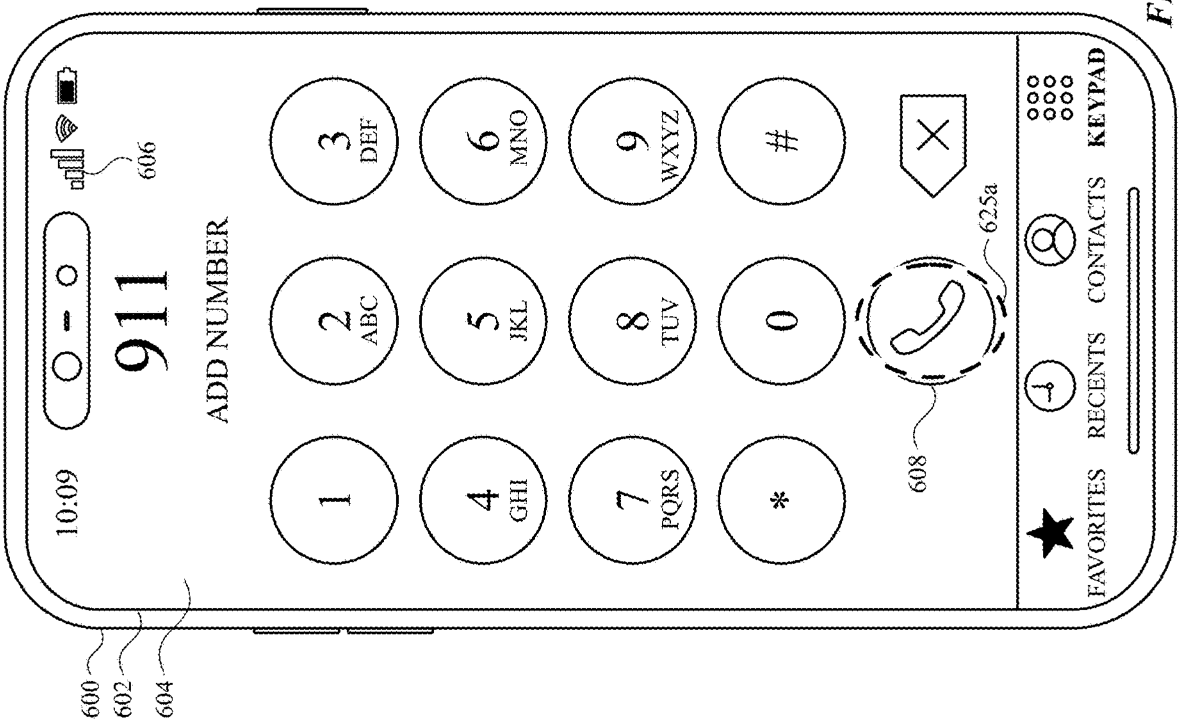
Figure 7:
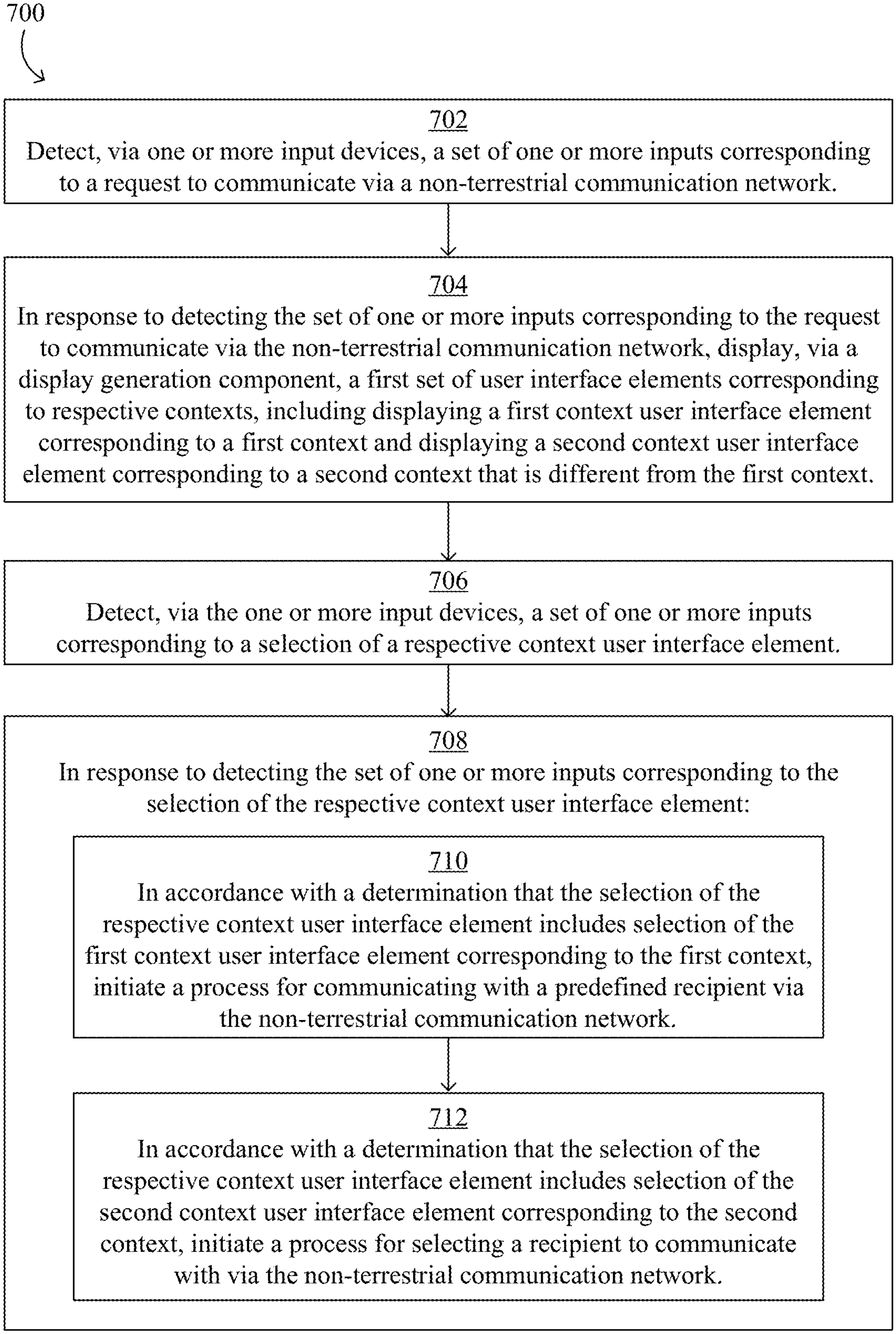
FIG. 7 is a flow diagram illustrating methods for communication via a non-terrestrial communication network, in accordance with some embodiments.

In FIG. 6A, computer system 600 detects input 625*a* (e.g., a tap and/or other input) selecting call button 608. In response to detecting input 625*a*, computer system 600 attempts to initiate a phone call to the selected number (e.g., 911) and displays call user interface 610 shown in FIG. 6B. Call user interface 610 indicates a status of the call to the selected number. In FIG. 6B, call user interface 610 indicates that computer system 600 is attempting to make an emergency call to 911 (e.g., "Emergency Call-Calling . . . "). If computer system 600 has a cellular signal, as indicated by network status indicator 606 in FIG. 6B, then computer system 600 will establish a call when the selected number answers the call.

If computer system 600 does not have a cellular signal, computer system 600 provides an option to communicate with the selected number via a satellite communication network. For example, in FIG. 6C, computer system 600 is unable to communicate with the selected number via a terrestrial communication network because computer system 600 does not have a cellular signal or connection with a cellular network. In FIG. 6C, call user interface 610 includes an indication (e.g., "No Connection") that computer system 600 cannot connect with the selected number, and network status indicator 606 includes an indication (e.g., "----", instead of the vertical bars shown in FIGS. 6A-6B) that computer system 600 does not have a cellular signal.

Computer system 600 is capable of performing communication via a non-terrestrial communication network. Network status indicator 606 in FIG. 6C includes an indication (e.g., "SOS") that computer system 600 can perform communication via a non-terrestrial communication network. In response to a determination that the attempt to initiate a call with the emergency number was unsuccessful because computer system 600 does not have a cellular signal, computer system 600 displays satellite communication option 614. In some embodiments, only displays satellite communication option 614 when computer system 600 attempts to call a predefined number such as, e.g., an emergency number, an emergency service, or a designated emergency contact. In FIG. 6C, computer system 600 moves end call option 612 and adds satellite communication option 614 to user interface 610.

Satellite communication option 614 enables a user to initiate a process for communicating (e.g., with an emergency service) via a satellite communication network. In FIG. 6C, computer system 600 detects input 625*b* (e.g., a tap and/or other input) selecting satellite communication option 614. In response to detecting input 625*b*, computer system 600 displays information about the ability to communicate via the satellite communication network and an option to continue with communicating via the satellite communication network. For example, in response to detecting input 625*b*, computer system 600 displays user interface 616 shown in FIG. 6D. User interface 616 includes a graphical illustration of aligning a phone to establish a connection with a satellite, instructions for connecting with a satellite (e.g., "Be outside to get a connection"), a notification that messages send via the satellite communication network will take longer (e.g., than messages sent via a cellular communication network), a notification that the user will be prompted to answer questions (e.g., "Answer questions to help get a faster response"), a notification that a location and medical information of the user of computer system 600 may be shared (e.g., "Your location and medial ID may be shared"), and continue option 620.

Figure 6D:
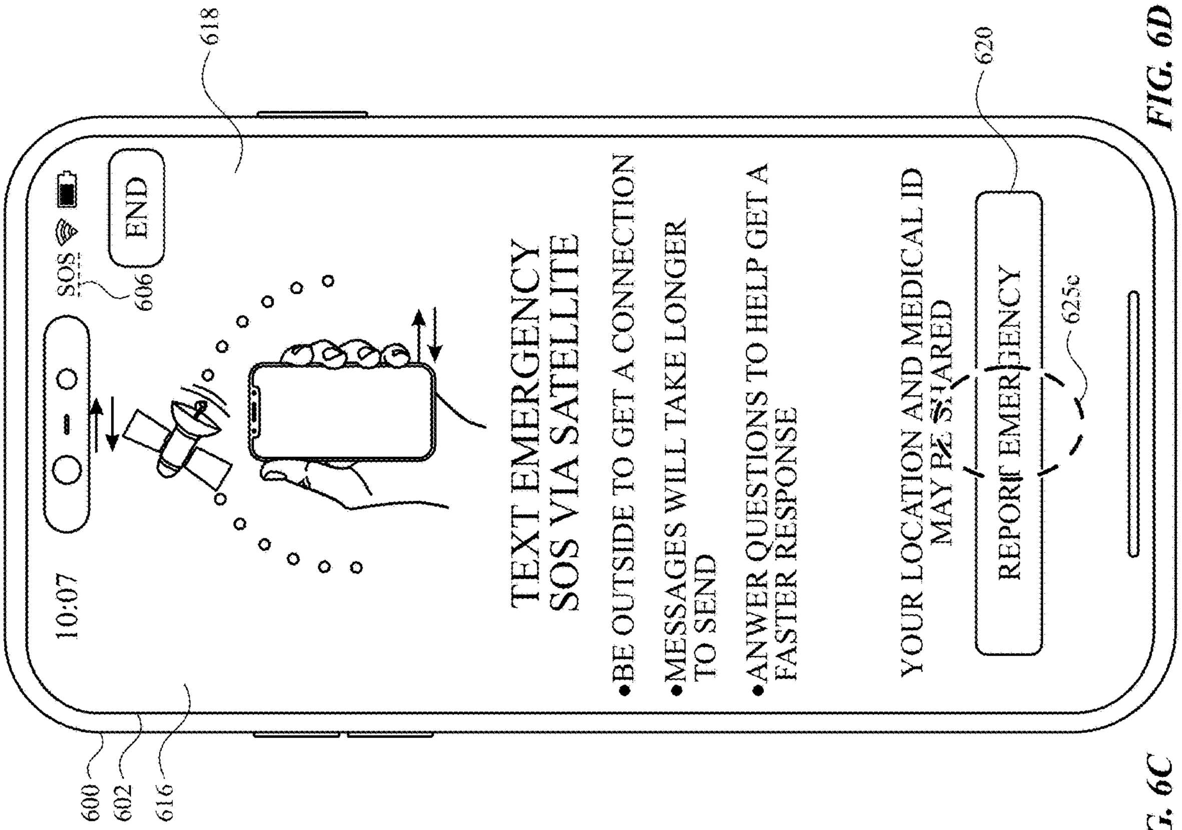
Figure 6C:
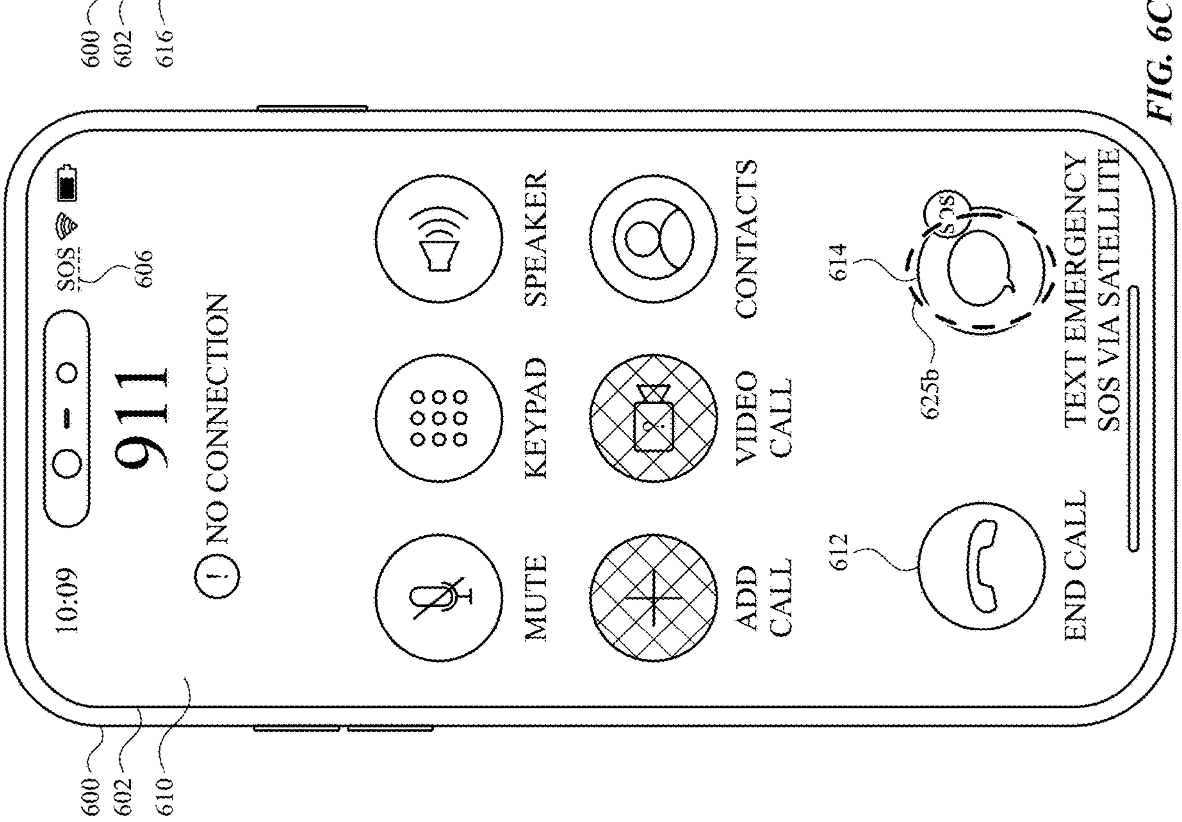
Figure 6F:
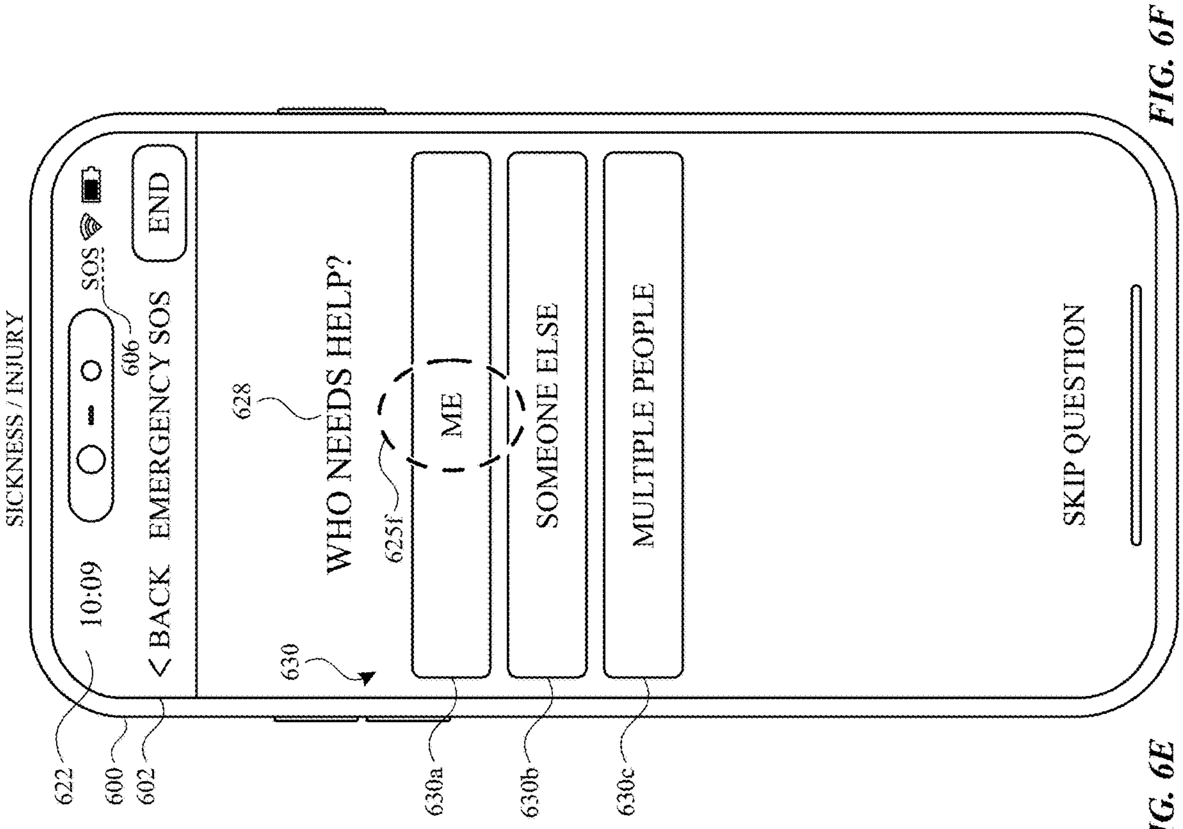
Figure 6E:
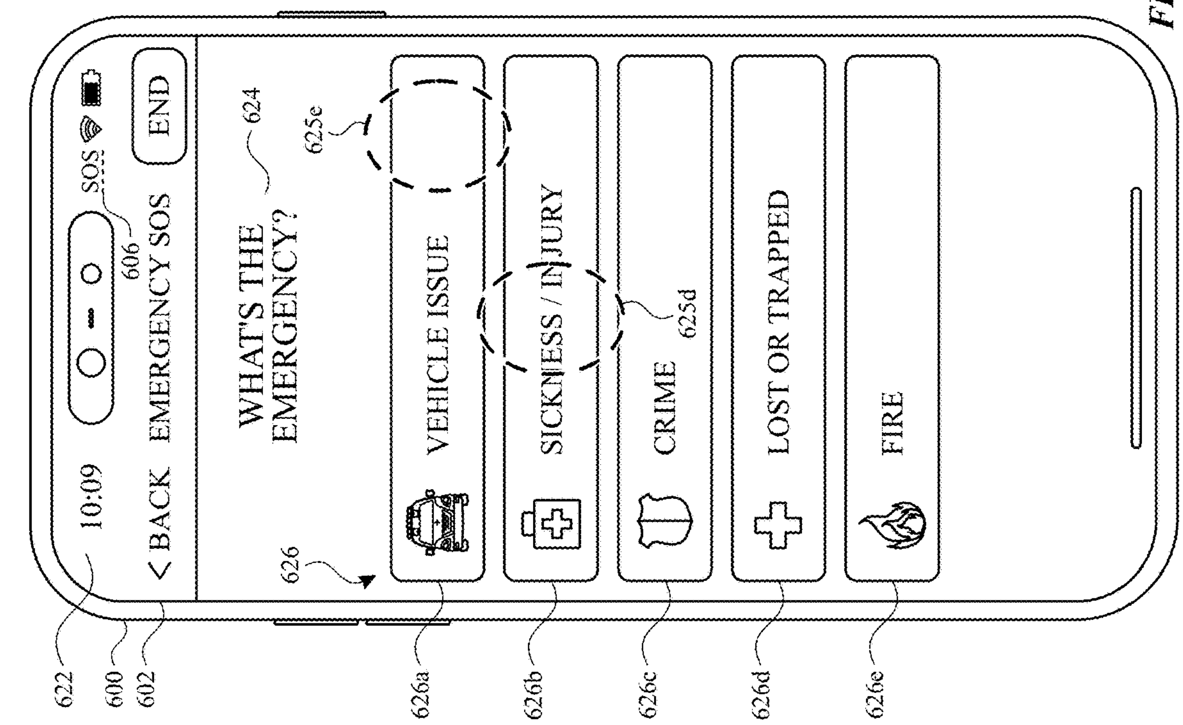

In FIG. 6D, computer system 600 detects input 625*c* (e.g., a tap and/or other input) selecting continue option 620. In response to detecting input 625*c*, computer system 600 displays user interface 622 shown in FIG. 6E. In some embodiments, computer system 600 displays user interface 622 in response to detecting input 625*b* selecting satellite communication option 614 (e.g., without displaying user interface 616 shown in FIG. 6D). User interface 622 includes prompt 624 and answer options 626 related to prompt 624. Prompt 624 poses a questions or request for information. Answer options 626 include selectable responses to prompt 624. In FIG. 6E, for example, prompt 624 poses the question "What's the emergency?" and answer options 626 includes options representing various types of contexts (e.g., emergencies, situations, events, states, and/or circumstances), including vehicle issue option 626*a*, sickness/injury option 626*b*, crime option 626*c*, lost or trapped option 626*d*, and fire option 626*c*.

In FIG. 6E, computer system 600 detects input 625*d* (e.g., a tap and/or other input) selecting an option that does not indicate that roadside assistance is potentially needed and, more specifically, on sickness/input option 626*b*. As shown in FIG. 6F, in response to detecting input 625*d* on sickness/injury option 626*b*, computer system 600 displays prompt 628 and answer options 630 related to the answer option selected in FIG. 6E (e.g., sickness/injury option 626*b*). Prompt 628 asks who is sick or injured (e.g., "Who needs help?") and answer options 630 include me option 630*a*, someone else option 630*b*, and multiple people option 630. In FIG. 6F, computer system 600 detects input 625*f* (e.g., a tap and/or other input) selecting me option 630*a* (e.g., which indicates that a user of computer system 600 is sick and/or injured).

Figure 6H:
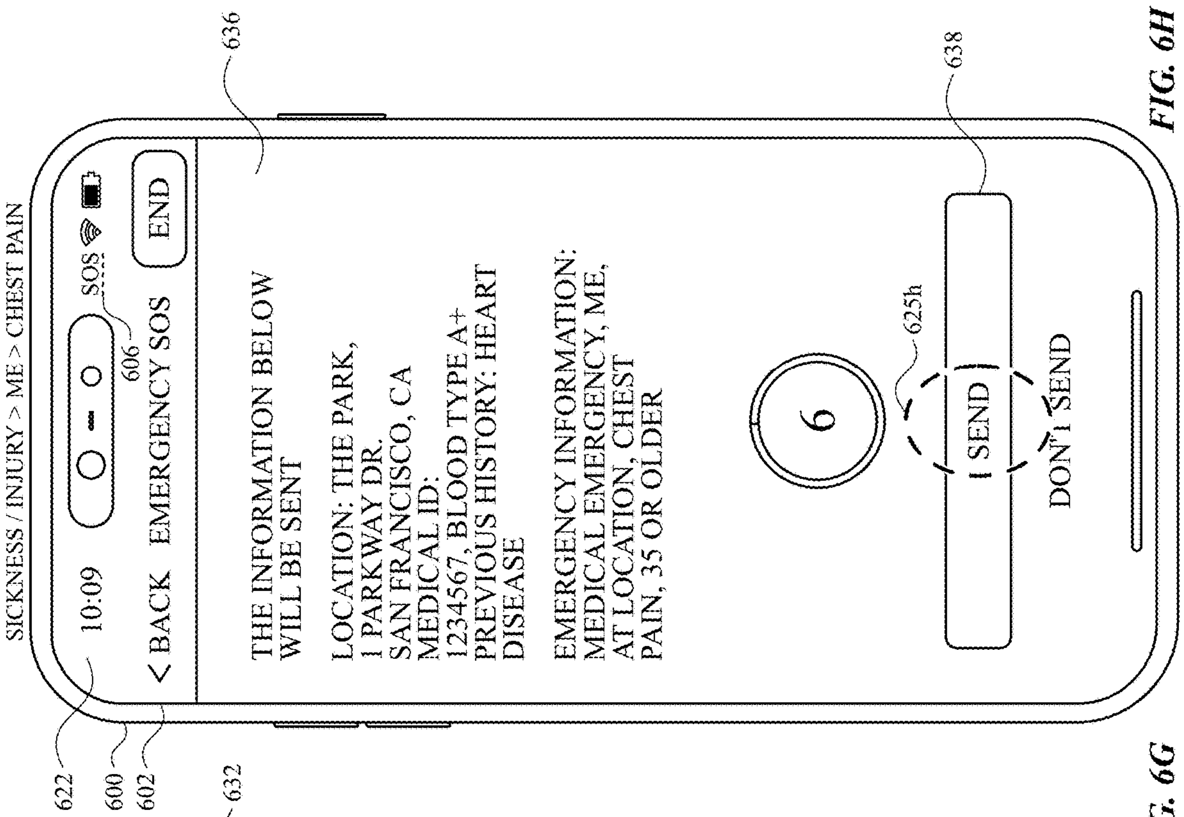
Figure 6G:
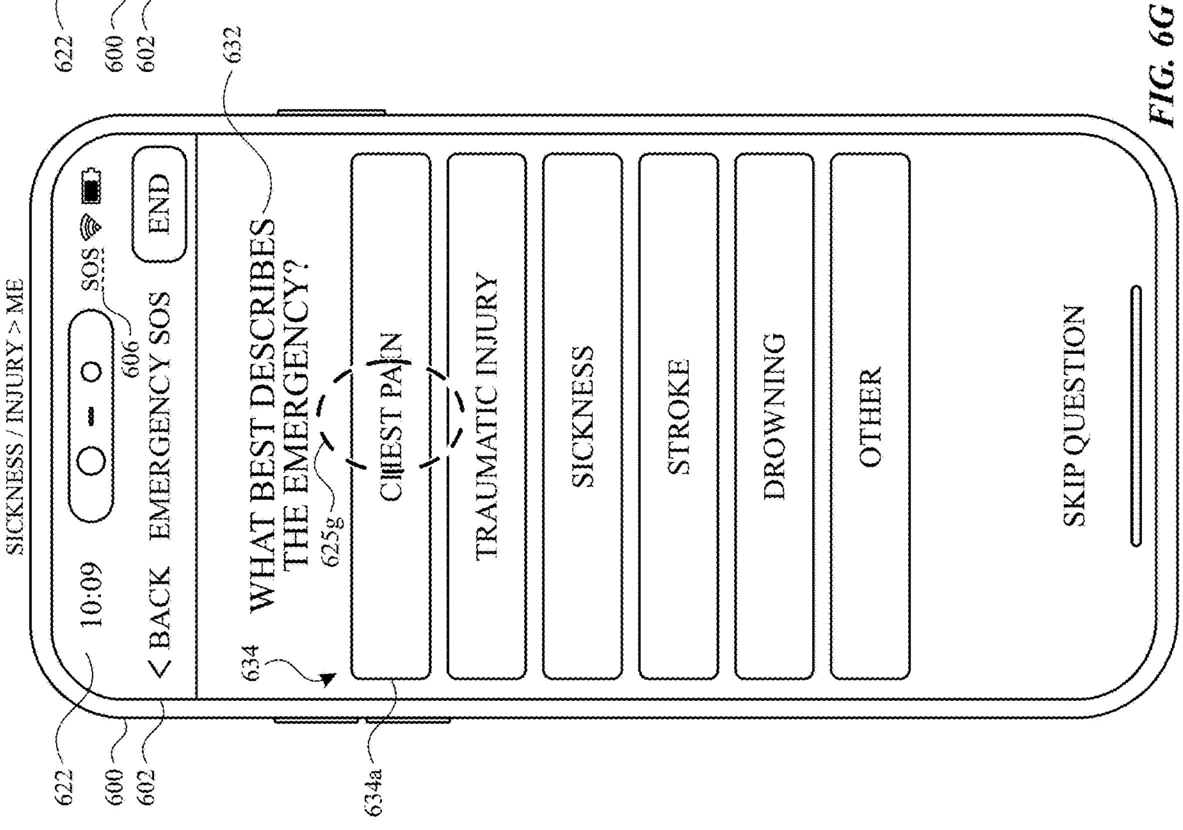

As shown in FIG. 6G, in response to input 625*f* on me option 630*a*, computer system 600 displays prompt 632 and answer options 634 related to a previously selected option (e.g., me option 630*a* and/or sickness/injury option 626*b*). Prompt 632 requests a description about the selected emergency (e.g., about the sickness and/or injury) (e.g., "What best describes the emergency?") and answer options 634 corresponding to various types of sicknesses and/or injuries. In FIG. 6G, computer system 600 detects input 625*g* (e.g., a tap and/or other input) selecting chest pain option 634*a* (e.g., which indicates that the person(s) selected from answer options 630 in FIG. 6F is experiencing chest pain).

In response to detecting input 625*g* selecting chest pain option 634*a*, computer system 600 displays summary 636 of information that will be sent (e.g., to an emergency service) via the satellite communication network, as shown in FIG. 6H. Summary 636 includes location information (e.g., based on a GPS location of computer system 600), medical ID information (e.g., associated with a user of computer system 600), and emergency information that corresponds to the selected answer options (e.g., sickness/injury option 626*b*, me option 630*a*, and chest pain option 634*a*).

Figure 6J:
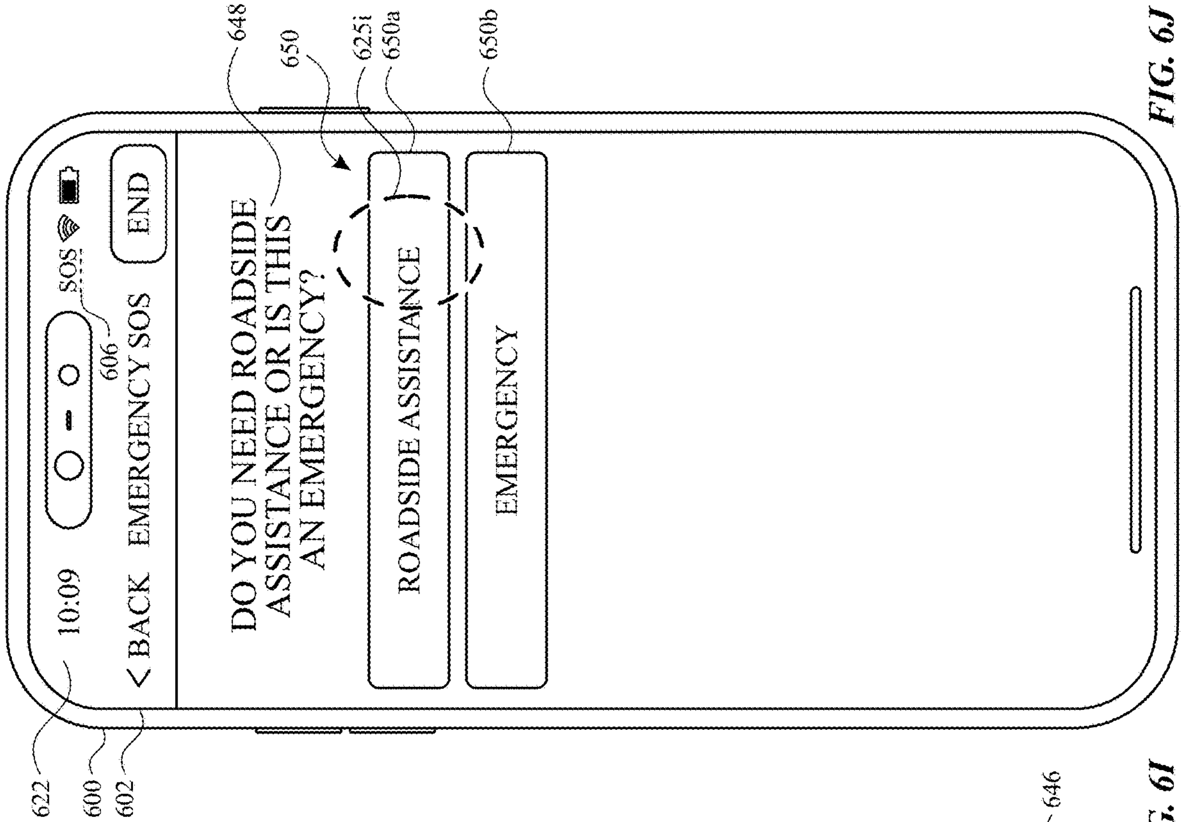
Figure 6I:
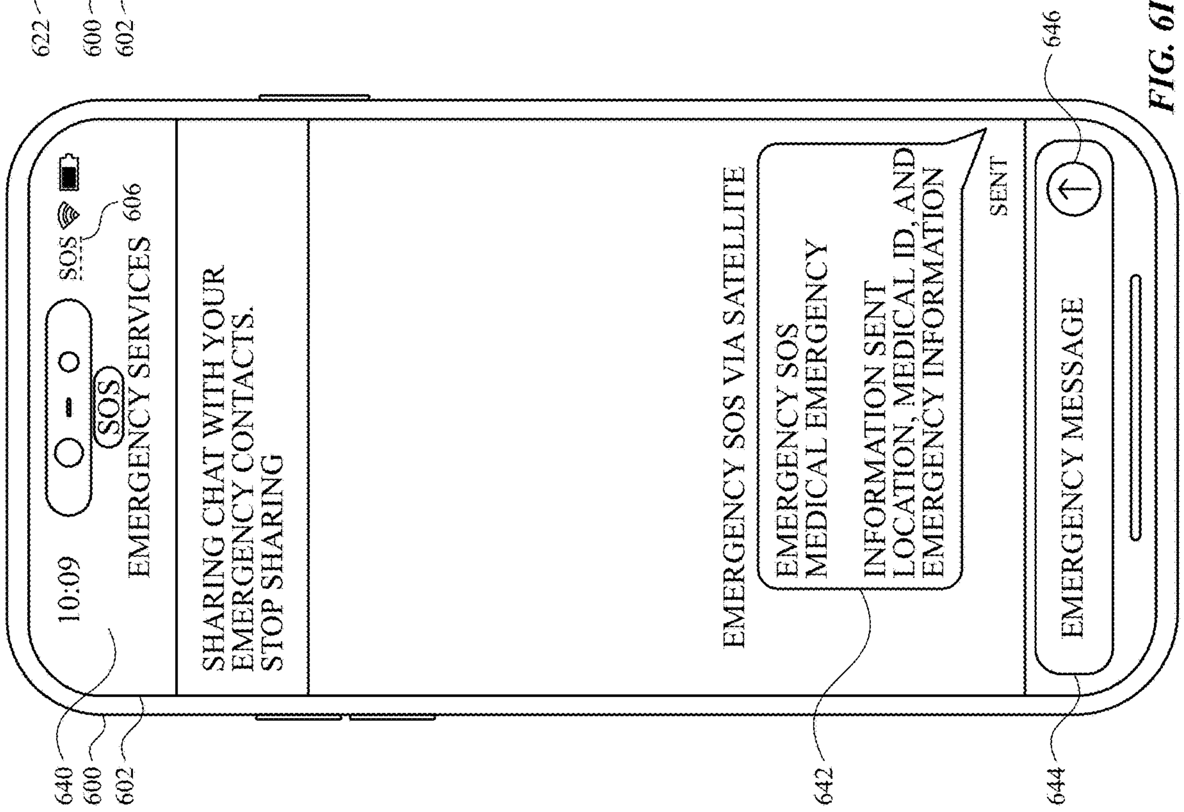

In FIG. 6H, computer system 600 detects input 625*h* (e.g., a tap and/or other input) selecting send option 638. In response to detecting input 625*h* selecting send option 638, computer system 600 sends a text message with the information from summary 636 to an emergency service via the satellite communication network and, in some embodiments, displays messaging user interface 640 as shown in FIG. 6I. Messaging user interface 640 displays a message conversation between the user of computer system 600 and the emergency service, including message 642 sent to the emergency service, text entry field 644 for generating a new message, and send message option 646 for sending a new message to the emergency service.

In some embodiments, such as the embodiment illustrated in FIGS. 6F-6I, when an option in answer options 626 in FIG. 6E is selected that does not indicate that roadside assistance is potentially needed (e.g., sickness/injury option 626*b* does not correspond to a request for roadside assistance), computer system 600 does not provide an option to select a recipient for the message. In some embodiments, options 626*c*-626*e* correspond to options that do not indicate that roadside assistance is potentially needed (e.g., options 626*c*-626*e* do not correspond to requests for roadside assistance).

In some embodiments, computer system 600 provides instructions for aligning and/or connecting computer system 600 with the satellite communication network. For example, in some embodiments, in response to detecting input 625*h* selecting send option 638, if computer system 600 is not aligned and/or connected with the satellite communication network, computer system 600 displays instructions (e.g., text, graphics, and/or animations) for aligning and/or connecting with the satellite communication network. In some embodiments, if computer system 600 is not aligned and/or connected with the satellite communication network when satellite communication option 614 and/or continue option 620 are selected, computer system 600 displays instructions for aligning and/or connecting with the satellite communication network (e.g., prior to displaying the prompts and/or answer options shown and described in FIGS. 6E-6G).

Returning to FIG. 6E, in one example, computer system 600 detects input 625*e* (e.g., a tap and/or other input) selecting vehicle issue option 626*a*. In response to detecting input 625*e* corresponding to selection of vehicle issue option 626*a*, computer system 600 displays confirmation prompt 648 and confirmation options 650, including roadside assistance option 650*a* and emergency option 650*b*. Confirmation prompt 648 asks whether roadside assistance is needed or there is an emergency.

In response to detecting selection of emergency option 650*b*, computer system 600 displays prompts and/or options for generating and/or sending a message to the emergency service (e.g., the same emergency service as in FIG. 6I). In some embodiments, in response to detecting selection of emergency option 650*b*, computer system 600 displays prompts and/or options similar or analogous to the prompts and/or options in FIGS. 6E-6I. For example, in some embodiments, in response to detecting selection of emergency option 650*b*, computer system 600 displays (e.g., re-displays) prompt 624 and/or answer options 626, except that selection (e.g., re-selection) of vehicle issue option 626*a* causes computer system 600 to provide prompts and/or answer options related to a vehicle issue emergency. In some embodiments, the prompts related to the vehicle issue emergency include, e.g., prompt 628 and prompt 632, and/or a prompt to indicate whether a user is at a location of an incident. In some embodiments, the answer options related to the vehicle issue emergency include, e.g.: answer options 630 (e.g., related to a prompt for who needs help, such as prompt 628); an option indicating a vehicle crash, an option indicating a boat emergency, and/or an option indicating a plane emergency (e.g., related to a prompt to further describe the emergency, such as prompt 632); and/or options indicating whether the user of computer system 600 is at the location of an incident (e.g., related to a prompt to indicate whether a user is at a location of an incident).

Figure 6L:
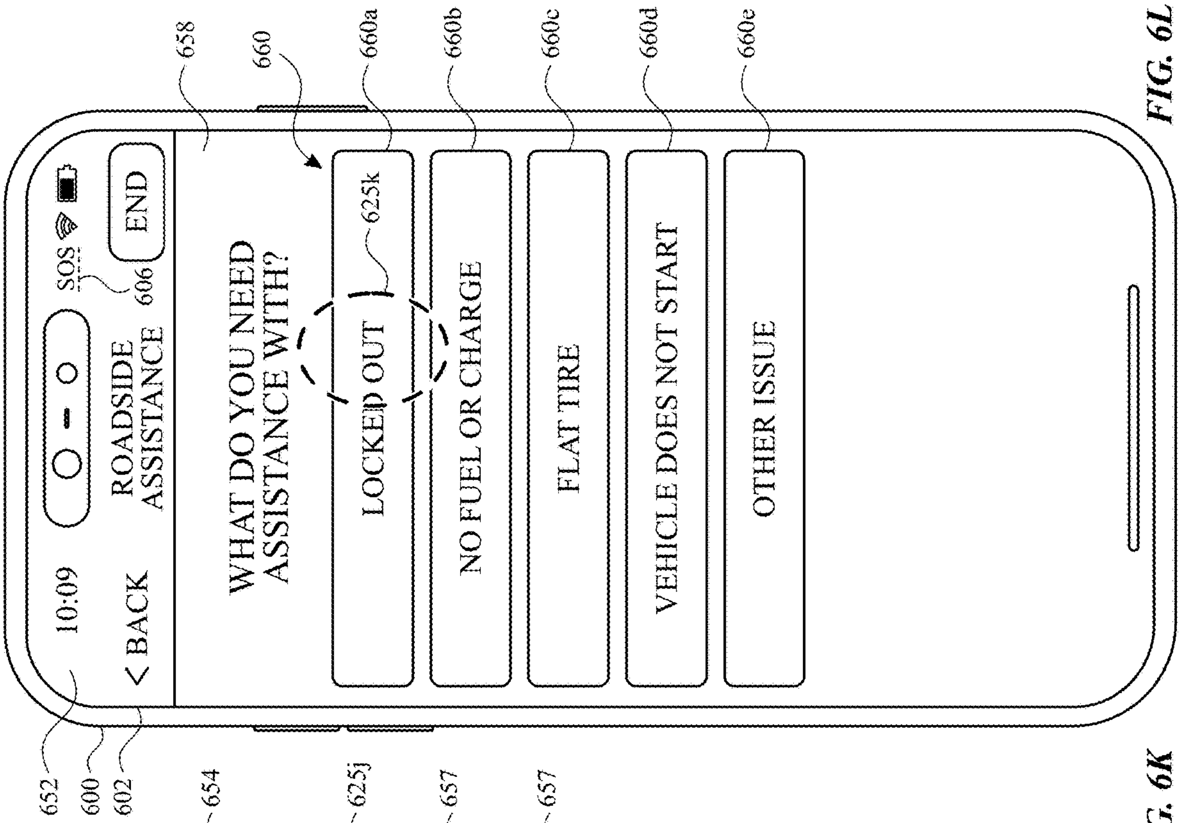
Figure 6K:
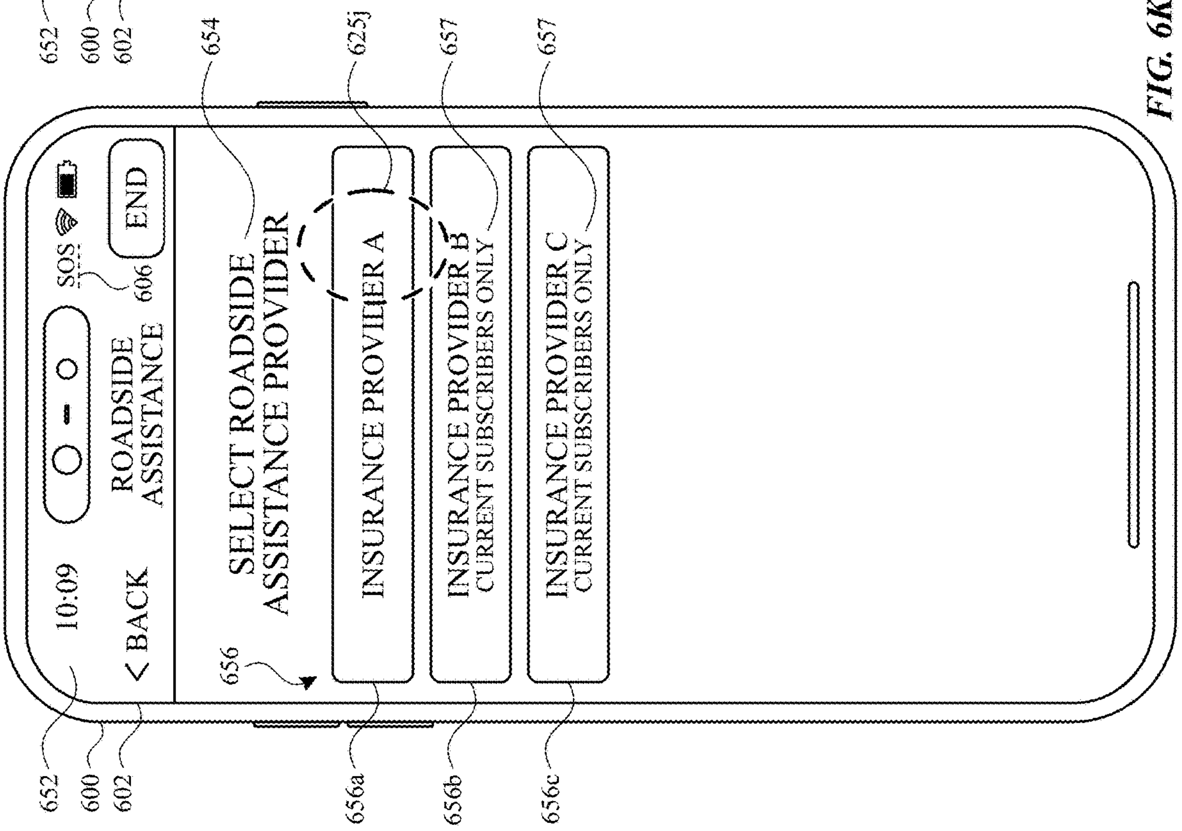
Figure 6N:
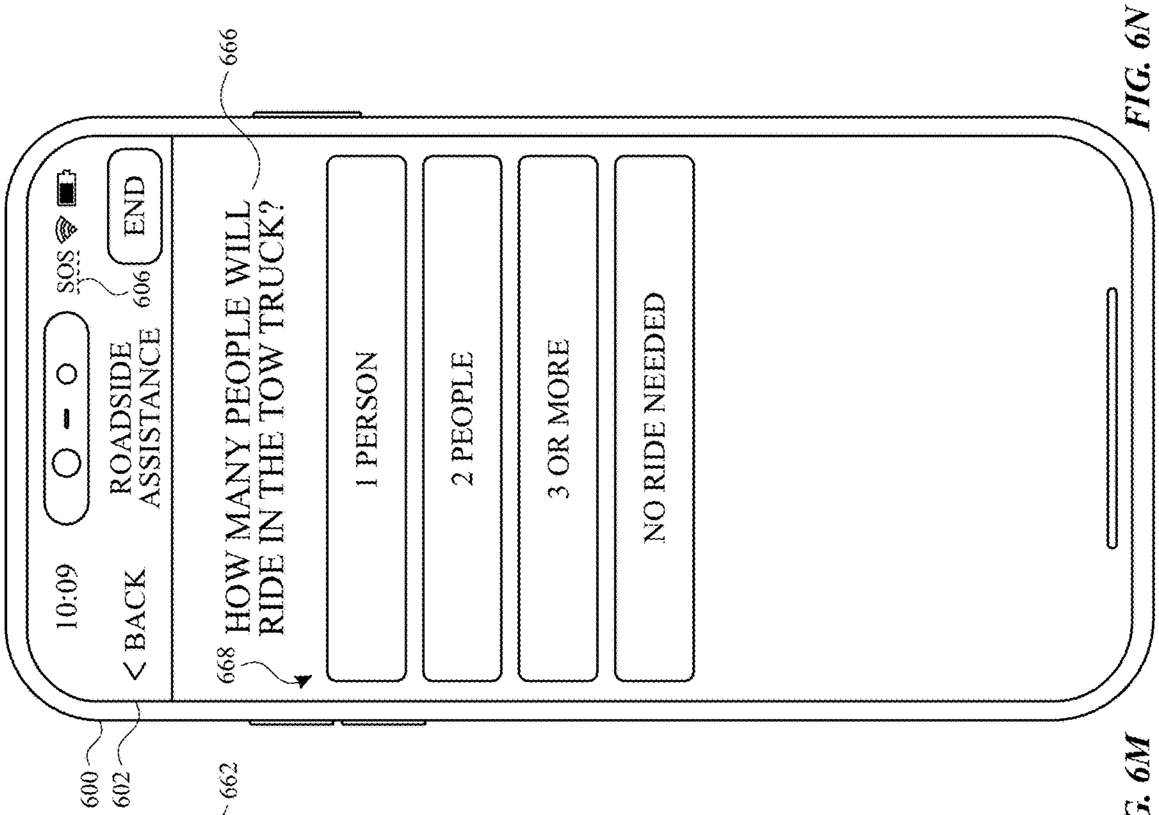

In response to detecting selection of roadside assistance option 650*a*, computer system 600 displays options for selecting a recipient for a message to be sent via the satellite communication network. For example, in response to detecting input 625*i* (e.g., a tap and/or other input) selecting roadside assistance option 650*a*, computer system 600 displays recipient options 656 and prompt 654 to select a provider in roadside assistance user interface 652, as shown in FIG. 6K. In some embodiments, recipient options 656 correspond to respective insurance providers (e.g., insurance companies that provide roadside assistance services) or other companies that provide roadside assistance services.

In some embodiments, a roadside assistance provider may require a subscription, account, or other authorization to receive services from the provider. In FIG. 6K, indicator 657 indicates that insurance provider B associated with recipient option 656*b* and insurance provider C associated with recipient option 656*c* provide roadside assistance for current subscribers only.

In FIG. 6K, computer system 600 detects input 625*j* (e.g., a tap and/or other input) selecting recipient option 656*a* corresponding to insurance provider A. As shown in FIG. 6L, in response to detecting selection of a recipient (e.g., detecting input 625*j*), computer system 600 displays prompt 658 and answer options 660 related to a vehicle issue. Prompt 658 requests a description of the issue (e.g., "What do you need assistance with?"). Answer options 660 correspond to respective answers to the request of prompt 658. In some embodiments, prompt 658 and/or answer options 660 are based on the recipient (e.g., roadside assistance provider) selected in FIG. 6K (e.g., computer system 600 displays different prompts and/or answer options for different providers).

Figure 6M:
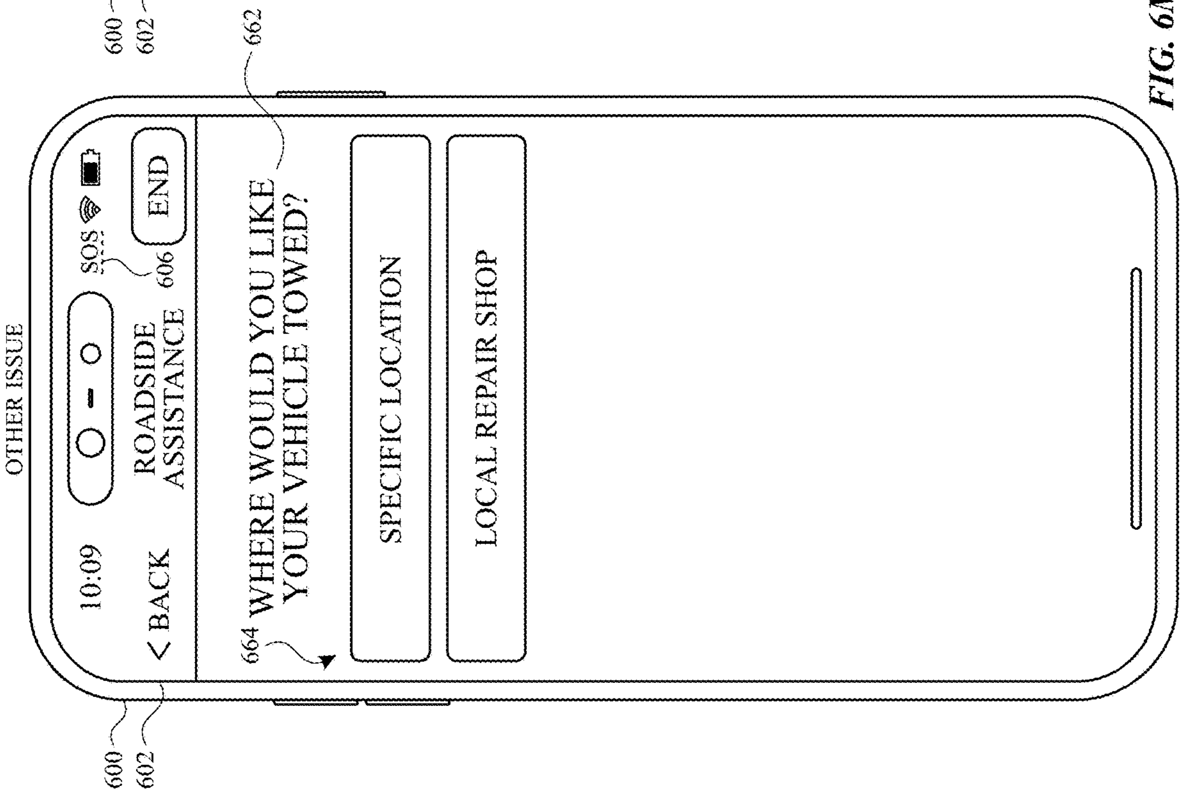
Figure 6O:
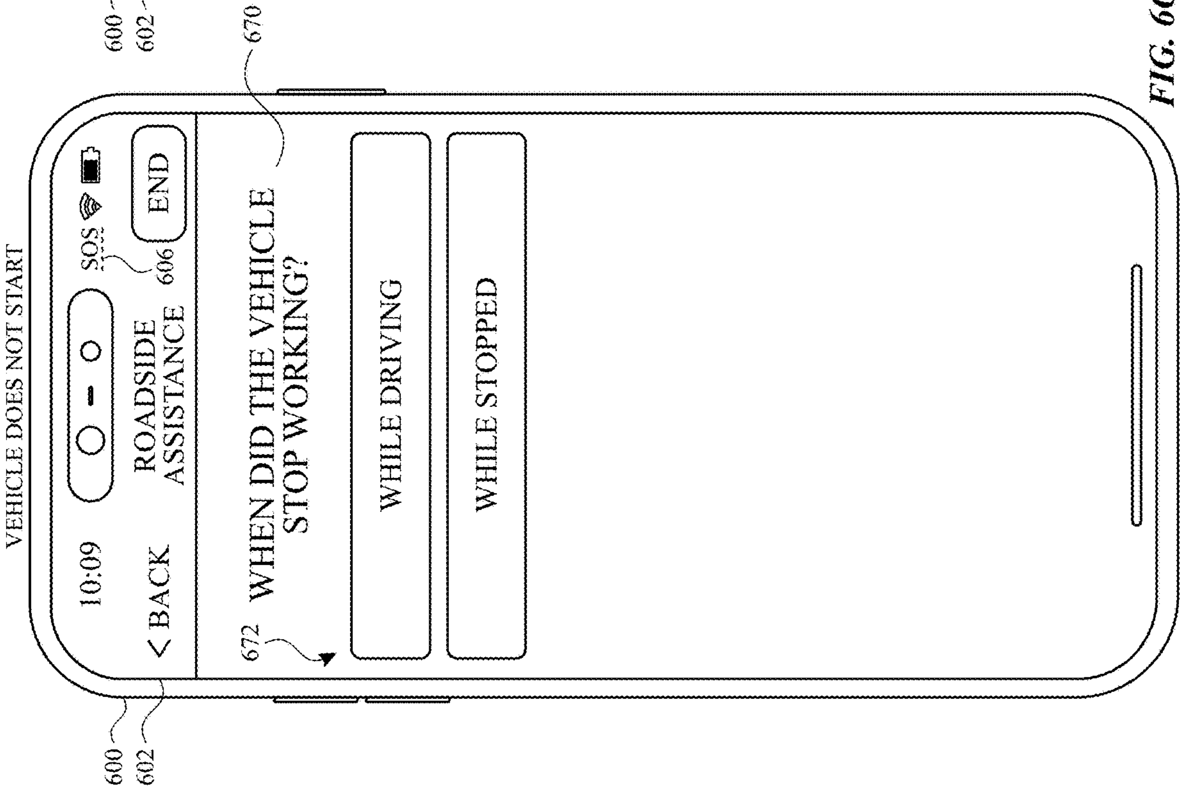

In response to detecting an input (e.g., a tap and/or other input) selecting other issue option 660*c*, computer system 600 displays towing prompt 662 (e.g., "Where would you like your vehicle towed?") and tow location options 664 (e.g., an option to specify a specific location and/or an option to select a local repair shop), as shown in FIG. 6M. After a towing location is selected (e.g., by detecting an input (e.g., a tap and/or other input) selecting one of answer options 664), computer system 600 displays prompt 666 (e.g., "How many people will ride in the tow truck?") and answer options 668 for specifying how many people will ride in the tow truck.

In response to detecting an input (e.g., a tap and/or other input) selecting vehicle does not start option 660*d*, computer system 600 displays prompt 670 (e.g., "When did the vehicle stop working?") and time options 672 (e.g., while driving and/or while stopped) for specifying when the vehicle stopped working, as shown in FIG. 60.

Figure 6P:
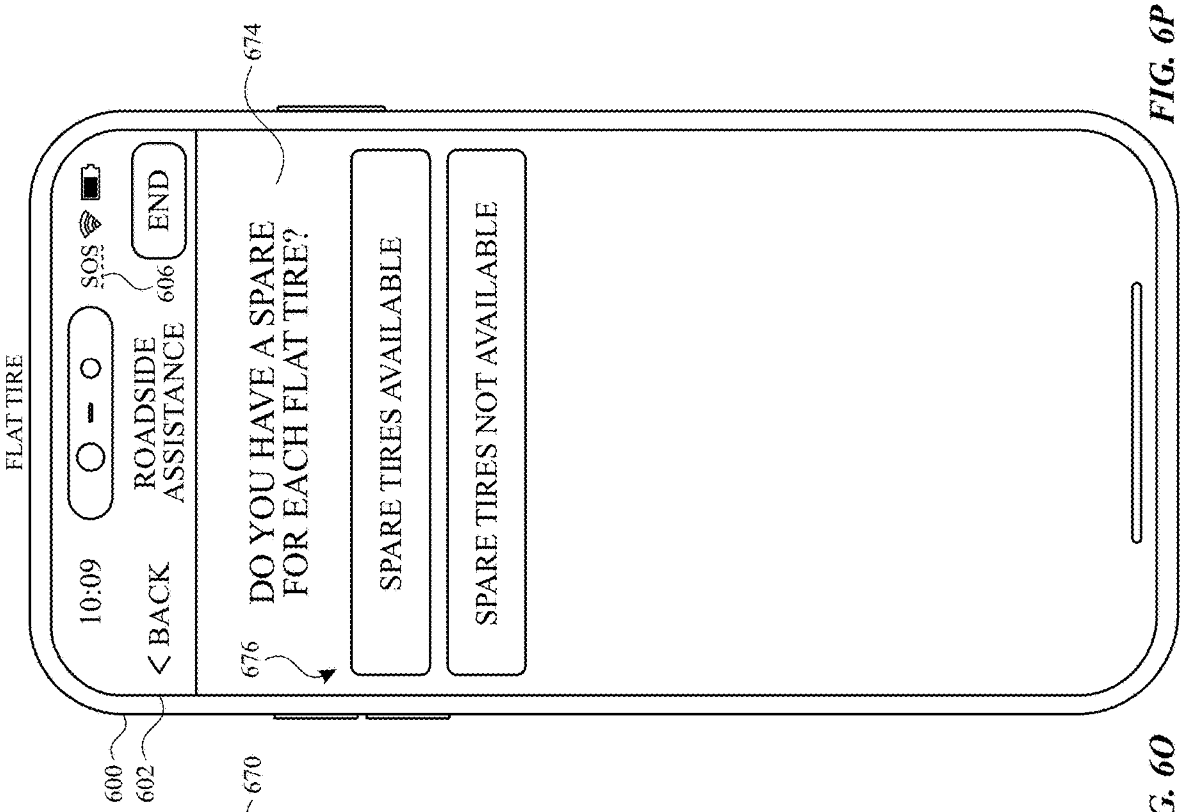

In response to detecting an input (e.g., a tap and/or other input) selecting flat tire option 660*c*, computer system 600 displays prompt 674 (e.g., "Do you have a spare for each flat tire?") and spare tire availability options 676 (e.g., spare tires available and/or spare tires not available) for specifying whether a spare tire is available for each flat tire, as shown in FIG. 6P.

Figure 6Q:
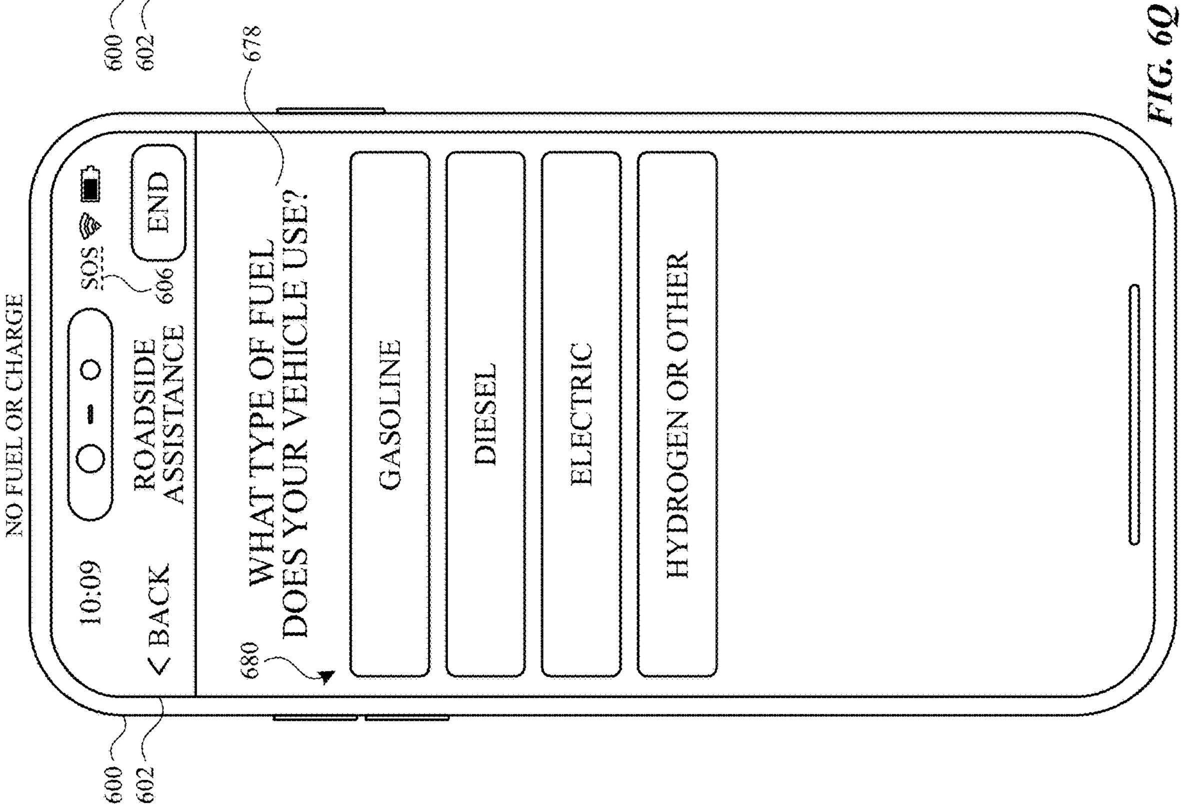

In response to detecting an input (e.g., a tap and/or other input) selecting no fuel or charge option 660*b*, computer system 600 displays prompt 678 (e.g., "What type of fuel does your vehicle use?") and fuel type options 680 (e.g., gasoline, diesel, electric, and/or hydrogen or other) for specifying a type of fuel, as shown in FIG. 6Q.

Figure 6R:
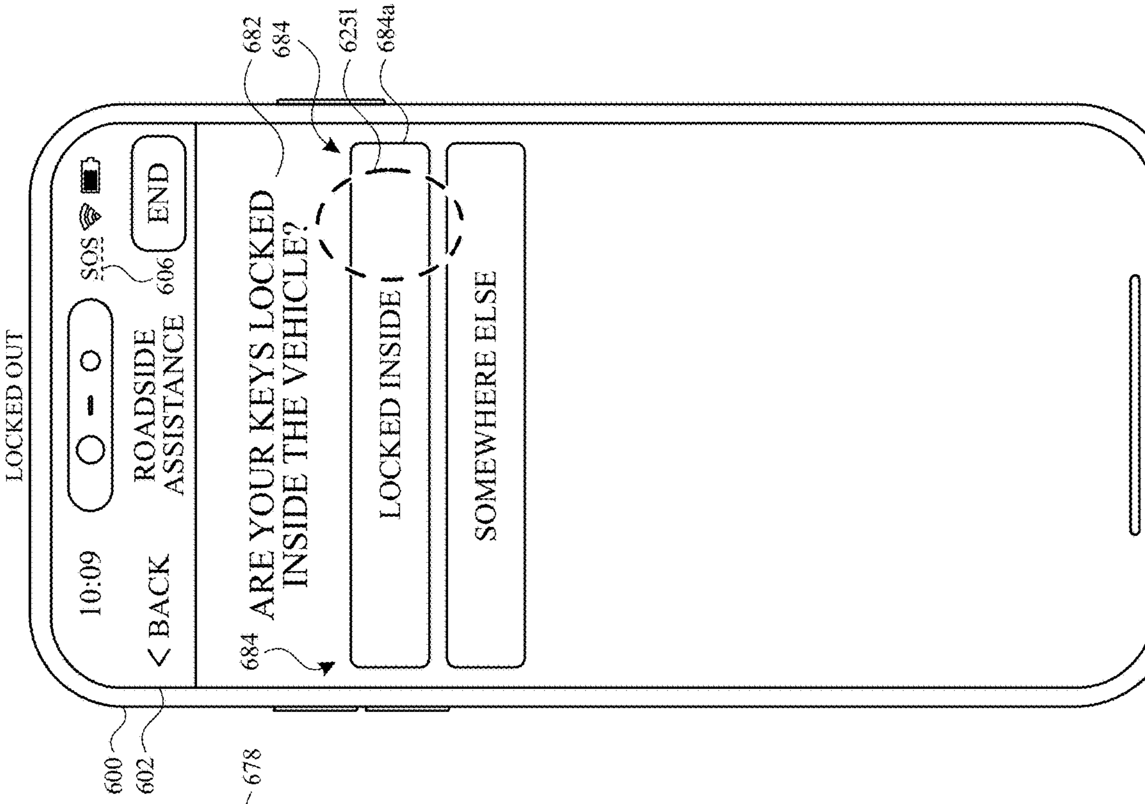

In the embodiment illustrated in FIG. 6L, computer system 600 detects input 625*k* (e.g., a tap and/or other input) selecting locked out option 660*a*. In response to detecting input 625*k*, computer system 600 displays prompt 682 (e.g., "Are your keys locked inside the vehicle?") and key location options 680 (e.g., locked inside and/or somewhere else) for specifying a location of a key for a vehicle, as shown in FIG. 6R. In FIG. 6R, computer system 600 detects input 625*i* (e.g., a tap and/or other input) selecting locked inside option 684*a*.

Figure 6T:
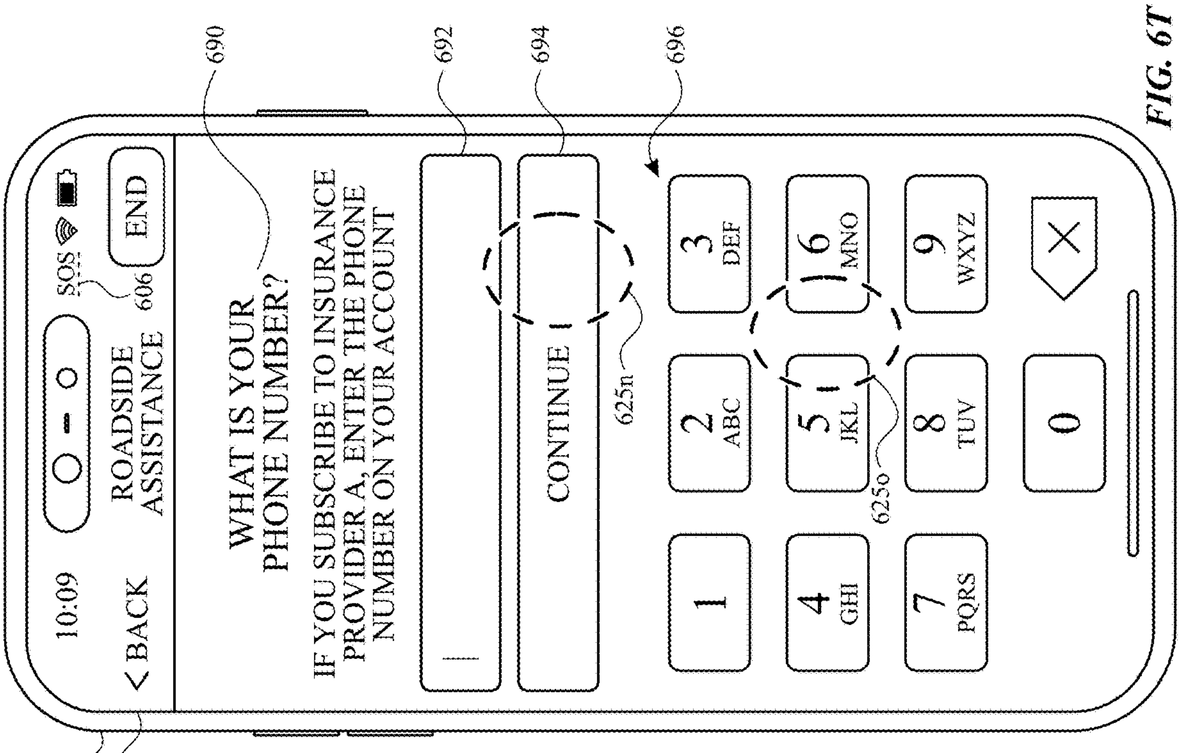
Figure 6S:
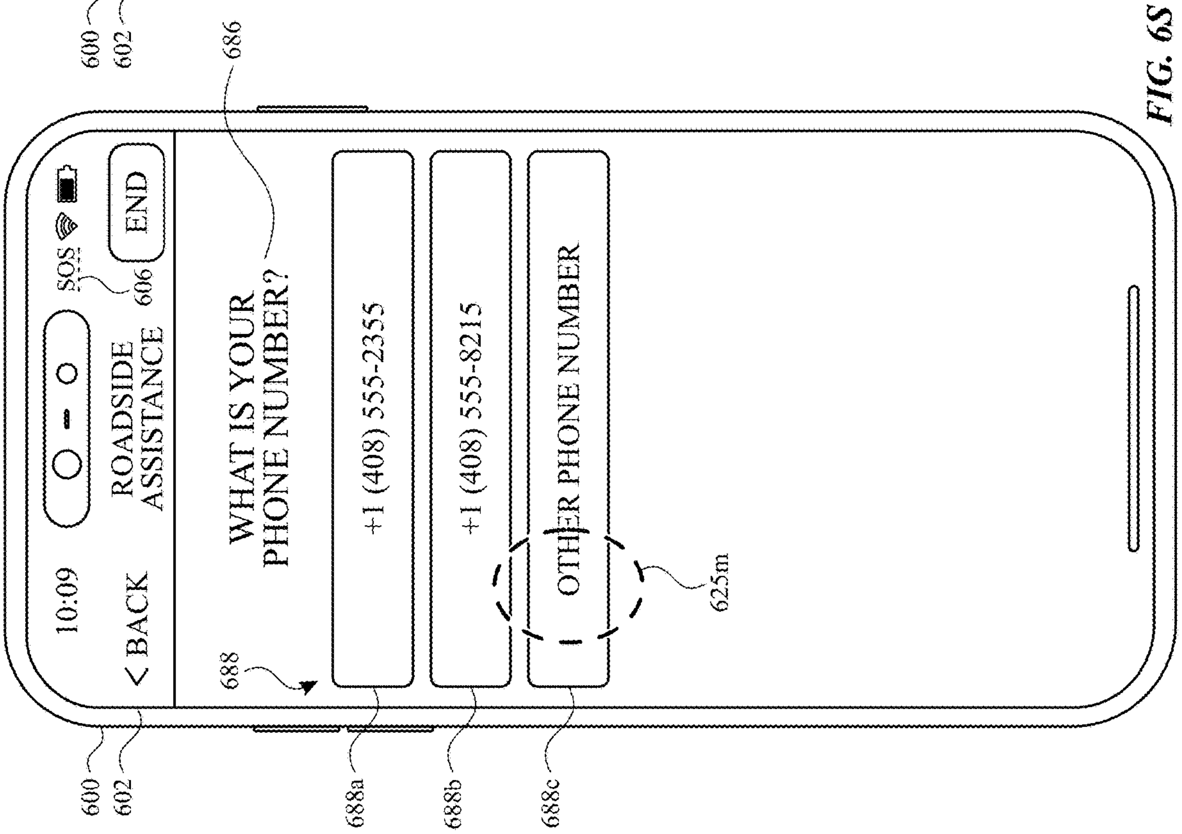

In some embodiments, computer system 600 and/or a roadside assistance provider (e.g., the provider selected in FIG. 6K) uses (e.g., requires) a phone number to identify the user that is requesting assistance, verify an account of the user, and/or authenticate that the user has an account with the selected provider. In some embodiments, computer system 600 provides a user interface and/or options for selecting and/or entering a phone number after selecting a recipient (e.g., in response to detecting input 625*j* in FIG. 6K) and/or after providing information about the vehicle issue (e.g., after displaying one or more of the user interfaces, prompts, and/or options shown in FIGS. 6L-6R). For example, in FIG. 6S, computer system 600 displays phone number prompt 686 ("What is your phone number?") and phone number options 688 for specifying a phone number. Phone number options 688 include pre-populated phone number options 688*a* and 688*b* and other phone number option 688*c* for manually entering a phone number. In FIG. 6S, computer system 600 detects input 625*m* (e.g., a tap and/or other input) selecting other phone number option 688*c*. In response to detecting input 625*m* selecting other phone number option 688*c*, computer system 600 displays prompt 690 (e.g., "What is your phone number?), number entry field 692, continue option 694, and keypad 696. A user can enter a phone number in number entry field 692 via one or more inputs 6250 on keypad 696 and submit the phone number via input 625*n* selecting continue option 694.

After a recipient (e.g., a provider) has been selected (e.g., in FIG. 6K), information about the vehicle issue has been selected (e.g., in FIGS. 6L-6R), and/or, optionally, an account of the user has been verified (e.g., by providing a phone number in FIG. 6S and/or FIG. 6T), computer system 600 displays a summary of the information that will be sent to the selected recipient via the satellite communication network (e.g., similar to summary 636 in FIG. 6H). For example, in FIG. 6U, computer system 600 displays summary 698, which indicates that a message will be sent to the selected recipient (e.g., Insurance Provider A) and that the message will include a location (e.g., a GPS location of computer system 600) and the information about the vehicle issue that was selected by the user. For example, because locked out option 660*a* and locked inside option 684*a* were selected in the embodiment illustrated in FIGS. 6L-6R, the information about the vehicle issue in summary 698 includes that the user is locked out of the vehicle and that the keys are locked inside the vehicle.

Figure 6V:
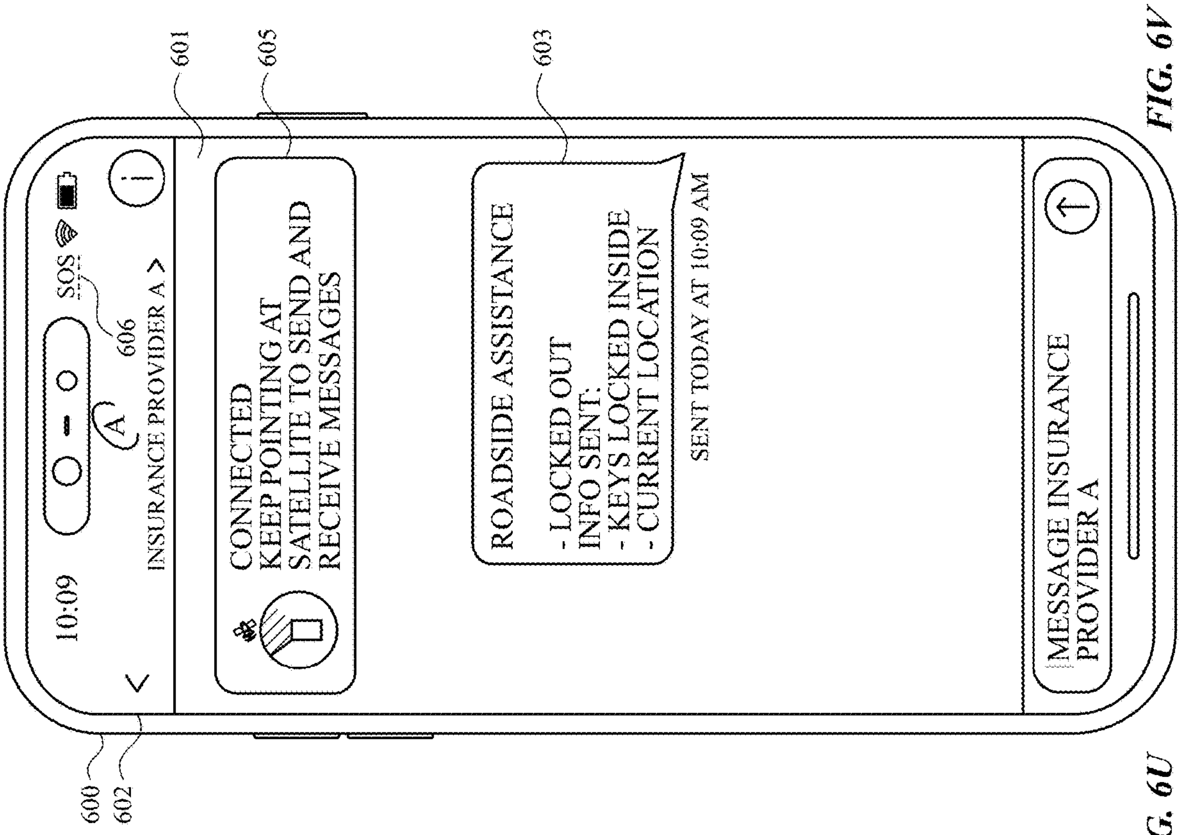
Figure 6U:
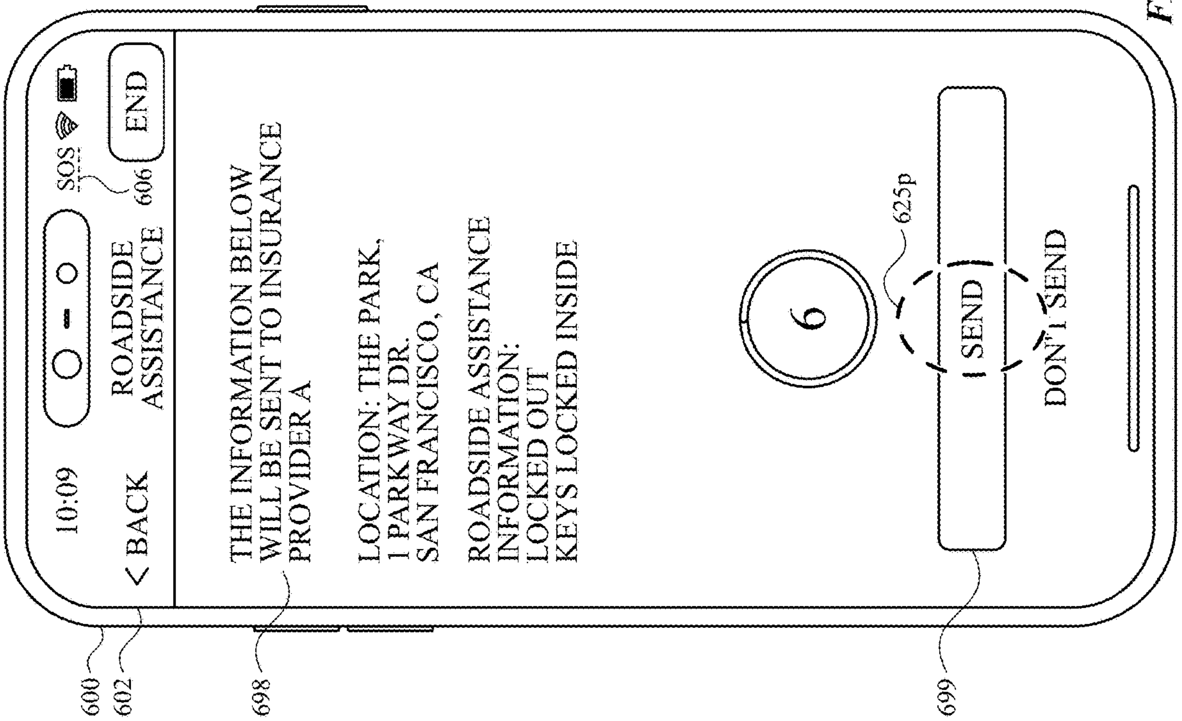

In FIG. 6U, computer system 600 detects input 625*p* (e.g., a tap and/or other input) selecting send option 699. In response to detecting input 625*p* selecting send option 699, computer system sends a message via the satellite communication network to the selected recipient with the information in summary 698 and, optionally, displays a user interface of a messaging application. For example, in response to detecting input 625*p* selecting send option 699, computer system 600 displays messaging user interface 601 shown in FIG. 6V. Messaging user interface 601 displays a message conversation between the user of computer system 600 and the selected recipient, including message 603 that was sent via the satellite communication network (e.g., in response to detecting input 625*p* selecting send option 699).

Because message 603 was sent via the satellite communication network (e.g., a satellite communication session between the user of computer system 600 and the selected provider is active), computer system 600 displays satellite connection status element 605. Satellite connection status element 605 indicates that computer system 600 is connected to the satellite communication network and includes instructions to keep pointing computer system 600 at a satellite to send and receive messages. In some embodiments, satellite connection status element 605 is updated when the connection status changes. For example, if computer system 600 becomes misaligned and/or loses connection with the satellite communication network, computer system 600 updates satellite connection status element 605 to indicate that computer system 600 is not connected to the satellite communication network and/or to display instructions for aligning computer system 600 with a satellite (e.g., turn left, turn right, go outside, and/or point computer system 600 up). In some embodiments, computer system 600 displays satellite connection status indicator 605 in messaging user interface 640 shown in FIG. 6I.

Figure 6W:
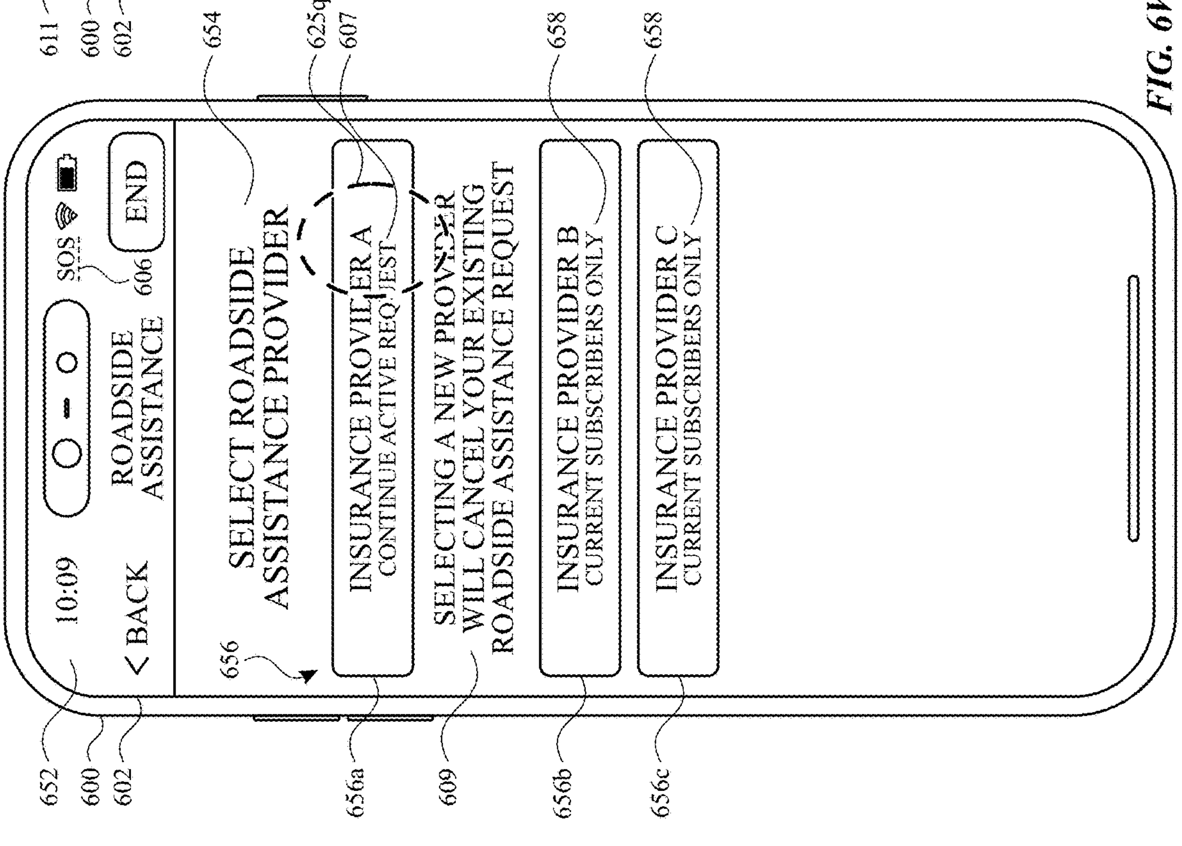

Turning to FIG. 6W, in some embodiments, if a request for roadside assistance is active on computer system 600 (e.g., if computer system 600 is in an active satellite communication session with a roadside assistance provider), computer system 600 displays recipient options 656 in a different manner than when a request for roadside assistance is not active on computer system 600. For example, if a request for roadside assistance is made (e.g., via input 625*e* in FIG. 6E or input 625*i* in FIG. 6J) while computer system 600 is in an active roadside assistance session with insurance provider A, computer system 600 displays recipient options 656 as shown in FIG. 6W (e.g., as opposed to as shown in FIG. 6K). In FIG. 6W, recipient option 656*a* corresponding to insurance provider A is separated from recipient option 656*b* and recipient option 656*b* by notification 609, which indicates that selecting a new provider (e.g., by selecting recipient option 656*b* and/or recipient option 656*c*) will cancel the existing roadside assistance request and initiate a new request with the newly selected recipient. Because an existing roadside assistance request is active on computer system 600, computer system 600 displays indication 607 (e.g., "Continue active request") that there is an active request for roadside assistance insurance provider and that selecting recipient option 656*a* will continue the active request. In response to detecting input 625*q* (e.g., a tap and/or other input) selecting recipient option 656*a* in FIG. 6W, computer system 600 displays messaging user interface 601 (e.g., as described in FIG. 6V).

Figure 6X:
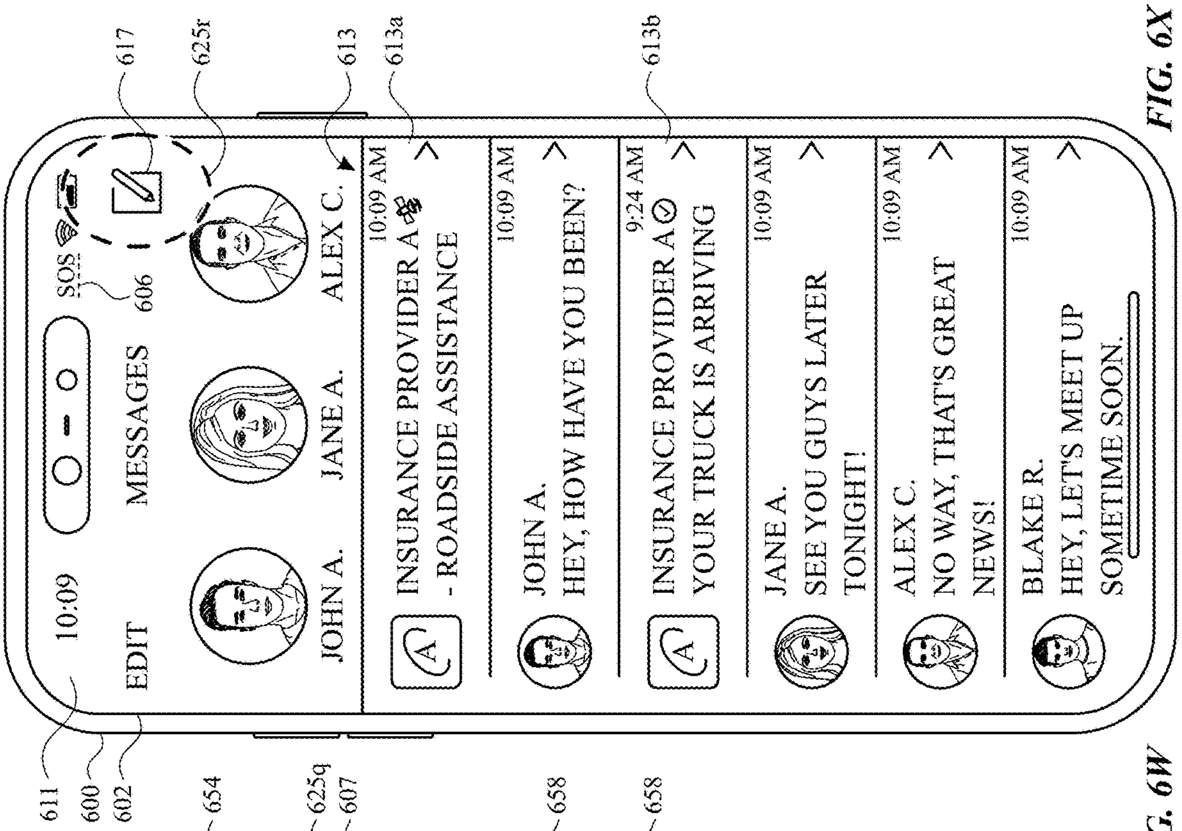

Turning to FIG. 6X, computer system 600 displays user interface 611 of a messaging application. User interface 611 includes list 613 of message conversations. List 613 includes representation 613*a* of a message conversation with insurance provider A performed via a satellite communication network and representation 613*b* of a message conversation with insurance provider A performed via a terrestrial (e.g., cellular) communication network. In some embodiments, the message conversations represented by representation 613*a* and representation 613*b* are represented (e.g., combined) as a single message conversation (e.g., despite being performed using different communication networks).

Figure 6Z:
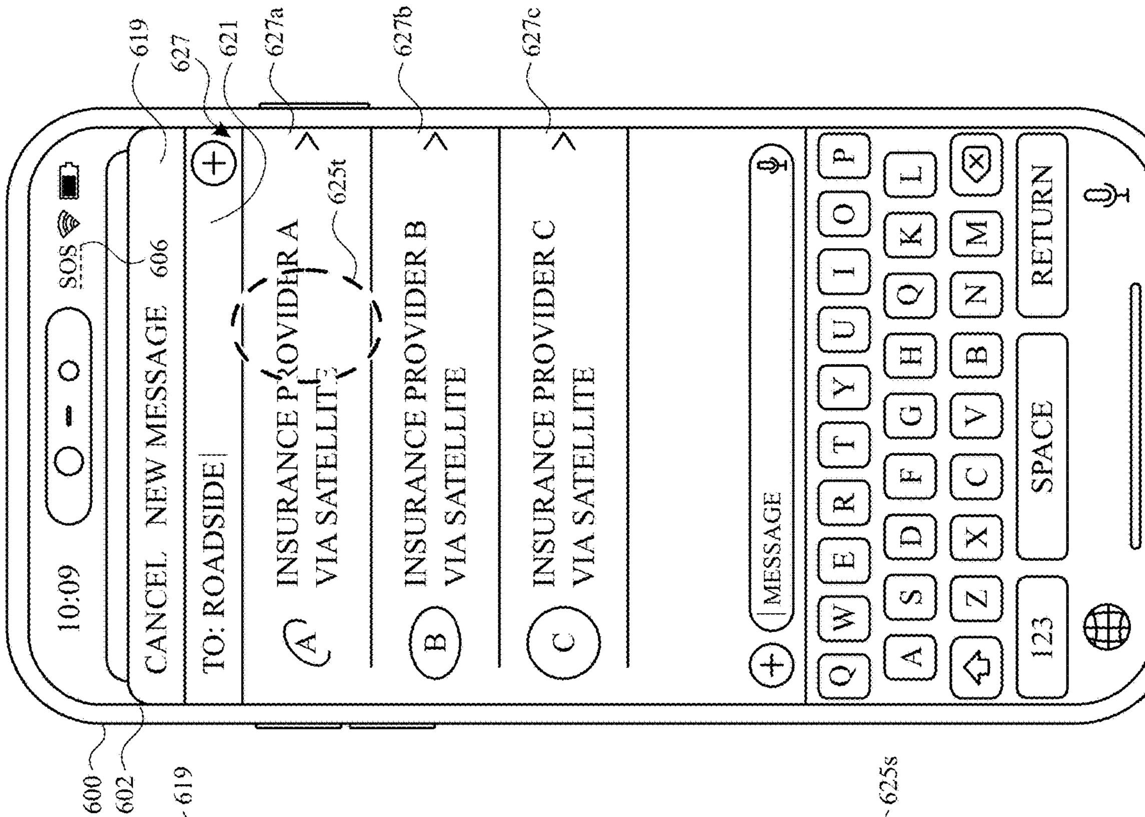
Figure 6Y:
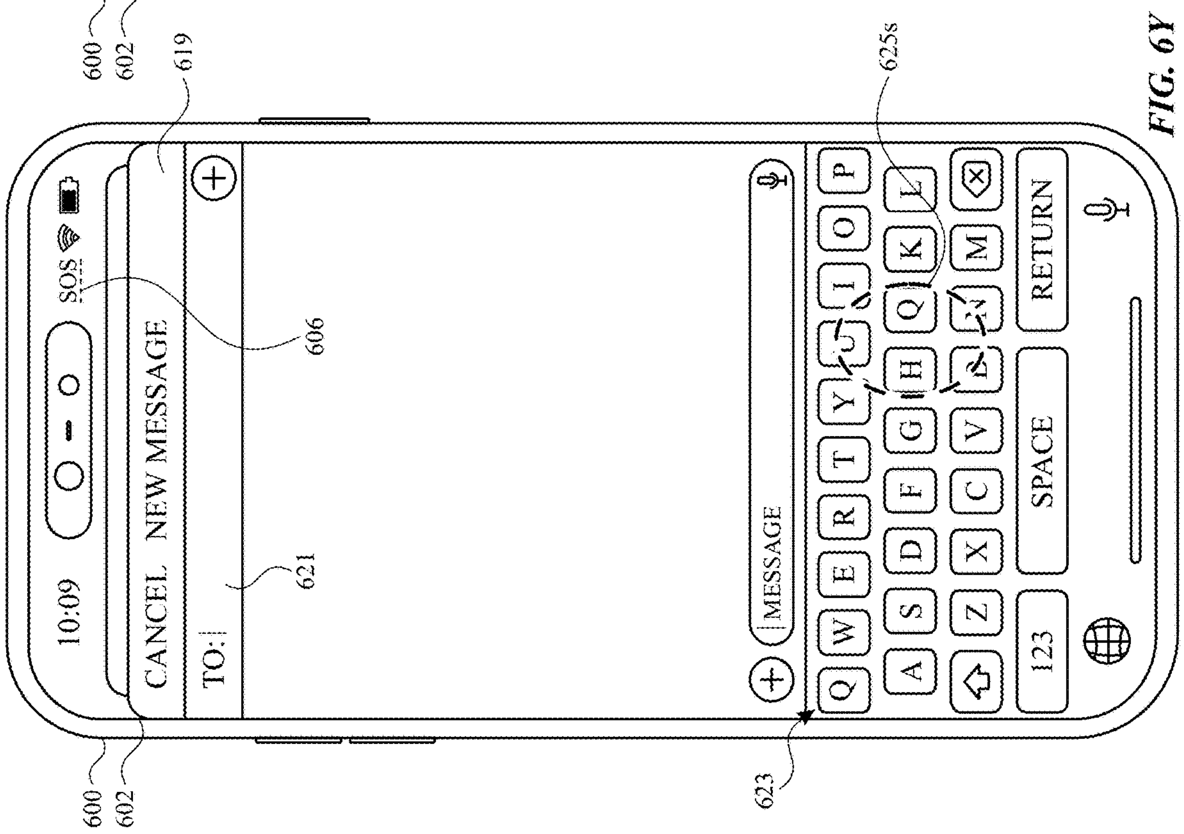
Figure 6A:
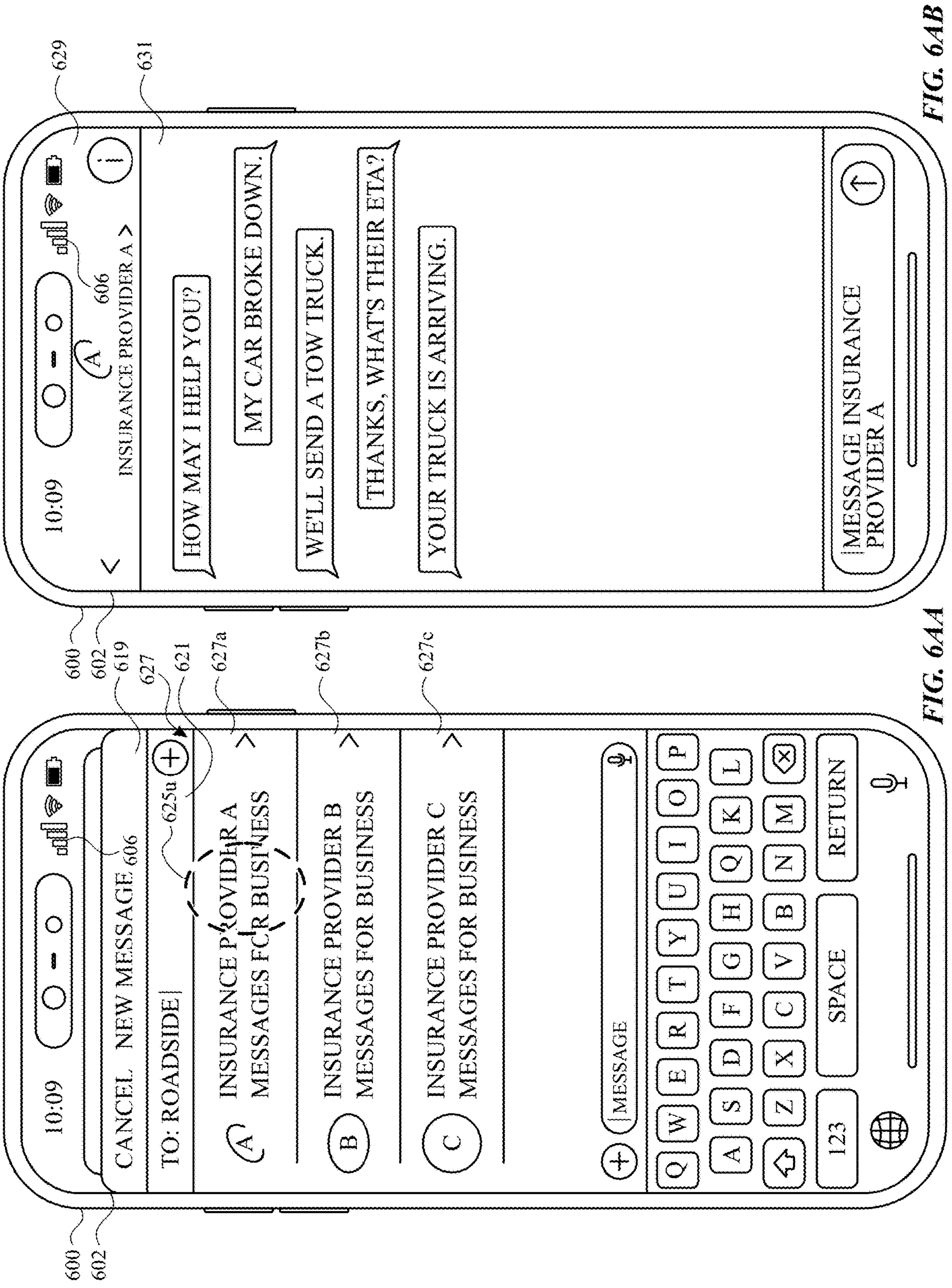

In FIG. 6X, computer system 600 detects input 625*r* (e.g., a tap and/or other input) selecting new message option 617. In response to detecting input 625*r* selecting new message option 617, computer system 600 displays new message user interface 619 shown in FIG. 6Y. In FIG. 6Y, computer system 600 detects a set of one or more inputs 625*s* on keyboard 623 to enter the term "Roadside" into recipient field 621, as shown in FIG. 6Z. Because "Roadside" is a predefined term, computer system 600 displays list 627 of roadside assistance providers as potential recipients. List 627 includes representation 627*a* corresponding to insurance provider A, representation 627*b* corresponding to insurance provider B, and representation 627*c* corresponding to insurance provider C. Because computer system does not have cellular service, but is capable of communicating via a satellite communication network (e.g., as indicated by network status indicator 606 in FIG. 6Z), representations 627*a*-627*c* include an indication that a message can be sent to the corresponding providers via satellite. In some embodiments, representation 627*b* and/or representation 627*c* include indicator 657 described above with reference to FIG. 6K. In response to detecting input 625*t* (e.g., a tap and/or other input) selecting representation 627*a* corresponding to insurance provider A, computer system 600 initiates a process for generating and/or sending a message to insurance provider A via a satellite communication network. For example, in response to detecting input 625*t* selecting representation 627*a* in FIG. 6Z, computer system 600 displays user interface 652 with prompt 658 and/or answer options 660 as shown in FIG. 6L.

Turning to FIG. 6AA, an example is shown in which "Roadside" is entered into recipient field 621 of user interface 619 while computer system 600 has cellular service, as indicated by network status indicator 606 in FIG. 6AA. Because computer system 600 has cellular service, representations 627*a*-627*c* do not indicate that a message can be sent via a satellite communication network. In response to detecting input 625*u* selecting representation 627*a* in FIG. 6AA, computer system 600 displays messaging user interface 629 with message conversation 631 of messages between the user of computer system 600 and insurance provider A and options for creating and/or sending new messages to insurance provider A via a terrestrial (e.g., cellular) communication network, as shown in FIG. 6AB.

FIG. 7 is a flow diagram illustrating a method for communication via a non-terrestrial communication network using a computer system in accordance with some embodiments. Method 700 is performed at a computer system (e.g., 100, 300, 500, 600, a smart phone, a smart watch, a tablet computer, a laptop computer, a desktop computer, a wearable device, and/or head-mounted device) that is in communication with (e.g., includes and/or is connected to) a display generation component (e.g., 602, a display, touchscreen display, a monitor, a holographic display system, and/or a head-mounted display system) and one or more input devices (e.g., 602; a touch-sensitive surface (e.g., a touch-sensitive display); a mouse; a keyboard; a remote control; a visual input device (e.g., one or more cameras such as, e.g., an infrared camera, a depth camera, a visible light camera, and/or a gaze tracking camera); an audio input device (e.g., a microphone); a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). Some operations in method 700 are, optionally, combined, the orders of some operations are, optionally, changed, and some operations are, optionally, omitted.

As described below, method 700 provides an intuitive way for performing communication via a non-terrestrial communication network. The method reduces the cognitive burden on a user for performing communication via a non-terrestrial communication network, thereby creating a more efficient human-machine interface. For battery-operated computing devices, enabling a user to communicate via a non-terrestrial communication network faster and more efficiently conserves power and increases the time between battery charges.

The computer system detects (702), via the one or more input devices, a set of one or more inputs (e.g., 625*a*, 625*b*, '625*c*, and/or 625*e*) (e.g., touch inputs, air gestures, voice commands, and/or button presses) corresponding to a request to communicate (e.g., to generate and/or send a text message) via a non-terrestrial communication network (e.g., a satellite communication network). In response to detecting the set of one or more inputs corresponding to the request to communicate via the non-terrestrial communication network, the computer system displays (704), via the display generation component, a first set of user interface elements (e.g., 626 and/or 650) (e.g., buttons, selectable icons, selectable options, affordances, and/or user-interactive user interface elements) corresponding to respective contexts (e.g., situations, circumstances, events, and/or conditions), including displaying a first context user interface element (e.g., 626*b*, 626*c*, 626*d*, 626*c*, and/or 650*b*) corresponding to a first context (e.g., an emergency) and displaying (e.g., concurrently with the first context user interface element) a second context user interface element (626*a* and/or 650*a*) corresponding to a second context (e.g., a vehicle issue, a request for roadside assistance, and/or a situation that involves roadside assistance) that is different from the first context. Displaying a first set of user interface elements in response to detecting a request to communicate via the non-terrestrial communication network, including displaying a first context user interface element corresponding to a first context and a second context user interface element corresponding to a second context enables a user to quickly and efficiently specify a reason for the request and for the computer system to provide options that are more relevant to the user, thereby providing improved visual feedback to the user, reducing the number of inputs needed to perform an operation, and/or providing additional control options without cluttering the user interface with additional displayed controls.

The computer system detects (706), via the one or more input devices, a set of one or more inputs (e.g., 625*d*, 625*c*, and/or 625*i*) (e.g., touch inputs, air gestures, voice commands, and/or button presses) corresponding to a selection of a respective context user interface element. Detecting the set of one or more inputs corresponding to a selection of a respective context user interface element enables a user to specify a context for the request to communicate via the non-terrestrial communication network. In response (708) to detecting the set of one or more inputs corresponding to the selection of the respective context user interface element: in accordance with a determination that the selection of the respective context user interface element includes selection (e.g., 625*d*) of the first context user interface element (e.g., selection of 650*b*) corresponding to the first context, the computer system initiates (710) a process (e.g., the process in FIGS. 6F-6I) for communicating with a predefined (or, in some embodiments, a predetermined, a computer-selected, and/or a non-user selected) recipient (e.g., an emergency communication service selected by the computer system and/or the non-terrestrial communication network; and/or a recipient that is not selected by a user) via the non-terrestrial communication network; and in accordance with a determination that the selection of the respective context user interface element includes selection (e.g., 625*e* and/or 625*i*) of the second context user interface element corresponding to the second context, the computer system initiates (712) a process (e.g., the process in FIG. 6J, FIG. 6K, and/or FIG. 6W) for selecting a recipient (e.g., a recipient corresponding to recipient option 656*a*, recipient option 656*b*, and/or recipient option 656*c*) (e.g., a roadside assistance provider and/or an insurance company) to communicate with via the non-terrestrial communication network. In some embodiments, in response to detecting a selection of the first context user interface element, the computer system displays a set of one or more representations (e.g., user-interactive user interface elements, selectable icons, buttons, affordances, and/or selectable options) of respective information associated with the first context. In some embodiments, the respective information associated with the first context include respective answers to a question about the first context. In some embodiments, in accordance with a determination that the selection of the respective context user interface element includes selection of the first context user interface element corresponding to the first context, the computer system initiates a process for sending a communication via the non-terrestrial communication network without selecting a recipient of the communication (e.g., without the user selecting a recipient and/or without providing an option to select a recipient of the communication). In some embodiments, in response to detecting a selection of the second context user interface element, the computer system displays a set of one or more representations (e.g., user-interactive user interface elements, selectable icons, buttons, affordances, and/or selectable options) of respective recipients (e.g., potential recipients, roadside assistance providers, and/or insurance providers). Initiating a process for communicating with a predefined recipient or a process for selecting a recipient based on a context selected by a user enables the user to communicate with an entity that is relevant under the circumstances and avoids having to select a recipient for certain contexts (e.g., emergency contexts in which time is critical and a user may not know what entity to contact), thereby providing improved visual feedback to the user, reducing the number of inputs needed to perform an operation, and/or performing an operation when a set of conditions has been met without requiring further user input.

In some embodiments, before detecting the set of one or more inputs corresponding to the request to communicate via a non-terrestrial communication network, the computer system detects, via the one or more input devices, a set of one or more inputs (e.g., 625*a*) corresponding to a request to call (e.g., via a terrestrial communication network) a predefined entity (e.g., an emergency service, a contact designated as an emergency contact, 911 in the United States, 199 in Japan or Korea, 112 in Europe, or 000 in Australia). Detecting a request to call a predefined entity before detecting the request to communicate via a non-terrestrial communication network enables the computer system to provide options for communicating via the non-terrestrial communication network in certain situations where a desire for communication via the non-terrestrial communication network is more likely (e.g., in emergency situations or when roadside assistance is requested), thereby providing improved visual feedback to the user.

In some embodiments, before detecting the set of one or more inputs corresponding to the request to communicate via a non-terrestrial communication network: in accordance with a determination that the computer system is unable to communicate via a terrestrial communication network (e.g., the computer system is not receiving a signal from a terrestrial communication network (e.g., a cellular network), the computer system does not have cell service, a signal from a terrestrial communication network does not satisfy a set of connection criteria (e.g., the signal from the terrestrial communication network is too weak, unstable, and/or inconsistent), the computer system is unable to establish a communication connection with a terrestrial communication network, and/or a connection with a terrestrial communication network does not satisfy a set of communication criteria (e.g., the connection between the computer system and the terrestrial communication network is too weak, unstable, and/or inconsistent)), the computer system displays, via the display generation component, a non-terrestrial communication user interface element (e.g., 614) (e.g., a user-interactive user interface element, a selectable option, a selectable icon, a button, and/or an affordance), and the set of one or more inputs corresponding to the request to communicate via the non-terrestrial communication network includes an input (e.g., 625*b*) corresponding to selection of the non-terrestrial communication user interface element. In some embodiments, the computer system displays the non-terrestrial communication user interface element in response to a determination that the request to call the predefined entity has failed and that the computer system is unable to communicate via a terrestrial communication network. Displaying a non-terrestrial communication user interface element when the computer system is unable to communicate via a terrestrial communication network informs the user that communication via a non-terrestrial communication network is available and enables the user to quickly and efficiently request communication via the non-terrestrial communication network, thereby providing improved visual feedback to the user, reducing the number of inputs needed to perform an operation, and/or performing an operation when a set of conditions has been met without requiring further user input.

In some embodiments, the process for communicating with a predefined recipient via the non-terrestrial communication network includes displaying a first sequence of message information user interface elements (e.g., 630 and/or 634) (e.g., a first set of one or more options followed by a second set of one or more options) for generating a message (e.g., 642) (e.g., a text message) to send to the predefined recipient via the non-terrestrial communication network. Displaying a first sequence of message information user interface elements enables the user to quickly and efficiently compose a message with fewer mistakes under stressful circumstances (e.g., an emergency situation) and to provide relevant information while limiting the size of the message when communication bandwidth is more limited (e.g., when communication is being performed via a non-terrestrial communication network), thereby providing improved visual feedback to the user and reducing the number of inputs needed to perform an operation. In some embodiments, the message information user interface elements of the first sequence of message information user interface elements correspond to respective answers (e.g., "me", "someone else", chest pain, traumatic injury, sickness, stroke, drowning, and/or other) to a question (e.g., "Who needs help?" and/or "What best describes the emergency?") and/or request for information related to the first context. In some embodiments, in response to detecting selection of the first context user interface element, the computer system displays a first set of message information user interface elements (e.g., a set of available answers to a first question) related to the first context; the computer system detects a selection of a first message information user interface element of the first set of message information user interface elements; and in response to detecting the selection of the first message information user interface element related to the first context, the computer system displays a second set of message information user interface elements related to the first context (e.g., a set of available answers to a second question) based on the first message information user interface element related to the first context (e.g., the second set of available answers is different depending on which answer was selected for the first question). In some embodiments, the computer system detects selection of a second message information user interface element from the second set of message information user interface elements related to the first context and generates a message to the predefined recipient based on the first message information user interface element related to the first context and the second message information user interface element related to the first context (e.g., based on the selected answers).

In some embodiments, detecting the set of one or more inputs corresponding to the request to communicate via the non-terrestrial communication network includes detecting an input (e.g., 625*e* and/or 625*i*) indicating an issue involving a vehicle (e.g., a car, truck, bus, motorcycle, and/or boat). In some embodiments, the computer system displays the first context user interface element and the second context user interface element in response to detecting the input indicating the issue involving the vehicle. In some embodiments, before displaying the first set of user interface elements corresponding to respective contexts (e.g., including the first context user interface element and the second context user interface element), the computer system displays a second set of user interface elements corresponding to respective contexts (e.g., vehicle issue, sickness/injury, crime, lost or trapped, and/or fire). In some embodiments, the input indicating an issue involving a vehicle includes selection of a user interface element from the second set of user interface elements. In some embodiments, in response to detecting a selection of a user interface element from the second set of user interface elements that does not indicate an issue involving a vehicle, the computer system displays a sequence of message information user interface elements (e.g., a first set of one or more options followed by a second set of one or more options) for generating a message (e.g., a text message) to send to the predefined recipient via the non-terrestrial communication network.

In some embodiments, the process (or, in some embodiments, initiating the process) for selecting a recipient to communicate with via the non-terrestrial communication network includes displaying a set (e.g., 656) of one or more representations (e.g., 656*a*, 656*b*, and/or 656*c*) (e.g., user-interactive user interface elements, selectable icons, buttons, affordances, and/or selectable options) of respective recipients (e.g., potential recipients, roadside assistance providers, and/or insurance providers). Displaying a set of representation of respective recipients informs a user of available options and enables the user to quickly and efficiently select a recipient with fewer mistakes, thereby providing improved visual feedback and/or reducing the number of inputs needed to perform an operation.

In some embodiments, the computer system detects, via the one or more input devices, an input (e.g., 625*i*) corresponding to a selection of a representation (e.g., 656*a*, 656*b*, and/or 656*c*) of a first recipient from the set (e.g., 656) of one or more representations of respective recipients; and in response to detecting the input corresponding to the selection of the representation of the first recipient from the set of one or more representations of respective recipients, the computer system displays, via the display generation component, a second sequence of message information user interface elements (e.g., 660, 664, 668, 672, 676, 680, 684, and/or 688) (e.g., a first set of one or more options followed by a second set of one or more options) for generating a message (e.g., 603) (e.g., a text message) to send to the first recipient (e.g., the selected recipient) via the non-terrestrial communication network. Displaying a sequence of message information user interface elements for generating a message to send via the non-terrestrial communication network enables the user to quickly and efficiently compose a message with fewer mistakes under stressful circumstances (e.g., an emergency situation) and to provide relevant information while limiting the size of the message when communication bandwidth is more limited (e.g., when communication is being performed via a non-terrestrial communication network), thereby providing improved visual feedback to the user and reducing the number of inputs needed to perform an operation. In some embodiments, the message information user interface elements of the second sequence of message information user interface elements correspond to respective answers (e.g., locked out, no fuel or charge, flat tire, vehicle does not start, and/or other issue) to a question (e.g., "What do you need assistance with?", "Where would you like your vehicle towed?", "How many people will ride in the tow truck?", "When did the vehicle stop working?", "Do you have a spare for each flat tire?", "What type of fuel does your vehicle use?", "Are your keys locked inside the vehicle?", and/or "What is your phone number?") and/or request for information related to the second context (e.g., a vehicle issue and/or request for roadside assistance). In some embodiments, in response to detecting selection of the representation of the first recipient, the computer system displays a first set of message information user interface elements (e.g., a set of available answers to a first question) related to the second context; the computer system detects a selection of a first message information user interface element of the first set of message information user interface elements related to the second context; and in response to detecting the selection of the first message information user interface element related to the second context, the computer system displays a second set of message information user interface elements related to the second context (e.g., a set of available answers to a second question) based on the first message information user interface element (e.g., the second set of available answers is different depending on which answer was selected for the first question). In some embodiments, the computer system detects selection of a second message information user interface element from the second set of message information user interface elements related to the second context and generates a message to the predefined recipient based on the first message information user interface element related to the second context and the second message information user interface element related to the second context (e.g., based on the selected answers).

In some embodiments, displaying the set (e.g., 656) of one or more representations of respective recipients includes: in accordance with a determination that a request to communicate with a recipient of the respective recipients is active, displaying the set of one or more representations of respective recipients in a first manner (e.g., the display of 656 in FIG. 6W) (e.g., a representation of the recipient with which the request is active is visually distinguished and/or separated from one or more representations of other recipients); and in accordance with a determination that a request to communicate with a recipient of the respective recipients is not active, displaying the set of one or more representations of respective recipients in a second manner (e.g., the display of 656 in FIG. 6K) (e.g., the one or more representations of respective recipients are displayed in a same or similar style and/or with a same or similar appearance) that is different from the first manner. Displaying the set of one or more representations of respective recipients in different manners based on whether a request to communicate with a recipient of the respective recipients is active informs the user about the state of a request and avoids additional inputs when a request is already active, thereby providing improved visual feedback to the user, reducing the number of inputs needed to perform an operation, and/or performing an operation when a set of conditions has been met without requiring further user input.

In some embodiments, displaying the set of one or more representations of respective recipients includes displaying a representation (e.g., 656*a*, 656*b*, or 656*c*) of a second recipient, including: in accordance with a determination that authorization (e.g., an account and/or subscription) is required to obtain service from the second recipient, displaying the representation of the second recipient with a first appearance (e.g., with 657) (e.g., a first color, style, text, graphical element, and/or animation) (e.g., the computer system displays an indication that authorization is required such as, e.g., "Current subscribers only"); and in accordance with a determination that authorization is not required to obtain service from the second recipient, displaying the representation of the second recipient with a second appearance (e.g., without 657) (e.g., a second color, style, text, graphical element, and/or animation) (e.g., the computer system displays the first representation without the indication that authorization is required) that is different from the first appearance. Displaying the representation of the recipient with an appearance that is based on whether authorization is required to obtain service from the recipient informs the user of whether authorization is required and avoids selection of a recipient that is not available to the user, thereby providing improved visual feedback to the user, reducing the number of inputs needed to perform an operation, and/or performing an operation when a set of conditions has been met without requiring further user input.

In some embodiments, the process for communicating with the predefined recipient via the non-terrestrial communication network includes sending a message (e.g., 642) (e.g., a text message) to the predefined recipient via the non-terrestrial communication network without detecting a selection (e.g., 625*j*) of a recipient of the message (e.g., without a user selecting a recipient of the message). In some embodiments, after detecting selection of the first context user interface element corresponding to the first context, the computer system generates a message to the predefined recipient (e.g., in response to one or more inputs) and sends the message to the predefined recipient (e.g., in response to one or more inputs). Sending a message to the predefined recipient via the non-terrestrial communication network without detecting a selection of a recipient of the message enables the user to send a message without having to select a recipient, thereby reducing the number of inputs needed to perform an operation.

In some embodiments, the process for communicating with the predefined recipient via the non-terrestrial communication network includes: detecting, via the one or more input devices, a set of one or more inputs (e.g., 625*f* and/or 625*g*) corresponding to information related to the first context; detecting, via the one or more input devices, an input (e.g., 625*h*) corresponding to a request to send the message to the predefined recipient via the non-terrestrial communication network; and in response to detecting the input corresponding to the request to send the message to the predefined recipient via the non-terrestrial communication network, sending the message (e.g., 642) to the predefined recipient via the non-terrestrial communication network, including sending, in the message to the predefined recipient, the information related to the first context (e.g., the information in summary 636). Sending the information related to the first context in the message to the predefined recipient enables the user to quickly and efficiently compose a message with fewer mistakes under stressful circumstances (e.g., an emergency situation) and to provide relevant information while limiting the size of the message when communication bandwidth is more limited (e.g., when communication is being performed via a non-terrestrial communication network), thereby providing improved visual feedback to the user and reducing the number of inputs needed to perform an operation. In some embodiments, after the computer system detects selection of the first context user interface element corresponding to the first context, the computer system: detects, via the one or more input devices, a set of one or more inputs corresponding to information related to the first context; detects, via the one or more input devices, an input corresponding to a request to send the message to the predefined recipient via the non-terrestrial communication network; and in response to detecting the input corresponding to the request to send the message to the predefined recipient via the non-terrestrial communication network, sends the message to the predefined recipient via the non-terrestrial communication network, including sending, in the message to the predefined recipient, the information related to the first context.

In some embodiments, after detecting selection of the second context user interface element (e.g., 626*a* and/or 650*a*) corresponding to the second context: the computer system detects, via the one or more input devices, an input corresponding to selection of a third recipient (e.g., selection of 656*a*, 656*b*, and/or 656*c*); the computer system detects, via the one or more input devices, an input (e.g., 625*p*) corresponding to a request to send a message to the third recipient via the non-terrestrial communication network; and in response to detecting the input corresponding to the request to send the message to the third recipient via the non-terrestrial communication network, the computer system sends the message (e.g., 603) to the third recipient via the non-terrestrial communication network. In some embodiments, the computer system detects, via the one or more input devices, a set of one or more inputs corresponding to information related to the second context; and sending the message to the third recipient includes sending, in the message to the third recipient, the information related to the second context.

In some embodiments, the computer system displays, via the display generation component, a user interface (e.g., 611 and/or 619) of a messaging application (e.g., a user interface that provides an ability to create, send, receive, and/or view messages between a user of the computer system and one or more other users); the computer system detects, via the one or more input devices, a set of one or more inputs (e.g., 625*r* and/or 625*s*) corresponding to entry (e.g., in a recipient field, such as 621) of (e.g., a request to search for) a predefined term (e.g., a predefined keyword such as "Roadside", "Roadside assistance", and/or "vehicle assistance"); in response to detecting the set of one or more inputs corresponding to entry of the predefined term, the computer system displays, via the display generation component, a set (e.g., 627) of one or more representations (e.g., 627*a*, 627*b*, and/or 627*c*) (e.g., user-interactive user interface elements, selectable icons, buttons, affordances, and/or selectable options) of respective entities (e.g., contactable entities, roadside service providers, and/or insurance companies) corresponding to the predefined term; the computer system detects, via the one or more input devices, an input (e.g., 625*t* or 625*u*) corresponding to a selection of a first representation corresponding to a first entity from the set of one or more representation of respective entities; and in response to detecting the input corresponding to the selection of the first representation, the computer system initiates a process for sending a message to the first entity (e.g., displaying the prompts and/or answer options in FIGS. 6J and/or 6L-6T; and/or displaying 629) (e.g., creating a new message to the first entity and/or displaying an existing message thread between a user of the computer system and the first entity). Displaying a set of one or more representations of respective entities in response to entry of a predefined term provides the user with relevant options and enables the user to quickly and efficiently select a recipient for a message, thereby providing improved visual feedback to the user and reducing the number of inputs needed to perform an operation.

In some embodiments, in response to detecting the input corresponding to the selection of the first representation: in accordance with a determination that the computer system is unable to communicate via a terrestrial communication network, the computer system displays, via the display generation component, displaying a third sequence of message information user interface elements (e.g., 650, 660, 664, 668, 672, 676, 680, 684, and/or 688) (e.g., a first set of one or more options followed by a second set of one or more options) for generating a message (e.g., a text message) to send to the first entity via the non-terrestrial communication network; and in accordance with a determination that the computer system is able to communicate via a terrestrial communication network, the computer system displays, via the display generation component, a message conversation (e.g., 631) (e.g., an existing message conversation and/or a message thread). Displaying a message conversation or a sequence of message information user interface elements for generation a message depending on whether the computer system is able to communicate via a terrestrial communication network provides the user with relevant options and/or interfaces based on the context and enables the user to quickly and efficiently create a message (and to limit the size of the message) when the computer system is unable to communicate via a terrestrial communication network, thereby providing improved visual feedback to the user, conserving computer resources, saving battery life, reducing the number of inputs needed to perform an operation, and/or performing an operation when a set of conditions has been met without requiring further user input.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve communication via a non-terrestrial communication network. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for communication via a non-terrestrial communication network. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of communication via a non-terrestrial communication network, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, communication via a non-terrestrial communication network can be performed based on non-personal information data or a bare minimum amount of personal information, such as the content being requested by the device associated with a user, other non-personal information, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

detecting, via the one or more input devices, a set of one or more inputs corresponding to a request to communicate via a non-terrestrial communication network;

in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context;

detecting, via the one or more input devices, a set of one or more inputs corresponding to a selection of a respective context user interface element;

in response to detecting the set of one or more inputs corresponding to the selection of the respective context user interface element:

in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network; and after detecting selection of the second context user interface element corresponding to the second context:

detecting, via the one or more input devices, an input corresponding to selection of a first recipient;

detecting, via the one or more input devices, an input corresponding to a request to send a message to the first recipient via the non-terrestrial communication network; and in response to detecting the input corresponding to the request to send the message to the first recipient via the non-terrestrial communication network, sending the message to the first recipient via the non-terrestrial communication network.

2. The computer system of claim 1, wherein the one or more programs further include instructions for:

before detecting the set of one or more inputs corresponding to the request to communicate via a non-terrestrial communication network, detecting, via the one or more input devices, a set of one or more inputs corresponding to a request to call a predefined entity.

3. The computer system of claim 1, wherein the one or more programs further include instructions for:

before detecting the set of one or more inputs corresponding to the request to communicate via a non-terrestrial communication network:

in accordance with a determination that the computer system is unable to communicate via a terrestrial communication network, displaying, via the display generation component, a non-terrestrial communication user interface element, wherein the set of one or more inputs corresponding to the request to communicate via the non-terrestrial communication network includes an input corresponding to selection of the non-terrestrial communication user interface element.

4. The computer system of claim 1, wherein the process for communicating with a predefined recipient via the non-terrestrial communication network includes displaying a first sequence of message information user interface elements for generating a message to send to the predefined recipient via the non-terrestrial communication network.

5. The computer system of claim 1, wherein detecting the set of one or more inputs corresponding to the request to communicate via the non-terrestrial communication network includes detecting an input indicating an issue involving a vehicle.

6. The computer system of claim 1, wherein the process for selecting a recipient to communicate with via the non-terrestrial communication network includes displaying a set of one or more representations of respective recipients.

7. The computer system of claim 6, wherein the one or more programs further include instructions for:

detecting, via the one or more input devices, an input corresponding to a selection of a representation of a second recipient from the set of one or more representations of respective recipients; and in response to detecting the input corresponding to the selection of the representation of the second recipient from the set of one or more representations of respective recipients, displaying, via the display generation component, a second sequence of message information user interface elements for generating a message to send to the second recipient via the non-terrestrial communication network.

8. The computer system of claim 6, wherein displaying the set of one or more representations of respective recipients includes:

in accordance with a determination that a request to communicate with a recipient of the respective recipients is active, displaying the set of one or more representations of respective recipients in a first manner; and in accordance with a determination that a request to communicate with a recipient of the respective recipients is not active, displaying the set of one or more representations of respective recipients in a second manner that is different from the first manner.

9. The computer system of claim 6, wherein displaying the set of one or more representations of respective recipients includes displaying a representation of a third recipient, including:

in accordance with a determination that authorization is required to obtain service from the third recipient, displaying the representation of the third recipient with a first appearance; and in accordance with a determination that authorization is not required to obtain service from the third recipient, displaying the representation of the third recipient with a second appearance that is different from the first appearance.

10. The computer system of claim 1, wherein the process for communicating with the predefined recipient via the non-terrestrial communication network includes sending a message to the predefined recipient via the non-terrestrial communication network without detecting a selection of a recipient of the message.

11. The computer system of claim 10, wherein the process for communicating with the predefined recipient via the non-terrestrial communication network includes:

detecting, via the one or more input devices, a set of one or more inputs corresponding to information related to the first context;

detecting, via the one or more input devices, an input corresponding to a request to send the message to the predefined recipient via the non-terrestrial communication network; and in response to detecting the input corresponding to the request to send the message to the predefined recipient via the non-terrestrial communication network, sending the message to the predefined recipient via the non-terrestrial communication network, including sending, in the message to the predefined recipient, the information related to the first context.

12. The computer system of claim 1, wherein the one or more programs further include instructions for:

displaying, via the display generation component, a user interface of a messaging application;

detecting, via the one or more input devices, a set of one or more inputs corresponding to a request to search for a predefined term;

in response to detecting the set of one or more inputs corresponding to the request to search for the predefined term, displaying, via the display generation component, a set of one or more representations of respective entities corresponding to the predefined term;

detecting, via the one or more input devices, an input corresponding to a selection of a first representation corresponding to a first entity from the set of one or more representation of respective entities; and in response to detecting the input corresponding to the selection of the first representation, initiating a process for sending a message to the first entity.

13. The computer system of claim 12, wherein the one or more programs further include instructions for:

in response to detecting the input corresponding to the selection of the first representation:

in accordance with a determination that the computer system is unable to communicate via a terrestrial communication network, displaying, via the display generation component, a third sequence of message information user interface elements for generating a message to send to the first entity via the non-terrestrial communication network; and in accordance with a determination that the computer system is able to communicate via a terrestrial communication network, displaying, via the display generation component, a message conversation.

14. A non-transitory computer-readable storage medium storing one or more programs configured to be executed by one or more processors of a computer system that is in communication with a display generation component and one or more input devices, the one or more programs including instructions for:

detecting, via the one or more input devices, a set of one or more inputs corresponding to a request to communicate via a non-terrestrial communication network;

in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context;

detecting, via the one or more input devices, a set of one or more inputs corresponding to a selection of a respective context user interface element;

in response to detecting the set of one or more inputs corresponding to the selection of the respective context user interface element:

in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network; and after detecting selection of the second context user interface element corresponding to the second context:

detecting, via the one or more input devices, an input corresponding to selection of a first recipient;

detecting, via the one or more input devices, an input corresponding to a request to send a message to the first recipient via the non-terrestrial communication network; and in response to detecting the input corresponding to the request to send the message to the first recipient via the non-terrestrial communication network, sending the message to the first recipient via the non-terrestrial communication network.

15. The non-transitory computer-readable storage medium of claim 14, wherein the one or more programs further include instructions for:

before detecting the set of one or more inputs corresponding to the request to communicate via a non-terrestrial communication network, detecting, via the one or more input devices, a set of one or more inputs corresponding to a request to call a predefined entity.

16. The non-transitory computer-readable storage medium of claim 14, wherein the one or more programs further include instructions for:

before detecting the set of one or more inputs corresponding to the request to communicate via a non-terrestrial communication network:

in accordance with a determination that the computer system is unable to communicate via a terrestrial communication network, displaying, via the display generation component, a non-terrestrial communication user interface element, wherein the set of one or more inputs corresponding to the request to communicate via the non-terrestrial communication network includes an input corresponding to selection of the non-terrestrial communication user interface element.

17. The non-transitory computer-readable storage medium of claim 14, wherein the process for communicating with a predefined recipient via the non-terrestrial communication network includes displaying a first sequence of message information user interface elements for generating a message to send to the predefined recipient via the non-terrestrial communication network.

18. The non-transitory computer-readable storage medium of claim 14, wherein detecting the set of one or more inputs corresponding to the request to communicate via the non-terrestrial communication network includes detecting an input indicating an issue involving a vehicle.

19. The non-transitory computer-readable storage medium of claim 14, wherein the process for selecting a recipient to communicate with via the non-terrestrial communication network includes displaying a set of one or more representations of respective recipients.

20. The non-transitory computer-readable storage medium of claim 19, wherein the one or more programs further include instructions for:

detecting, via the one or more input devices, an input corresponding to a selection of a representation of a second recipient from the set of one or more representations of respective recipients; and in response to detecting the input corresponding to the selection of the representation of the second recipient from the set of one or more representations of respective recipients, displaying, via the display generation component, a second sequence of message information user interface elements for generating a message to send to the second recipient via the non-terrestrial communication network.

21. The non-transitory computer-readable storage medium of claim 19, wherein displaying the set of one or more representations of respective recipients includes:

in accordance with a determination that a request to communicate with a recipient of the respective recipients is active, displaying the set of one or more representations of respective recipients in a first manner; and in accordance with a determination that a request to communicate with a recipient of the respective recipients is not active, displaying the set of one or more representations of respective recipients in a second manner that is different from the first manner.

22. The non-transitory computer-readable storage medium of claim 19, wherein displaying the set of one or more representations of respective recipients includes displaying a representation of a third recipient, including:

in accordance with a determination that authorization is required to obtain service from the third recipient, displaying the representation of the third recipient with a first appearance; and in accordance with a determination that authorization is not required to obtain service from the third recipient, displaying the representation of the third recipient with a second appearance that is different from the first appearance.

23. The non-transitory computer-readable storage medium of claim 14, wherein the process for communicating with the predefined recipient via the non-terrestrial communication network includes sending a message to the predefined recipient via the non-terrestrial communication network without detecting a selection of a recipient of the message.

24. The non-transitory computer-readable storage medium of claim 23, wherein the process for communicating with the predefined recipient via the non-terrestrial communication network includes:

detecting, via the one or more input devices, a set of one or more inputs corresponding to information related to the first context;

detecting, via the one or more input devices, an input corresponding to a request to send the message to the predefined recipient via the non-terrestrial communication network; and in response to detecting the input corresponding to the request to send the message to the predefined recipient via the non-terrestrial communication network, sending the message to the predefined recipient via the non-terrestrial communication network, including sending, in the message to the predefined recipient, the information related to the first context.

25. The non-transitory computer-readable storage medium of claim 14, wherein the one or more programs further include instructions for:

displaying, via the display generation component, a user interface of a messaging application;

detecting, via the one or more input devices, a set of one or more inputs corresponding to a request to search for a predefined term;

in response to detecting the set of one or more inputs corresponding to the request to search for the predefined term, displaying, via the display generation component, a set of one or more representations of respective entities corresponding to the predefined term;

detecting, via the one or more input devices, an input corresponding to a selection of a first representation corresponding to a first entity from the set of one or more representation of respective entities; and in response to detecting the input corresponding to the selection of the first representation, initiating a process for sending a message to the first entity.

26. The non-transitory computer-readable storage medium of claim 25, wherein the one or more programs further include instructions for:

in response to detecting the input corresponding to the selection of the first representation:

in accordance with a determination that the computer system is unable to communicate via a terrestrial communication network, displaying, via the display generation component, a third sequence of message information user interface elements for generating a message to send to the first entity via the non-terrestrial communication network; and in accordance with a determination that the computer system is able to communicate via a terrestrial communication network, displaying, via the display generation component, a message conversation.

27. A method, comprising:

at a computer system that is in communication with a display generation component and one or more input devices:

detecting, via the one or more input devices, a set of one or more inputs corresponding to a request to communicate via a non-terrestrial communication network;

in response to detecting the set of one or more inputs corresponding to the request to communicate via the non-terrestrial communication network, displaying, via the display generation component, a first set of user interface elements corresponding to respective contexts, including displaying a first context user interface element corresponding to a first context and displaying a second context user interface element corresponding to a second context that is different from the first context;

detecting, via the one or more input devices, a set of one or more inputs corresponding to a selection of a respective context user interface element; and in response to detecting the set of one or more inputs corresponding to the selection of the respective context user interface element:

in accordance with a determination that the selection of the respective context user interface element includes selection of the first context user interface element corresponding to the first context, initiating a process for communicating with a predefined recipient via the non-terrestrial communication network; and in accordance with a determination that the selection of the respective context user interface element includes selection of the second context user interface element corresponding to the second context, initiating a process for selecting a recipient to communicate with via the non-terrestrial communication network;

repeating the detecting of the set of one or more inputs corresponding to the selection of the respective context user interface element, including:

at least one time where the selection of the respective context user interface element corresponds to the first context user interface element corresponding to the first context; and at least one time where the selection of the respective context user interface element corresponds to the second context user interface element corresponding to the second context; and after detecting selection of the second context user interface element corresponding to the second context:

detecting, via the one or more input devices, an input corresponding to selection of a first recipient;

detecting, via the one or more input devices, an input corresponding to a request to send a message to the first recipient via the non-terrestrial communication network; and in response to detecting the input corresponding to the request to send the message to the first recipient via the non-terrestrial communication network, sending the message to the first recipient via the non-terrestrial communication network.

28. The method of claim 27, further comprising:

before detecting the set of one or more inputs corresponding to the request to communicate via a non-terrestrial communication network, detecting, via the one or more input devices, a set of one or more inputs corresponding to a request to call a predefined entity.

29. The method of claim 27, further comprising:

before detecting the set of one or more inputs corresponding to the request to communicate via a non-terrestrial communication network:

in accordance with a determination that the computer system is unable to communicate via a terrestrial communication network, displaying, via the display generation component, a non-terrestrial communication user interface element, wherein the set of one or more inputs corresponding to the request to communicate via the non-terrestrial communication network includes an input corresponding to selection of the non-terrestrial communication user interface element.

30. The method of claim 27, wherein the process for communicating with a predefined recipient via the non-terrestrial communication network includes displaying a first sequence of message information user interface elements for generating a message to send to the predefined recipient via the non-terrestrial communication network.

31. The method of claim 27, wherein detecting the set of one or more inputs corresponding to the request to communicate via the non-terrestrial communication network, includes detecting an input indicating an issue involving a vehicle.

32. The method of claim 27, wherein the process for selecting a recipient to communicate with via the non-terrestrial communication network includes displaying a set of one or more representations of respective recipients.

33. The method of claim 32, further comprising:

detecting, via the one or more input devices, an input corresponding to a selection of a representation of a second recipient from the set of one or more representations of respective recipients; and in response to detecting the input corresponding to the selection of the representation of the second recipient from the set of one or more representations of respective recipients, displaying, via the display generation component, a second sequence of message information user interface elements for generating a message to send to the second recipient via the non-terrestrial communication network.

34. The method of claim 32, wherein displaying the set of one or more representations of respective recipients includes:

in accordance with a determination that a request to communicate with a recipient of the respective recipients is active, displaying the set of one or more representations of respective recipients in a first manner; and in accordance with a determination that a request to communicate with a recipient of the respective recipients is not active, displaying the set of one or more representations of respective recipients in a second manner that is different from the first manner.

35. The method of claim 32, wherein displaying the set of one or more representations of respective recipients includes displaying a representation of a third recipient, including:

in accordance with a determination that authorization is required to obtain service from the third recipient, displaying the representation of the third recipient with a first appearance; and in accordance with a determination that authorization is not required to obtain service from the third recipient, displaying the representation of the third recipient with a second appearance that is different from the first appearance.

36. The method of claim 27, wherein the process for communicating with the predefined recipient via the non-terrestrial communication network includes sending a message to the predefined recipient via the non-terrestrial communication network without detecting a selection of a recipient of the message.

37. The method of claim 36, wherein the process for communicating with the predefined recipient via the non-terrestrial communication network includes:

detecting, via the one or more input devices, a set of one or more inputs corresponding to information related to the first context;

detecting, via the one or more input devices, an input corresponding to a request to send the message to the predefined recipient via the non-terrestrial communication network; and in response to detecting the input corresponding to the request to send the message to the predefined recipient via the non-terrestrial communication network, sending the message to the predefined recipient via the non-terrestrial communication network, including sending, in the message to the predefined recipient, the information related to the first context.

38. The method of claim 27, further comprising:

displaying, via the display generation component, a user interface of a messaging application;

detecting, via the one or more input devices, a set of one or more inputs corresponding to a request to search for a predefined term;

in response to detecting the set of one or more inputs corresponding to the request to search for the predefined term, displaying, via the display generation component, a set of one or more representations of respective entities corresponding to the predefined term;

detecting, via the one or more input devices, an input corresponding to a selection of a first representation corresponding to a first entity from the set of one or more representation of respective entities; and in response to detecting the input corresponding to the selection of the first representation, initiating a process for sending a message to the first entity.

39. The method of claim 38, further comprising:

in response to detecting the input corresponding to the selection of the first representation:

in accordance with a determination that the computer system is unable to communicate via a terrestrial communication network, displaying, via the display generation component, a third sequence of message information user interface elements for generating a message to send to the first entity via the non-terrestrial communication network; and in accordance with a determination that the computer system is able to communicate via a terrestrial communication network, displaying, via the display generation component, a message conversation.

* * * * *